US011949791B2

(12) United States Patent
Bettger

(10) Patent No.: US 11,949,791 B2
(45) Date of Patent: *Apr. 2, 2024

(54) HASH CONTRACT GENERATION AND VERIFICATION SYSTEM

(71) Applicant: Secure Open Systems, Inc., Redondo Beach, CA (US)

(72) Inventor: David Duane Bettger, Redondo Beach, CA (US)

(73) Assignee: Secure Open Systems, Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,397

(22) Filed: Jan. 5, 2022

(65) Prior Publication Data
US 2022/0278847 A1 Sep. 1, 2022

Related U.S. Application Data

(63) Continuation of application No. 16/059,918, filed on Aug. 9, 2018, now Pat. No. 11,251,964.
(Continued)

(51) Int. Cl.
*H04L 29/06* (2006.01)
*G06F 21/62* (2013.01)
(Continued)

(52) U.S. Cl.
CPC ........ *H04L 9/3236* (2013.01); *G06F 21/6245* (2013.01); *G06F 21/64* (2013.01);
(Continued)

(58) Field of Classification Search
CPC ... G06F 21/6245; G06F 21/64; H04L 9/3236; H04L 9/0643; H04L 9/0861;
(Continued)

(56) References Cited

U.S. PATENT DOCUMENTS

| 4,200,770 A | 4/1980 | Hellman et al. |
| 6,134,597 A | 10/2000 | Rieth et al. |

(Continued)

FOREIGN PATENT DOCUMENTS

| CN | 106934619 A | 7/2017 |
| WO | WO 2018/002856 | 1/2018 |

OTHER PUBLICATIONS

International Search Report and Written Opinion for International Application No. PCT/US2018/046019, Notification dated Oct. 11, 2018.

(Continued)

*Primary Examiner* — Kendall Dolly
(74) *Attorney, Agent, or Firm* — Knobbe, Martens, Olson & Bear, LLP

(57) ABSTRACT

A hash contract is disclosed herein. A hash contract may be a value generated by a device using a hash function. The hash contract itself may represent a legally enforceable contract. The hash contract may be structured in a manner such that a device operated by a contracting party can transmit a legally enforceable contract over a network using a smaller file size than is possible with conventional secure transaction techniques. In addition, the manner in which the hash contract is generated allows a receiving device to verify that the contract elements of the contract are as expected and to verify an identity of a user that allegedly accepted the contract. Thus, even if a malicious user attempts to alter contract elements or perform other fraudulent activity, the receiving device can use the hash contract to identify such activity and prevent a transaction from being completed.

20 Claims, 36 Drawing Sheets

Related U.S. Application Data

(60) Provisional application No. 62/544,573, filed on Aug. 11, 2017.

(51) Int. Cl.
   *G06F 21/64* (2013.01)
   *H04L 9/06* (2006.01)
   *H04L 9/08* (2006.01)
   *H04L 9/32* (2006.01)
   *H04L 9/40* (2022.01)
   *H04L 9/00* (2022.01)

(52) U.S. Cl.
   CPC .......... *H04L 9/0643* (2013.01); *H04L 9/0861* (2013.01); *H04L 9/3239* (2013.01); *H04L 9/3247* (2013.01); *H04L 63/123* (2013.01); *H04L 9/50* (2022.05); *H04L 63/0442* (2013.01)

(58) Field of Classification Search
   CPC ....... H04L 9/3239; H04L 9/3247; H04L 9/50; H04L 63/123; H04L 63/0442
   See application file for complete search history.

(56) References Cited

U.S. PATENT DOCUMENTS

| | | | |
|---|---|---|---|
| 6,219,423 B1* | 4/2001 | Davis | H04L 9/3247 705/37 |
| 7,051,211 B1 | 5/2006 | Matyas et al. | |
| 9,171,145 B2 | 10/2015 | Dash et al. | |
| 9,432,368 B1 | 8/2016 | Saxena et al. | |
| 9,544,142 B2 | 1/2017 | Ashdown | |
| 2003/0120929 A1 | 6/2003 | Hoffstein et al. | |
| 2003/0221109 A1 | 11/2003 | Boyer et al. | |
| 2004/0111331 A1 | 6/2004 | Yano et al. | |
| 2008/0184033 A1 | 7/2008 | Daniels et al. | |
| 2011/0040784 A1 | 2/2011 | Rousseau | |
| 2013/0311772 A1* | 11/2013 | Etheridge | H04L 9/3247 713/176 |
| 2014/0013111 A1 | 1/2014 | Herbach et al. | |
| 2016/0373418 A1* | 12/2016 | Ståhl | G06F 21/44 |
| 2017/0048216 A1 | 2/2017 | Chow et al. | |
| 2017/0054708 A1 | 2/2017 | Zaw et al. | |
| 2017/0118183 A1 | 4/2017 | Shin et al. | |
| 2018/0020008 A1 | 1/2018 | Schoof | |
| 2018/0270252 A1* | 9/2018 | Klein | G06F 16/152 |
| 2019/0052467 A1 | 2/2019 | Bettger | |
| 2019/0089774 A1 | 3/2019 | Prakash et al. | |
| 2021/0344673 A1* | 11/2021 | Hamid | H04L 9/0844 |
| 2022/0231857 A1 | 7/2022 | Bettger | |

OTHER PUBLICATIONS

Extended European Search Report for European Application No. 18843256.1 dated Nov. 4, 2020.

Atighehci et al, A Cryptographic Keys Transfer Protocol for Secure Communicating Systems, Sep. 26, 2010, IEEE, pp. 339-343. (Year: 2010).

Jiang etal, Authenticated Key-Exchange Scheme Based on SGC-PKE for P2PSIP, Apr. 25, 2010, IEEE, pp. 352-356. (Year: 2010).

* cited by examiner

TRANSACTION LEDGER

| ITEM NO. | DESCRIPTION | AMOUNT |
|---|---|---|
| 1 | e3b0c4498fc1d391e88b0d4a.SHA256 | $0.00 |
| 2 | 54dfad220d45b0e8f1d3e211.BLAKE2B | $1,489.45 |
| 3 | 9e4510df0d4b03eee4102568.MD5 | $365.00 |
| | TOTAL | $1,854.45 |

*Fig. 21*

HASH CONTRACT GENERATION AND VERIFICATION SYSTEM

CROSS-REFERENCE TO RELATED APPLICATIONS

This application is a continuation of U.S. patent application Ser. No. 16/059,918, entitled "HASH CONTRACT GENERATION AND VERIFICATION SYSTEM" and filed on Aug. 9, 2018, which claims the benefit under 35 U.S.C. § 119(e) of U.S. Patent Application No. 62/544,573, entitled "HASH CONTRACT GENERATION AND VERIFICATION SYSTEM" and filed on Aug. 11, 2017, the entire disclosures of which are hereby incorporated by reference herein.

BACKGROUND

Current techniques for the confidential generation, use, and transmission of electronic contracts on a network are complicated, inefficient, and risky. For example, electronic contracts that may be generated, used, and/or transmitted on a network include network-based contracts, formal contracts, implied contracts, expressed contracts, bilateral contracts, unilateral contracts, and/or the like. These contracts (for example, the contract elements, including offer, acceptance, etc.) may be converted into a digital format before transmitted over the network. However, public networks, such as the Internet, are generally unsecured environments. For example, malicious users can spoof receiving systems, use packet sniffing techniques, and/or other like network-based attacks to intercept transmissions of contracts for the purpose of altering contract elements or performing other fraudulent activity. Given the unsecure nature of public networks, it may be difficult for contracting parties to provide verifiable intent to enter into or acceptance of a contract and/or to securely transmit contract data (for example, contract elements, the contract itself, or other important contract related information) to another party. These issues may, as a practical matter, limit the use of electronic contracts.

SUMMARY

The systems, methods, devices, and items described herein each have several aspects, no single one of which is solely responsible for its desirable attributes. Without limiting the scope of this disclosure, several non-limiting features will now be discussed briefly.

One aspect of the disclosure provides a computer-generated, verifiable Hash Contract fixed on a non-transitory computer-readable medium. The Hash Contract comprises a hash code generated based on a hash function, where the hash function, when executed, creates a binding agreement, where the hash code comprises the binding agreement, and where the hash code is structured in a manner such that a comparison of the hash code with a second, matching hash code results in authentication of the Hash Contract.

The computer-generated, verifiable Hash Contract of the preceding paragraph can include any sub-combination of the following features: where the computer-generated, verifiable Hash Contract further comprises a hash function tag appended to the hash code, where the hash function tag comprises an identification of the hash function used to generate the hash code such that a computing device that receives the hash code can determine that the hash function should be used to generate the second hash code; where the hash code is associated with metadata that identifies at least one of system requirements, transaction information, a computing device that generated the hash code, or a user associated with the binding agreement; where the hash function comprises a cryptographic hash function; where the hash function comprises one of SHA-256 or SHA-512; where the hash code is structured in a manner such that content of the binding agreement remains confidential even if a malicious computing device intercepts a transmission of the hash code; where the binding agreement is a first counterpart agreement; where a computing device is configured to authorize a transaction in response to a determination that the hash code matches the second hash code generated by the computing device; where a computing device is configured to reject a transaction in response to a determination that the hash code does not match the second hash code generated by the computing device; where a computing device is configured to determine that fraudulent activity has occurred in response to a determination that the hash code does not match the second hash code generated by the computing device or a third hash code generated by the computing device, where the second hash code is a second Hash Contract and the third hash code is a decline hash code; where a computing device is configured to display a user interface comprising a selectable link identifying the hash code, where selection of the link causes the user interface to display at least a portion of content of the binding agreement; where the hash code has a file size that is smaller than a file size of an electronic document that comprises content of the binding agreement; where the hash code is structured in a manner such that a malicious device that intercepts a transmission of the hash code cannot determine input message elements to which a computing device applies the hash function to generate the hash code using the intercepted hash code; where the hash function is applied, by a computing device, to at least two of first text that represents terms and conditions, second text that represents consideration, a first value corresponding to a user input that indicates that a user accepts the terms and conditions and the consideration, or first data corresponding to an identity of the user to generate the hash code; where the hash function is further applied, by the computing device, to a key generated by the computing device using an initialization key present in an application retrieved by the computing device; where the key is separately generated by a second computing device without all inputs used to generate the key being communicated between the second computing device and the computing device such that the hash code generated based at least in part on the key exhibits security features that prevent a third computing device spoofing the computing device from recreating the hash code; and where a computing device is configured to authenticate an identity of a user that caused generation of the hash code in response to a determination that the hash code matches the second hash code generated by the computing device.

Another aspect of the disclosure provides a Hash Contract hash function input message fixed on a non-transitory computer-readable medium. The input message comprises a first input message element; and a second input message element different than the first input message element, where a combination of the first input message element and the second input message element represent at least two of terms and conditions of an agreement, consideration of the agreement, an identity of a user associated with the agreement, an intent of the user to execute the agreement, or an acceptance of the agreement, where the Hash Contract hash function, when executed based on a representation of the first input message element and a representation of the second input message element, creates a binding agreement represented as a hash code, and where the hash code is structured in a manner such that a comparison of the hash code with a second, matching hash code results in authentication of the agreement.

The input message of the preceding paragraph can include any sub-combination of the following features: where the representation of the first input message element comprises a hash of the first input message element; where the identity of the user comprises a hash value resulting from a second hash function applied to a value corresponding to an input that represents the identity of the user; where the input comprises at least one factor used in multi-factor authentication; where the input message further comprises a third input message element, where the Hash Contract hash function, when executed based on the first, second, and third input message elements, forms the hash code; where the third input message element comprises a key generated by a computing device; where the Hash Contract hash function, when executed based on the third input message element and a hash of the first and second input message elements, forms the hash code; where the key is a single-use key; where the key is separately generated by a second computing device separate from the computing device without all inputs used to generate the key being communicated between the second computing device and the computing device such that the hash code generated based at least in part on the key exhibits security features that prevent a third computing device spoofing the computing device from recreating the hash code; where the third input message element comprises a previously generated third hash code; where the Hash Contract hash function forms the hash code when executed based on a string formed from a concatenation of the first input message element and the second input message element; where the string comprises the first input message element appended to an end of the second input message element; and where an order of the concatenation of the first input message element and the second input message element varies per transaction, per set of transactions, per user, per group of users, per network, per set of networks, or per time period.

Another aspect of the disclosure provides a computer-implemented method for generating a verifiable decline hash code. The computer-implemented method comprises: as implemented by a computing device having one or more processors, receiving a first hash input message element and a second hash input message element, where the second hash input message element is different than the first hash input message element, where a combination of the first hash input message element and the second hash input message element represent at least two of terms and conditions of an agreement, consideration of the agreement, an identity of a user associated with the agreement, an intent of the user with regards to the agreement, or a rejection of one or more elements of the agreement; and performing a hash of a representation of the first hash input message element and a representation of the second hash input message element to generate the decline hash code, where the decline hash code represents a rejection of the agreement, and where the decline hash code is structured in a manner such that a comparison of the decline hash code with a second, matching decline hash code results in authentication of the decline hash code.

The computer-implemented method of the preceding paragraph can include any sub-combination of the following features: where the representation of the first hash input message element comprises a hash of the first hash input message element; where the identity of the user comprises a hash value resulting from a second hash function applied to a value corresponding to an input that represents the identity of the user; where the input comprises at least one factor used in multi-factor authentication; where the computer-implemented method further comprises receiving a third hash input message, and performing a hash of the first, second, and third hash input message elements to generate the decline hash code; where the third hash input message element comprises a key generated by the computing device using an initialization key present in an application retrieved by the computing device; where performing a hash of the first, second, and third hash input message elements further comprises performing a hash of the third hash input message element and a hash of the first and second hash input message elements to generate the decline hash code; where the key is a single-use key; where the key is separately generated by a second computing device separate from the computing device without all inputs used to generate the key being communicated between the second computing device and the computing device such that the decline hash code generated based at least in part on the key exhibits security features that prevent a third computing device spoofing the computing device from recreating the decline hash code; where the third hash input message element comprises a previously generated third hash code; where the computer-implemented method further comprises concatenating the first hash input message element and the second hash input message element to form a string, and performing a hash of the string to generate the decline hash code; where the string comprises the first hash input message element appended to an end of the second hash input message element; where an order of the concatenation of the first hash input message element and the second hash input message element varies per transaction, per set of transactions, per user, per group of users, per network, per set of networks, or per time period; where a hash function tag is appended to the decline hash code, where the hash function tag comprises an identification of a hash function used to generate the decline hash code such that a second computing device that receives the decline hash code can determine that the hash function should be used to generate the second decline hash code; where the hash function comprises a cryptographic hash function; where the decline hash code is structured in a manner such that content of the agreement remains confidential even if a malicious computing device intercepts a transmission of the decline hash code; where the decline hash code is associated with device metadata that identifies the computing device that generated the decline hash code; where a second computing device is configured to reject a transaction in response to a determination that the decline hash code matches a third decline hash code generated by the second computing device; where a second computing device is configured to determine that fraudulent activity has occurred in response to a determination that the decline hash code does not match a third decline hash code generated by the second computing device; where a computing device is configured to display a user interface comprising a selectable link identifying the decline hash code, where selection of the link causes the user interface to display content of the agreement; where the decline hash code has a file size that is smaller than a file size of an electronic document that comprises content of the agreement; where the decline hash code is structured in a manner such that a malicious device that intercepts a transmission of the decline hash code cannot determine the first hash input message element or the second hash input message element using the intercepted decline hash code; and where a second computing device is configured to authenticate an identity of a user that caused generation of the decline hash code in response to a determination that the decline hash code matches the second decline hash code generated by the second computing device.

Another aspect of the disclosure provides a computer-implemented method for generating a verifiable Hash Contract. The computer-implemented method comprises: as implemented by a computing device having one or more processors, receiving a first hash input message element and a second hash input message element, where the second hash input message element is different than the first hash input message element, where a combination of the first hash input message element and the second hash input message element represent at least two of terms and conditions of an agreement, consideration of the agreement, an identity of a user associated with the agreement, an intent of the user with regards to the agreement, or an acceptance of one or more elements of the agreement; and performing a hash of a representation of the first hash input message element and a representation of the second hash input message element to generate the Hash Contract, where the Hash Contract represents an execution of the agreement, and where the Hash Contract is structured in a manner such that a comparison of the Hash Contract with a second, matching Hash Contract results in authentication of the Hash Contract.

The computer-implemented method of the preceding paragraph can include any sub-combination of the following features: where the representation of the first hash input message element comprises a hash of the first hash input message element; where the identity of the user comprises a hash value resulting from a second hash function applied to a value corresponding to an input that represents the identity of the user; where the input comprises at least one factor used in multi-factor authentication; where the computer-implemented method further comprises receiving a third hash input message, and performing a hash of the first, second, and third hash input message elements to generate the Hash Contract; where the third hash input message element comprises a key generated by the computing device using an initialization key present in an application retrieved by the computing device; where performing a hash of the first, second, and third hash input message elements further comprises performing a hash of the third hash input message element and a hash of the first and second hash input message elements to generate the Hash Contract; where the key is a single-use key; where the key is separately generated by a second computing device separate from the computing device without all inputs used to generate the key being communicated between the second computing device and the computing device such that the Hash Contract generated based at least in part on the key exhibits security features that prevent a third computing device spoofing the computing device from recreating the Hash Contract; where the third hash input message element comprises a previously generated third hash code; where the computer-implemented method further comprises concatenating the first hash input message element and the second hash input message element to form a string, and performing a hash of the string to generate the Hash Contract; where the string comprises the first hash input message element appended to an end of the second hash input message element; where an order of the concatenation of the first hash input message element and the second hash input message element varies per transaction, per set of transactions, per user, per group of users, per network, per set of networks, or per time period; where a hash function tag is appended to the Hash Contract, where the hash function tag comprises an identification of a hash function used to generate the Hash Contract such that a second computing device that receives the Hash Contract can determine that the hash function should be used to generate the second Hash Contract; where the hash function comprises a cryptographic hash function; where the Hash Contract is structured in a manner such that content of the agreement remains confidential even if a malicious computing device intercepts a transmission of the Hash Contract; where the Hash Contract is associated with device metadata that identifies the computing device that generated the Hash Contract; where the agreement is a first counterpart agreement; where a second computing device is configured to reject a transaction in response to a determination that the Hash Contract matches a third Hash Contract generated by the second computing device; where a second computing device is configured to determine that fraudulent activity has occurred in response to a determination that the Hash Contract does not match a third Hash Contract generated by the second computing device; where a computing device is configured to display a user interface comprising a selectable link identifying the Hash Contract, where selection of the link causes the user interface to display content of the agreement; where the Hash Contract has a file size that is smaller than a file size of an electronic document that comprises content of the agreement; where the Hash Contract is structured in a manner such that a malicious device that intercepts a transmission of the Hash Contract cannot determine the first hash input message element or the second hash input message element using the intercepted Hash Contract; where a second computing device is configured to authenticate an identity of a user that caused generation of the Hash Contract in response to a determination that the Hash Contract matches the second Hash Contract generated by the second computing device; and where the computer-implemented method further comprises encrypting the Hash Contract using at least one a private key or a public key.

Another aspect of the disclosure provides a Hash Contract hash function fixed on a non-transitory computer-readable medium. The Hash Contract hash function comprises computer-executable instructions that, when executed based on an input message comprising different agreement elements, create a binding agreement represented as a hash code, where the hash code is structured in a manner such that a comparison of the hash code with a second, matching hash code results in authentication of the binding agreement.

The Hash Contract hash function of the preceding paragraph can include any sub-combination of the following features: where the Hash Contract hash function is deterministic; where the Hash Contract hash function is collisionless; where the input message cannot be derived from the hash code; where the Hash Contract hash function is one of SHA-256 or SHA-512; and where the Hash Contract hash function is a cryptographic hash function.

Another aspect of the disclosure provides a computer-implemented method for verifying a user identity. The computer-implemented method comprises: as implemented by a computing device having one or more processors, receiving a first user input corresponding to an identity of a user; receiving a second user input corresponding to the identity of the user; converting the first user input into a first value; converting the second user input into a second value; and generating a hash of a representation of the first value and a representation of the second value to form an identity hash, where the identity hash is structured in a manner such that a comparison of the identity hash with a second, matching identity hash results in authentication of the user.

The computer-implemented method of the preceding paragraph can include any sub-combination of the following features: where the computer-implemented method further comprises identifying an identifier associated with the computing device, generating a hash of the identifier to form a terminal hash, and generating a hash of the identity hash and the terminal hash to form an authentication hash, where the authentication hash is structured in a manner such that a comparison of the authentication hash with a second, matching authentication hash results in authentication of the computing device and the user; where the computer-implemented method further comprises generating a hash of the identity hash and a first code to form a keyed identity hash, and generating a hash of the keyed identity hash and the terminal hash to form the authentication hash; where the computer-implemented method further comprises generating a hash of a first code and the identifier to form a keyed terminal hash, and generating a hash of the identity hash and the keyed terminal hash to form the authentication hash; where the computer-implemented method further comprises generating a hash of the identity hash and a first code to form a keyed identity hash, generating a hash of a second code and the identifier to form a keyed terminal hash, and generating a hash of the keyed identity hash and the keyed terminal hash to form the authentication hash; where the identifier associated with the computing device comprises at least one of a media access control (MAC) address of the computing device, an Internet protocol (IP) address of the computing device, or a peripheral identification of the computing device; where the computer-implemented method further comprises transmitting the authentication hash to a second computing device over a network such that the second computing device uses the authentication hash as a representation of the identity of the user during generation of a Hash Contract; where the computer-implemented method further comprises storing the identity hash in memory of the computing device, deleting the first value and the second value, and transmitting the identity hash to a server system over a network such that the server system uses the identity hash to verify the identity of the user when a transaction request is received at a time after a current time; where the computer-implemented method further comprises transmitting the identity hash to a server system over a network such that the server system uses the identity hash as a representation of the identity of the user during generation of a Hash Contract; where the first user input comprises at least one multi-factor authentication factor; where the representation of the first value comprises a hash of the first value; and where the computing device is one of a kiosk or an automated teller machine.

Another aspect of the disclosure provides a computer-generated, verifiable identity hash fixed on a non-transitory computer-readable medium. The identity hash comprises a hash code generated based on a hash function applied to a user input corresponding to an identity of a user, where the hash function, when executed, creates a representation of the identity of the user, where the identity hash is structured in a manner such that a comparison of the identity hash with a second, matching identity hash results in authentication of the user.

The computer-generated, verifiable identity hash of the preceding paragraph can include any sub-combination of the following features: where a hash of the hash code and a first single-use code forms a keyed identity hash; where a hash of the keyed identity hash and a keyed terminal hash forms an authentication hash, where the authentication hash is structured in a manner such that a comparison of the authentication hash with a second, matching authentication hash results in authentication of the user; where the authentication hash is used by a computing device as a representation of the identity of the user during generation of a Hash Contract; where the hash code is used by a computing device to verify the identity of the user when a transaction request is received at a time after a current time; where the hash code is used by a computing device as a representation of the identity of the user during generation of a Hash Contract; and where the user input comprises at least one multi-factor authentication factor.

Another aspect of the disclosure provides an input message fixed on a non-transitory computer-readable medium. The input message comprises: a first user input corresponding to an identity of a user; and a second user input different than the first user input, the second user input corresponding to the identity of the user, where a hash function, when executed based on a representation of the first user input and a representation of the second user input, creates an identity hash, and where the identity hash is structured in a manner such that a comparison of the identity hash with a second, matching identity hash results in authentication of the user.

The input message of the preceding paragraph can include any sub-combination of the following features: where a hash of the identity hash and a first single-use code forms a keyed identity hash; where a hash of the keyed identity hash and a keyed terminal hash forms an authentication hash, where the authentication hash is structured in a manner such that a comparison of the authentication hash with a second, matching authentication hash results in authentication of the user; where the authentication hash is used by a computing device as a representation of the identity of the user to generate a Hash Contract; where the identity hash is used by a computing device to verify the identity of the user when a transaction request is received at a time after a current time; where the identity hash is used by a computing device as a representation of the identity of the user to generate a Hash Contract; where the representation of the first user input comprises a hash of the first user input; and where the first user input comprises at least one multi-factor authentication factor.

Another aspect of the disclosure provides a computer-implemented method comprising: as implemented by a computing device having one or more processors, receiving a request to confirm that a user authorized a transaction; transmitting a transaction authorization request to a user device in response to receiving the request to confirm that the user authorized the transaction; receiving, in response to the transaction authorization request, a hash code from the user device, where the hash code is generated by the user device based at least in part on a hash of at least one input message element corresponding to the agreement; and comparing the hash code with an acceptance hash code and a decline hash code to determine whether the user authorized the transaction.

The computer-implemented method of the preceding paragraph can include any sub-combination of the following features: where the computer-implemented method further comprises transmitting a response indicating that the transaction is authorized in response to a determination that the hash code and the acceptance hash code match; where the computer-implemented method further comprises transmitting a response indicating that the transaction is denied in response to a determination that the hash code and the decline hash code match; where the computer-implemented method further comprises transmitting an instruction to suspend an account associated with the user in response to a determination that the hash code does not match the Hash Contract or the decline hash code; where the computer-implemented method further comprises generating a hash of the at least one input message element corresponding to the agreement and a value representing an acceptance of the agreement to generate the acceptance hash code, and generating a hash of the at least one input message element corresponding to the agreement and a value representing a rejection of the agreement to generate the decline hash code; where the at least one input message element comprises a first key; where the computer-implemented method further comprises receiving an identity value from the user device prior to receiving the request to confirm that the user authorized the transaction, where the identity value is generated based on a hash of a value corresponding to an input that identifies the user, retrieving an initialization key associated with the user device from a local data store, generating a master key based on the identity value and the initialization key, generating an authentication request for transmission to the user device, and determining a hash of the authentication request and the master key to generate the first key; where the input that identifies the user comprises at least one multi-factor authentication factor; where the identity value comprises one of an identity hash or an authentication hash; where the computing device is operated by one of a card issuing bank, credit reporting agency, a network-based data storage provider, an electronic transaction provider, or an electronic payment provider; where transmitting a transaction authorization request to a user device further comprises transmitting the transaction authorization request to the user device via a second computing device representing a point of sale; and where transmitting a transaction authorization request to a user device further comprises transmitting the transaction authorization request directly to the user device via a network.

Another aspect of the disclosure provides a computer-implemented method for generating a secure hash function input message. The computer-implemented method comprises: as implemented by a computing device having one or more processors, identifying a first hash input message format corresponding to a first user; obtaining a first hash input message element and a second hash input message element corresponding to a first transaction associated with the first user; combining a representation of the first hash input message element and a representation of the second hash input message element according to the first hash input message format to form a first combined element; performing a hash of the first combined element to generate a first hash code; identifying a second hash input message format corresponding to a second user, where the second hash input message format is different than the first hash input message format; obtaining a third hash input message element and a fourth hash input message element corresponding to a second transaction associated with the second user; combining a representation of the third hash input message element and a representation of the fourth hash input message element according to the second hash input message format to form a second combined element; and performing a hash of the second combined element to generate a second hash code such that the first hash code is different than the second hash code even if the first hash input message element matches the third hash input message element and the second hash input message element matches the fourth hash input message.

The computer-implemented method of the preceding paragraph can include any sub-combination of the following features: where the first hash code is a Hash Contract; where the first hash code is a decline hash code; where identifying a first hash input message format corresponding to the first user further comprises determining the first hash input message format based on a value of an initialization key included within an application running on the computing device; where the computer-implemented method further comprises storing the first hash input message format in response to determining the first hash input message format; where combining a representation of the first hash input message element and a representation of the second hash input message element according to the first hash input message format further comprises concatenating the second hash input message element to an end of the first hash input message element to form the first combined element; where combining a representation of the third hash input message element and a representation of the fourth hash input message element according to the second hash input message format further comprises concatenating the third hash input message element to an end of the fourth hash input message element to form the second combined element; and where the first hash input message and the third hash input message are the same, and where the second hash input message and the fourth hash input message are the same.

Another aspect of the disclosure provides an input message fixed on a non-transitory computer-readable medium. The input message comprises: a first input message element; and a second input message element different than the first input message element, where a combination of the first input message element and the second input message element represent at least two of terms and conditions of an agreement, consideration of the agreement, an identity of a user associated with the agreement, an intent of the user to execute the agreement, or an acceptance of the agreement, where a hash function, when executed based on a representation of the first input message element and a representation of the second input message element combined according to a hash input message format, creates a hash code, and where different hash input message formats cause the creation of different hash codes even if the hash function is executed based on the same inputs.

The input message of the preceding paragraph can include any sub-combination of the following features: where the hash code is a Hash Contract; where the hash code is a decline hash code; where the hash input message format is determined based on a value of an initialization key included within an application running on a computing device that executes the hash function; where the computing device stores the hash input message format in response to determining the first hash input message format; where an order of concatenating the first input message element and the second input message element identified by the hash input message format varies per transaction, per set of transactions, per user, per group of users, per network, per set of networks, or per time period; where the hash input message format indicates that the second input message element is concatenated to an end of the first input message element; and where the representation of the first input message element comprises a hash of the first input message element.

Another aspect of the disclosure provides a computer-implemented method for seeding a security key. The computer-implemented method comprises: as implemented by a first computing device having one or more processors, retrieving an application from an application distribution server; unpacking the application to identify an initialization key, where the initialization key is included within the application by a second computing device before the application is provided to the application distribution server; retrieving an identifier associated with the first computing device; and generating a hash of the identifier and the initialization key to form the security key, where the security key is stored locally by the computing device, is inaccessible to any computing device external to the first computing device, and can be recreated by the second computing device using the initialization key included by the second computing device in the application.

The computer-implemented method of the preceding paragraph can include any sub-combination of the following features: where the computer-implemented method further comprises transmitting an authentication transaction request, where the authentication transaction request comprises the identifier associated with the first computing device, receiving a message in response to transmitting the authentication transaction request, and generating a hash of the message and the security key to form a first key, where the second computing device recreates the first key using the authentication transaction request and the security key recreated by the second computing device such that neither the security key nor the first key are transmitted over a network; where the first key is a symmetric key; where the message is a zero transaction; where the security key is a symmetric key; where the security key comprises a master key; where the application comprises a mobile application; and where the identifier associated with the first computing device comprises at least one of a media access control (MAC) address of the first computing device, an Internet protocol (IP) address of the first computing device, a peripheral identification of the first computing device, an identity of a user, or an authentication hash.

Another aspect of the disclosure provides a computer-generated, verifiable Hash Contract fixed on a non-transitory computer-readable medium. The Hash Contract comprises a hash code generated based on a hash function, where the hash function, when executed, creates a binding agreement, where the hash code comprises the binding agreement, and where the hash code is structured in a manner such that a comparison of the hash code with a second, matching hash code results in authentication of the Hash Contract.

The computer-generated, verifiable Hash Contract of the preceding paragraph can include any sub-combination of the following features: where the computer-generated, verifiable Hash Contract further comprises a hash function tag appended to the hash code, where the hash function tag comprises an identification of the hash function used to generate the hash code such that a computing device that receives the hash code can determine that the hash function should be used to generate the second hash code; where the hash code is associated with metadata that identifies at least one of system requirements, transaction information, a computing device that generated the hash code, or a user associated with the binding agreement; where the hash function comprises a cryptographic hash function; where the hash code is structured in a manner such that content of the binding agreement remains confidential even if a malicious computing device intercepts a transmission of the hash code; where a computing device is configured to authorize a transaction in response to a determination that the hash code matches the second hash code generated by the computing device; where a computing device is configured to reject a transaction in response to a determination that the hash code does not match the second hash code generated by the computing device; where a computing device is configured to determine that fraudulent activity has occurred in response to a determination that the hash code does not match the second hash code generated by the computing device or a third hash code generated by the computing device, where the second hash code is a second Hash Contract and the third hash code is a decline hash code; where a computing device is configured to display a user interface comprising a selectable link identifying the hash code, where selection of the link causes the user interface to display at least a portion of content of the binding agreement; where the hash code has a file size that is smaller than a file size of an electronic document that comprises content of the binding agreement; where the hash code is structured in a manner such that a malicious device that intercepts a transmission of the hash code cannot determine input message elements to which a computing device applies the hash function to generate the hash code using the intercepted hash code; where the hash function is applied, by a computing device, to at least two of first text that represents terms and conditions, second text that represents consideration, a first value corresponding to a user input that indicates that a user accepts the terms and conditions and the consideration, or first data corresponding to an identity of the user to generate the hash code; and where a computing device is configured to authenticate an identity of a user that caused generation of the hash code in response to a determination that the hash code matches the second hash code generated by the computing device.

Another aspect of the disclosure provides a Hash Contract hash function input message fixed on a non-transitory computer-readable medium. The input message comprises: a first input message element; and a second input message element different than the first input message element, where a combination of the first input message element and the second input message element represent at least two of terms and conditions of an agreement, consideration of the agreement, an identity of a user associated with the agreement, an intent of the user to execute the agreement, or an acceptance of the agreement, where the Hash Contract hash function, when executed based on a representation of the first input message element and a representation of the second input message element, creates a binding agreement represented as a hash code, and where the hash code is structured in a manner such that a comparison of the hash code with a second, matching hash code results in authentication of the agreement.

The input message of the preceding paragraph can include any sub-combination of the following features: where the representation of the first input message element comprises a hash of the first input message element; and where the identity of the user comprises a hash value resulting from a second hash function applied to a value corresponding to an input that represents the identity of the user.

Another aspect of the disclosure provides a computer-implemented method for generating a verifiable Hash Contract. The computer-implemented method comprises: as implemented by a computing device having one or more processors, receiving a first hash input message element and a second hash input message element, where the second hash input message element is different than the first hash input message element, where a combination of the first hash input message element and the second hash input message element represent at least two of terms and conditions of an agreement, consideration of the agreement, an identity of a user associated with the agreement, an intent of the user with regards to the agreement, or an acceptance of one or more elements of the agreement; and performing a hash of a representation of the first hash input message element and a representation of the second hash input message element to generate the Hash Contract, where the Hash Contract represents an execution of the agreement, and where the Hash Contract is structured in a manner such that a comparison of the Hash Contract with a second, matching Hash Contract results in authentication of the Hash Contract.

The computer-implemented method of the preceding paragraph can include any sub-combination of the following features: where the representation of the first hash input message element comprises a hash of the first hash input message element; where the identity of the user comprises a hash value resulting from a second hash function applied to a value corresponding to an input that represents the identity of the user; and where the computer-implemented method further comprises receiving a third hash input message, and performing a hash of the first, second, and third hash input message elements to generate the Hash Contract.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 21 illustrates an example user interface that may be display a transaction ledger in a window.

DETAILED DESCRIPTION OF SPECIFIC EMBODIMENTS

Introduction to Hash Contracts and Decline Hash Codes

As described above, it may be difficult for contracting parties to provide verifiable intent to enter into or acceptance of a contract and/or to securely transmit contract data (for example, contract elements, the contract itself, or other important contract related information) to another party given the unsecured nature of public networks. Therefore, a product, method, and/or system that expands the use of electronic contracts, that simplifies the networked contracting process by efficiently reducing the amount of transmitted data, and that binds contract elements together in a manner that allows for the secure transmission of data may be beneficial.

Accordingly, a hash contract is disclosed herein. A hash contract may be a value generated by a computing device using a hash function. The hash contract itself may represent or constitute a legally enforceable contract (for example, an executed agreement, a binding agreement, a legally binding agreement, etc.). As described herein, the hash contract may be structured in a manner such that a device operated by a contracting party can transmit a legally enforceable contract over a network using a smaller file size than is possible with conventional techniques. In addition, the manner in which the hash contract is generated allows a receiving device to verify that the contract elements that form the contract are as expected and to verify an identity of a user that allegedly executed the agreement. Thus, even if a malicious user attempts to alter contract elements or perform other fraudulent activity, the receiving device can use the hash contract to identify such activity and prevent a transaction (for example, an agreement, communication, and/or movement carried out between a first party and a second party to exchange goods or services, to exchange an item for payment, etc.) from being completed.

Figure 1A:
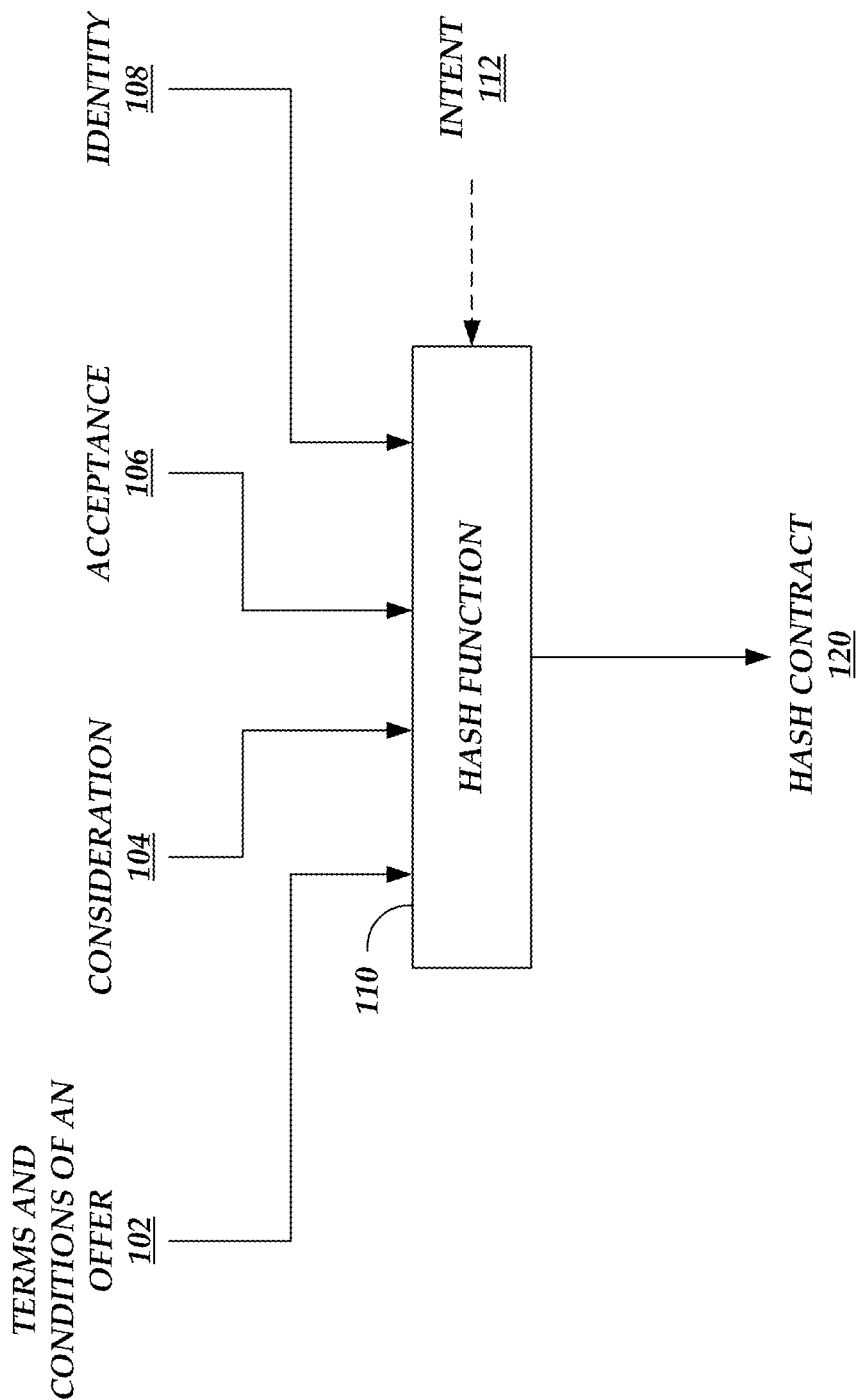
FIG. 1A illustrates an exemplary block diagram depicting the inputs to a hash function that may be used to form a hash contract.

FIG. 1A illustrates an exemplary block diagram depicting the inputs to a hash function 110 that may be used to form a hash contract 120. In an embodiment, a computing device stores computer-executable instructions that, when executed, cause the computing device to apply the hash function 110 to a set of inputs to form the hash contract 120. As illustrated in FIG. 1A, the hash function 110 may be applied to contract elements to form the hash contract 120. For example, the contract elements can include terms and conditions of an offer 102, consideration 104, acceptance 106, and identity 108. Optionally, the contract elements can also include intent 112. In some cases, identity 108 may be encompassed within acceptance 106 and therefore a separate identity 108 contract element may not be provided to the hash function 110.

In contract law, an offer is a manifestation of a willingness or intent to enter into a bargain with another party demonstrated by a promise, undertaking, or commitment. Thus, terms and conditions of the offer 102 may be data that represents phrases, clauses, definitions, and/or other statements that define the terms on which a party (for example, an offeror) is willing to be bound to a promise, undertaking, or commitment. Consideration 104 may be data that represents an exchange of bargained-for promises between two or more contracting parties. For example, consideration 104 may be data that represents a monetary value or a promise to perform or not perform an action.

The computing device that applies the hash function 110 and/or another computing device can convert information representing the terms and conditions of an offer and/or the consideration into an electronic format before the hash function 110 is applied. For example, the computing device that applies the hash function 110 and/or another computing device can (1) scan a physical or digital document that includes terms and conditions of an offer and consideration; (2) apply optical character recognition techniques to convert the scanned data into machine-encoded text; and (3) apply natural language processing techniques to the machine-encoded text to identify the terms and conditions of the offer 102 and the consideration 104. In particular, the computing device that applies the hash function 110 and/or another computing device can train a natural language model to identify the terms and conditions of the offer 102 and/or the consideration 104, where the natural language model is trained using a set of contracts that are each labeled to identify terms and conditions of an offer and/or consideration. Alternatively, the terms and conditions of an offer 102 and/or the consideration 104 may already be in a machine-encoded text format (for example, because such information was provided as user input on a computing device).

Acceptance 106 may be data that represents a manifestation of an assent by an offeree to the terms and conditions of an offer. For example, as described in greater detail below, a user (for example, an offeree) may be prompted by a computing device to select whether the user accepts the terms and conditions of the offer 102 and/or the consideration 104. If the user elects to accept the terms and conditions of the offer 102 and/or the consideration 104 (for example, via the selection of a button or a box, via a text input indicating the acceptance, etc.), this selection may be represented by a specific value associated with an acceptance that can be used as an input to the hash function 110 (for example, an alphanumeric value, a hexadecimal value, etc.). Conversely, if the user elects not to accept the terms and conditions of the offer 102 and/or the consideration 104 (for example, via the selection of a button or a box, via a text input indicating a rejection of the terms and conditions of the offer 102 and/or the consideration 104, etc.), then this selection may be represented by a different value associated with a rejection of the terms and conditions of the offer 102 and/or the consideration 104 (for example, a different alphanumeric value, a different hexadecimal value, etc.). The value representing the user electing not to accept the terms and conditions of the offer 102 and/or the consideration 104 can be used as an input to the hash function 110 to form a decline hash code (described below with respect to FIG. 1B).

Generally, the identity of an offeree that accepts an offer can be verified by reviewing a handwritten signature or a digital signature. However, as described in greater detail below, the hash contract 120 can be generated and verified without the use of any signature. Instead, a user (for example, an offeree) may provide an input that uniquely represents an identity of the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). An input that uniquely represents an identity of the user can also be referred to "personally identifiable information." A computing device that receives the input may convert the input into a value (for example, an alphanumeric value, a hexadecimal value, etc.) and then generate a hash of the value to form an identity hash code. The identity hash code may be the identity 108 input received by the hash function 110 to form the hash contract 120.

For the acceptance of an offer to be valid, the offeree must intend to accept the offer. To capture an intent of an offeree to accept an offer, as described in greater detail below, a user (for example, offeree) may be prompted by a computing device to select whether the user intends to accept the terms and conditions of the offer 102 and/or the consideration 104. If the user identifies an intention to accept the terms and conditions of the offer 102 and/or the consideration 104 (for example, via the selection of a button or a box, via a text input indicating the intention, etc.), this selection may be represented by a specific value associated with an intention to accept that can be used as an input to the hash function 110 (for example, an alphanumeric value, a hexadecimal value, etc.). Intent 112 is optional because, for example, an intent to accept the terms and conditions of the offer 102 and/or the consideration 104 may be implied or inherent within an acceptance of the terms and conditions of the offer 102 and/or the consideration 104 (for example, acceptance 106 may be a value that also represents an intent of a user to enter into a legally enforceable contract).

The hash function 110 may be any cryptographic or non-cryptographic hash function. For example, the hash function 110 may be the Fowler-Noll-Vo (FNV) hash function, the Murmurhash hash function, MD5, SHA-256, SHA-512, and/or the like. The type of hash function 110 used by a computing device to generate the hash contract 120 may determine a size of the hash contract 120. For example, if the hash function 110 is SHA-256, then the hash contract 120 may be 256 bits. As another example, if the hash function 110 is SHA-512, then the hash contract 120 may be 512 bits. Generally, the hash contract 120 may range in size from a few bits to 1024 bits (or additional bits as further hash functions are introduced). In fact, as long as a computing device uses the same hash function 110 to generate hash contracts 120, then each hash contract 120 will have a constant size no matter the size of the hash function 110 inputs (for example, the size of an electronic copy of the contract elements may not affect the size of the hash contract 120). As described below, when compared with a typical electronic document that represents a contract, the small and constant size of a hash contract 120 results in reduced network bandwidth usage when a computing device attempts to transmit a legally enforceable contract over a network. Thus, the hash contract 120 expands the use of digital and/or electronic contracts by allowing such contracts to be used in situations in which it is otherwise impractical to use typical electronic documents that represent a contract (for example, when network bandwidth is limited, when memory storage space is limited, and/or other situations in which computing resources are limited).

In some cases, a user may decline an offer (for example, decline to enter into a legally enforceable contract). The rejection of an offer can also be represented as a hash value, referred to herein as a decline hash code. A decline hash code may therefore represent an offer that has been rejected by one or more users. As described in greater detail below, a decline hash code may provide several benefits. For example, a decline hash code, when analyzed in conjunction with a hash contract, can allow a computing device to determine whether a user has entered into a contract, whether a user has declined to enter into a contract, or whether data representing the terms and conditions and/or the consideration of an offer have been altered and/or other fraudulent activity has taken place without requiring that an actual document be transmitted to the computing device.

Figure 1B:
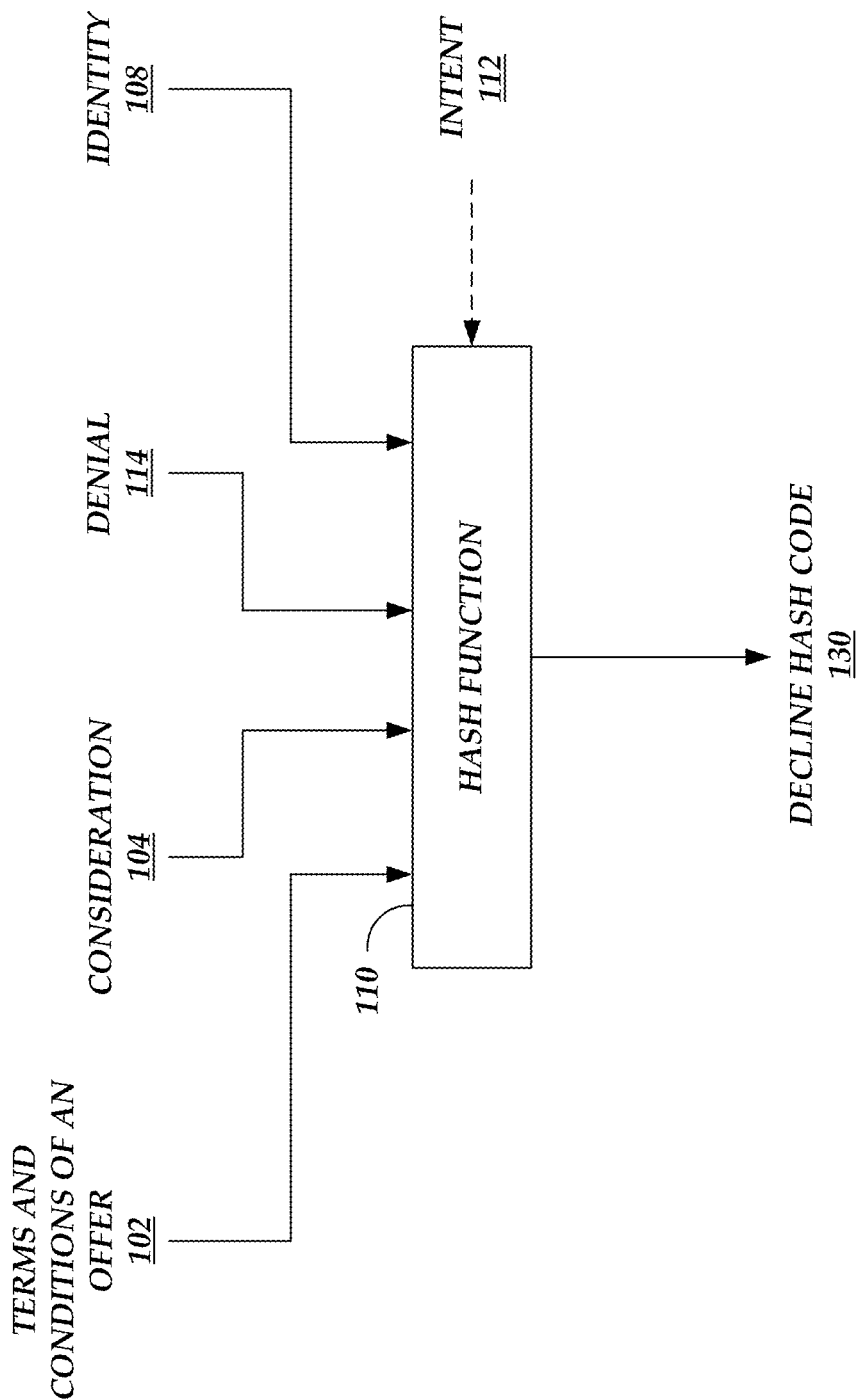
FIG. 1B illustrates an exemplary block diagram depicting the inputs to the hash function that may be used to form a decline hash code.

FIG. 1B illustrates an exemplary block diagram depicting the inputs to the hash function 110 that may be used to form a decline hash code 130. In an embodiment, a computing device stores computer-executable instructions that, when executed, cause the computing device to apply the hash function 110 to a set of inputs to form the decline hash code 130. As illustrated in FIG. 1B, the hash function 110 may receive the same inputs as described above with respect to FIG. 1A, except that instead of receiving acceptance 106, the hash function receives denial 114 as an input in order to form the decline hash code 130.

Denial 114 may be data that represents a rejection by an offer by an offeree, a counteroffer proposed by the initial offeree, and/or a conditional acceptance of an offer by an offeree. For example, as described in greater detail below, a user may be prompted by a computing device to select whether the user accepts the terms and conditions of the offer 102 and/or the consideration 104. If the user elects not to accept the terms and conditions of the offer 102 and/or the consideration 104 (for example, via the selection of a button or a box, via a text input indicating a rejection of the offer, a proposed counter offer, or a conditional acceptance, etc.), this selection may be represented by a specific value associated with a rejection of the terms and conditions of the offer 102 and/or the consideration 104 (for example, an alphanumeric value, a hexadecimal value, etc.). This value can be denial 114 and be provided as an input to the hash function 110.

Thus, a computing device may implement the same process to generate the hash contract 120 and the decline hash code 130. Whether the computing device generates the hash contract 120 or the decline hash code 130 may depend on whether a user elects to accept the terms and conditions and/or consideration of an offer.

While FIG. 1A and FIG. 1B depict terms and conditions of an offer 102, consideration 104, acceptance 106, identity 108, intent 112, and/or denial 114 as being possible inputs to the hash function 110, this is not meant to be limiting. The hash function 110 may receive fewer or additional inputs in forming the hash contract 120. For example, as described in greater detail below, the hash function 110 may further receive as input(s) a security key (for example, a symmetric key), a previous hash contract, a previous decline hash code, and/or any combination thereof.

Digital Signatures Versus Hash Contracts

Figure 2:
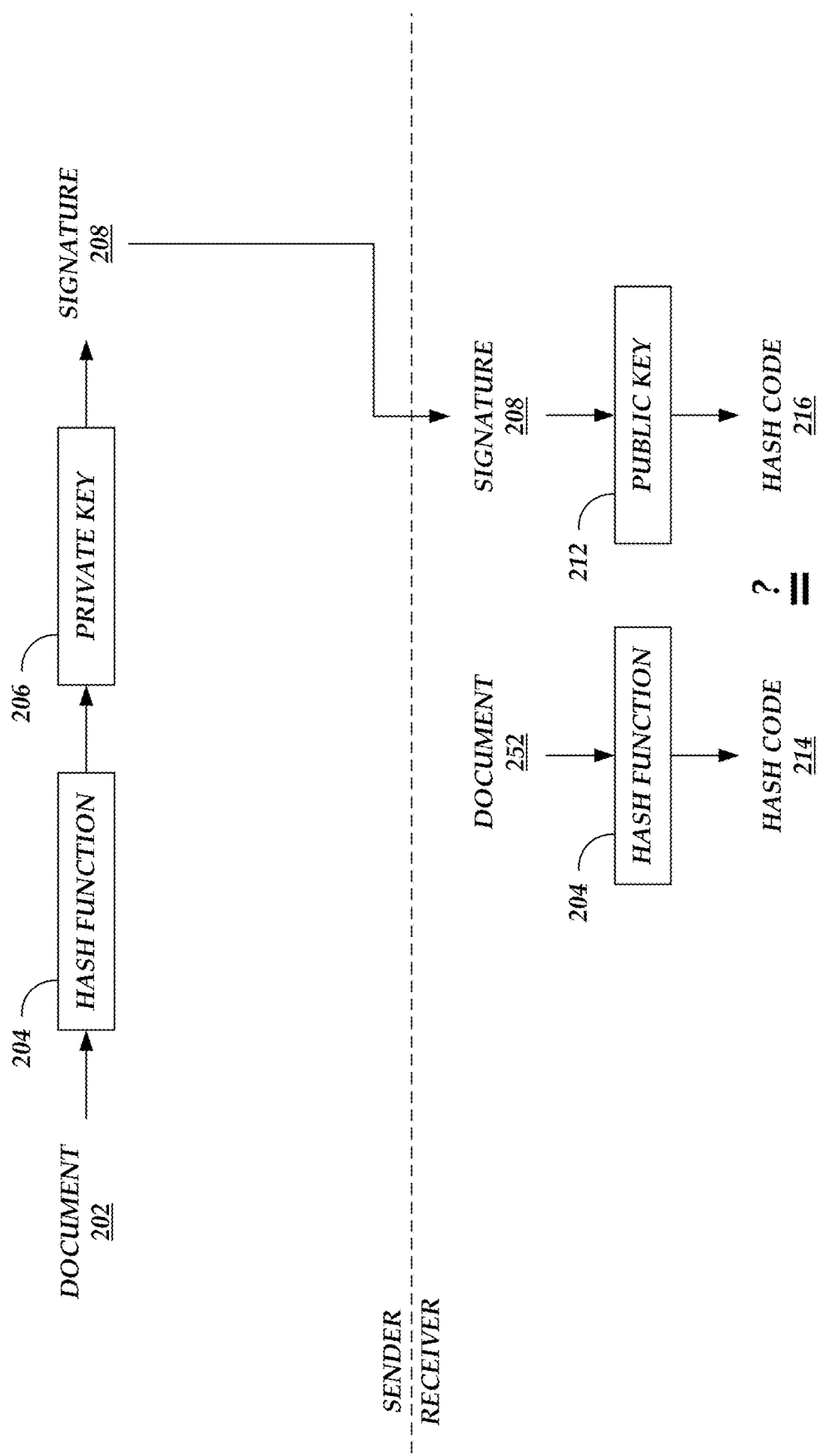
FIG. 2 illustrates an exemplary block diagram depicting the transmission of a digital signature and a verification that a document is signed.

In one example, a computing device may use asymmetric cryptography (for example, private and public keys) to transmit a legally enforceable contract over a network. FIG. 2 illustrates an exemplary block diagram depicting the transmission of a digital signature 208 and a verification that a document 202 is signed. As illustrated in FIG. 2, the document 202 may be stored on a computing device operated by a sender. The document 202 may include contract elements, such as terms and conditions of an offer and/or consideration. However, the document 202 itself may not include any indication that the sender intends to accept or that the sender has accepted the terms and conditions and/or consideration of the offer. Separately, a computing device operated by a receiver may have a copy of the document 202, represented as document 252. For example, the sender and receiver may have previously exchanged the document 202 and/or the computing devices operated by the sender and receiver, respectively, may be able to independently recreate the document 202 based on information exchanged between the two computing devices at a previous time.

In order to indicate that the sender has accepted the terms and conditions and/or consideration of the offer, the sender may digitally sign the document 202. For example, the computing device operated by the sender may apply a hash function 204 to the document 202 to form a hashed version of the document 202. The computing device may then encrypt the hashed version of the document 202 using a private key 206 to form a digital signature 208. This encryption may be important because it allows the sender computing device to securely transmit a verifiable digital signature over a network that can be used to determine whether a contract has been executed. Alternatively, the computing device can encrypt the document 202 using the private key 206 to form the digital signature 208.

The computing device operated by the sender may then transmit the digital signature 208 to the computing device operated by the receiver. In some embodiments, the computing device operated by the sender can also transmit the document 202 to the computing device operated by the receiver. The computing device operated by the receiver may then perform a series of operations to verify that the sender is the entity that accepted the document 202. For example, the computing device operated by the receiver can apply the same hash function 204 to a different copy of the document 202 (for example, document 252) to form a hash code 214.

At a previous time, the sender may have provided the receiver with a public key 212 associated with the sender. The public key 212 may be paired with the private key 206 such that the public key 212 can be used to decrypt data encrypted with the private key 206. Thus, the computing device operated by the receiver may decrypt the signature 208 using the public key 212 to form a hash code 216.

Accordingly, the computing device operated by the receiver has performed one operation that is identical to an operation performed by the computing device operated by the sender and one operation that is the reverse of an operation performed by the computing device operated by the sender. In particular, both computing devices generated a hash using a copy of the document 202 or 252. In addition, instead of encrypting this hash using the private key 206, the computing device operated by the receiver has decrypted an encrypted hash using the public key 212. Thus, the computing device operated by the receiver can verify that the sender is the entity that accepted the document 202 if the hash code 214 and the hash code 216 match. The document 202 or 252 and the digital signature 208 together may represent a legally enforceable contract if the hash codes 214 and 216 do match.

Alternatively, if the sender computing device encrypts the document 202 using the private key 206 to form the digital signature 208, then the receiver computing device can decrypt the digital signature 208 using the public key 212, which results in a document. The receiver computing device can then compare the resulting document with the document 252 to verify that the sender is the entity that signed the document 202 (for example, the sender is verified if the resulting document and the document 202 match).

The process described above for using digital signatures to create and transmit legally enforceable contracts, however, has several weaknesses. For example, the process relies on the computing device operated by the sender having access to the private key 206 and the computing device operated by the receiver having access to the public key 212 so that the sender computing device can securely transmit a legally enforceable contract over a network. Hardware failures can occur (for example, a disk storage device can fail), though, which may result in one or both keys 206 and 212 being lost. In addition, the private key 206 and/or the public key 212 may become exhausted (for example, the key can no longer be used because the key is compromised, has been used above a threshold number of times, has been active above a threshold time period, etc.). Thus, one or both computing devices may have to devote computing resources (for example, disk space, processor time, central processing power, graphical processing power, memory, network bandwidth, internal bus utilization, etc.) for managing keys such that a new key is generated and/or a key exchange is performed if a hardware failure occurs or a key becomes exhausted.

As another example, the use of the private key 206 and the public key 212 creates a security vulnerability that ultimately prevents an accurate verification of an offeree's intention to accept and/or acceptance of an offer. Specifically, digitally signed documents may be susceptible to man-in-the-middle and/or spoofing attacks if the private key 206 and/or public key 212 becomes exposed unbeknownst to the user associated with the private key 206. As an illustrative example, a malicious device can spoof the sender computing device, thereby providing a digital signature 208 that the user associated with the private key 206 did not intend to transmit. The receiver computing device may then perform the operations described above and produce a result indicating that the sender signed the document 202 because the resulting hashes match. However, this is of course not the case—the sender did not digitally sign the document 202. Thus, the sender's intention to accept and/or acceptance of an offer has not been accurately verified even with the use of private and public keys 206 and 212.

As another example, other techniques in addition to asymmetric cryptography can be used to record a sender's intention to accept an offer. Specifically, a sender may be instructed to perform a series of steps and the performance of those steps can later be audited to show the sender's intention to accept the offer. However, data identifying the sender's intention to accept the offer may not be embedded or included within the document 202 or digital signature 208. Thus, while a party attempting to enforce an apparently executed document 202 may have a copy of the document 202 and digital signature 208, it may be difficult to enforce the document 202 if, for example, the data identifying the sender's intention to accept the offer is lost.

As another example, a size of the document 202 and digital signature 208 can vary from 10 KB to as much as 100 MB or more. The size of the document 202 and digital signature 208 may largely depend on the length of and the content included within the document 202. The larger the document 202, the more network bandwidth resources that may be consumed by the sender computing device in transmitting the document 202 and/or the digital signature 208 to the receiver computing device. In addition, the larger the document 202, the more memory space that may need to be allocated by the sender and/or receiver computing device in storing the document 202 or 252 and digital signature 208.

As another example, in situations in which the digital signature 208 is an encrypted copy of the document 202, the contents of the document 202 are not secure if the digital signature 208 is transmitted over a network and a malicious device that intercepts the digital signature 208 has access to the public key 212 corresponding to the private key 206 used to encrypt the document 202. This may be problematic if the contents of the document 202, and thus the legally enforceable contract, are meant to be confidential.

As another example, encryption is temporary security. As an illustrative example, if a malicious device has sufficient time and computing power, encryption elements (for example, public keys, private keys, etc.) can be compromised, meaning that the digital signature 208 could be replicated by the malicious device. If the encryption elements are compromised, then the malicious device could sign the document 202 without the original owner of the encryption elements knowing. Similarly, as another illustrative example, a malicious device could replace a user's public key with a fake public key (for example, in a public data repository). The malicious device could then pretend to be an authorized user device by signing the document 202 using a private key that corresponds with the fake public key (which may be a private key that is different than the private key that corresponds with the user's public key). The device operated by the other party to the agreement would then successfully confirm that the user signed the document 202 because this device would retrieve the fake public key instead of the user's public key from the public data repository when performing the verification. Thus, it may be difficult to verify that the original owner is the entity that signed the document 202.

Aside from asymmetric cryptography, other mechanisms exist to transmit legally enforceable contracts. However, these other mechanisms also suffer from weaknesses. For example, Bitcoin is a digital currency that also uses a form of asymmetric cryptography. Specifically, Bitcoin balances are tied to public and private keys, which may be long strings of alphanumeric values linked through a mathematical encryption algorithm used to create the keys. The public key may be analogous to a bank account number and serves as an address that is publicly available and which others can use to send Bitcoins. The private key may be analogous to an automated teller machine (ATM) personal identification number (PIN) and is used as an owner's identity to authorize Bitcoin transmissions. However, because Bitcoin transactions also use a version of public and private keys, a contract formed via a Bitcoin transaction can suffer from the same problems as described above with respect to digital signatures. For example, if the private key is lost or exposed, an owner of the private key may lose all of his or her Bitcoins.

As another example, credit card transactions that use chip technology (for example, EUROPAY, MASTERCARD, AND VISA (EMV) standard) use both symmetric (for example, a master key) and asymmetric encryption to authenticate credit cards and complete point of sale (POS) transactions. Credit card transactions in which a card is not present (CNP transactions) use a security code present on the back of the credit card. However, a credit card holder's handwritten signature (either on paper or on a touch interface) technically completes a transaction (for example, forms a legally enforceable contract). This signature, though, is not embedded or included within the data that represents the transaction (for example, the data identifying the card holder, the amount paid, the date, etc.). Merchants typically store the signed receipts for a period of time. However, it may be difficult to enforce a transaction if, for example, the signed receipts are lost. In fact, many network-based CNP transactions and/or POS transactions do not request the credit card holder to provide a signature (for example, digital or handwritten). Thus, there may be no mechanism for verifying that the credit card holder intended to accept and/or accepted the transaction and credit card companies may merely charge higher fees to the merchant to mitigate the associated risk.

Figure 3A:
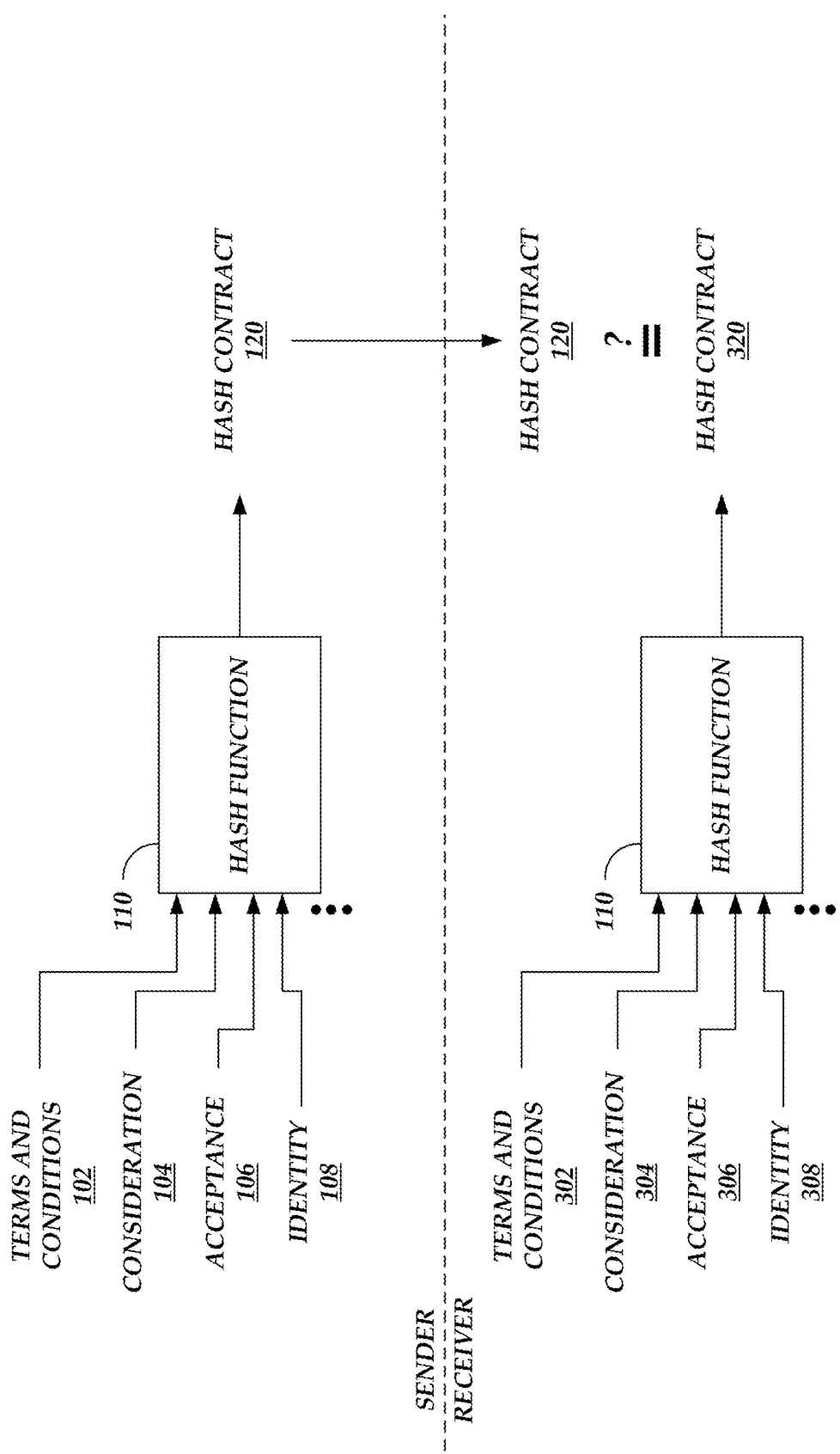
FIG. 3A illustrates an exemplary block diagram depicting the transmission and verification of a hash contract.

The properties of a hash contract may allow computing devices to overcome the above-referenced technical deficiencies associated with asymmetric cryptography, Bitcoins, and/or typical credit card transactions. FIG. 3A illustrates an exemplary block diagram depicting the transmission and verification of a hash contract 120. As illustrated in FIG. 3A, a sender computing device may generate the hash contract 120 using one or more of the inputs described above with respect to FIG. 1A. The sender computing device may then transmit the hash contract 120 to a receiver computing device.

The receiver computing device can independently generate a hash contract 320 to compare with the hash contract 120 to confirm that the hash contract 120 is unaltered and that the sender intends to accept and/or has accepted the terms and conditions of the offer 102 and/or the consideration 104. For example, the computing device operated by the receiver may obtain data representing terms and conditions of an offer (for example, terms and conditions 302) and/or data representing consideration (for example, consideration 304). The receiver may be the offeror that presented an offer to the sender at a previous time. Thus, the terms and conditions 302 may correspond to the offer presented to the sender. Likewise, the consideration 304 may correspond to the consideration included in the offer presented to the sender. Accordingly, the terms and conditions 302 should match the terms and conditions 102 and the consideration 304 should match the consideration 104 if the sender has not altered the offer.

Acceptance 306 may be represented by a specific value associated with an acceptance (for example, an alphanumeric value, a hexadecimal value, etc.). For example, the acceptance 306 value may be the same as the acceptance 106 value. In an embodiment, the sender computing device and the receiver computing device may have previously set the specific value to be used in generating future hash contracts.

As described in greater detail below, the receiver computing device may obtain identity 308 from the sender computing device at a previous time (for example, before the sender is presented with the offer) in a manner such that information that could be used to uniquely identify the sender remains hidden even if data is intercepted by a malicious device. For example, at a previous time (for example, before the sender is presented with the offer), the sender computing device may prompt the sender to provide an input that uniquely represents an identity of the sender (for example, a fingerprint, a vein reading, an iris scan, face recognition, a passcode, a single-use code, a key card, a digital certificate, a digital token, and/or any other item that represents a biological characteristic of the user, something that the user knows, or something that the user has). Once the input is received, the sender computing device may convert the input into a value (for example, an alphanumeric value, a hexadecimal value, etc.) and then generate a hash of the value to form an identity hash code. The sender computing device may then transmit the identity hash code to the receiver computing device. The receiver computing device can then store the identity hash code and use the identity hash code when generating hash contracts (or decline hash codes). Thus, the identity hash code may not be transmitted over a network by either device during a current transaction, thereby preventing malicious users from intercepting such data during a current transaction. When the sender computing device receives an offer from the receiver computing device, then the sender computing device may again prompt the sender to provide an input that uniquely represents an identity of the sender in order to generate the identity 108. If the provided input corresponds to the sender and not a malicious user, then the identity 108 and the identity 308 should match.

The sender computing device may transmit the identity hash code to the receiver computing device instead of, for example, the converted value because it may not be possible to recreate the input(s) to a hash function using a hash code. However, it may be possible to recreate the input(s) using the converted value. Thus, a malicious device that is able to intercept the identity hash code would not be able to recreate the input(s) used to create the identity hash code and that uniquely identify the sender. In other words, data that could be used to steal the sender's identity, such as the sender's fingerprint, vein reading, iris scan, face-recognition, passcode, a single-use code, a key card, digital certificate, digital token, and/or any other item that represents a biological characteristic of the user, something that the user knows, or something that the user has, would be protected even if the identity hash code is intercepted.

Additional inputs to the hash function 110 optionally may be provided, such as a symmetric key (for example, a secret key). As described in greater detail below, both the sender computing device and the receiver computing device may independently generate the same symmetric key using an independently generated master key that may be isolated from a network. Given that both the sender and receiver computing devices can independently generate the same symmetric key, it may not be necessary for the sender computing device or the receiver computing device to transmit the symmetric key over a network. Therefore, the likelihood that the symmetric key would be exposed to a malicious device is greatly diminished. Accordingly, even if some inputs to the hash function 110 are intercepted by a malicious device, the process described herein to generate a hash contract provides advantages over asymmetric cryptography described above in that the malicious device may not be able to spoof a sender computing device and generate a hash contract that would be accepted by the receiver computing device because at least one input (for example, the symmetric key) is not accessible via a network.

Once the inputs have been obtained by the receiver computing device, the receiver computing device can apply the hash function 110 to the inputs to form the hash contract 320. If the hash contract 320 matches the hash contract 120, then the receiver computing device successfully verifies that an offer is unaltered and that the sender intends to accept and/or has accepted the terms and conditions of the offer 102 and/or the consideration 104. Otherwise, if the hash contract 320 and the hash contract 120 do not match, then the receiver computing device either determines that the sender has rejected the offer or determines that fraudulent activity has occurred (as described in greater detail below).

Thus, the receiver computing device can verify that an offer is unaltered and that the sender intends to accept and/or has accepted the terms and conditions of the offer 102 and/or the consideration 104 by comparing two hash codes (for example, the hash contract 120 and the hash contract 320) generated without the use of asymmetric encryption keys. Because asymmetric encryption keys are not necessary to verify or authenticate a legally enforceable contract using the process described herein, the process described herein can avoid the weaknesses associated with private and public keys described above.

The hash contract generation and verification described herein provides additional benefits over digital signatures, Bitcoin and/or other digital currency transactions, and/or typical credit card transactions. For example, the hash contract includes or embeds the terms that define an offer, the consideration, a representation of an intention by a user to accept the offer, and the acceptance itself given that these contract elements are inputs to the hash function 110 used to generate the hash contract. Thus, issues associated with data representing a contract being separate from other data necessary to make the contract enforceable (for example, an intent of a party to accept an offer, a signature to show acceptance, etc.) are not applicable to hash contracts.

Furthermore, hash contracts have a much smaller size than typical electronic documents that represent contracts (for example, a hash contract is at least 1/80 the size of a typical electronic document that represents a contract) and the size remains constant no matter the size of the data representing the hash function inputs. Thus, as compared with other techniques used to create, transmit, and verify a legally enforceable contract (for example, asymmetric cryptography), a hash contract may allow a computing device to use fewer network bandwidth resources when transmitting or receiving a legally enforceable contract.

In addition, hash contracts expand the use of electronic contracts without preempting conventional approaches for drafting and sending contracts. For example, the techniques described herein with respect to hash contracts are specifically directed to the field of computer and network technology. The techniques described herein allow for the generation and transmission of hash codes that themselves are legally enforceable contracts and that are independently verifiable in a manner that overcomes deficiencies associated with asymmetric cryptography, credit card chip technology, Bitcoin and/or other digital currency transactions, and/or the like.

Moreover, because the generated hash contract itself represents a legally enforceable contract, the contents (for example, terms and conditions, consideration, and/or other contract elements) of the legally enforceable contract are secure and inaccessible by an unauthorized user. For example, the generated hash contract is a hash code that can be written on a piece of paper, read aloud, or entered in a machine-readable text format on a computing device. The hash code itself represents a legally enforceable contract for the reasons described herein. The legally enforceable contract represented by the hash contract can then be written down, read aloud, or entered in a machine-readable text format on a computing device in a smaller form factor than the actual content that forms the legally enforceable contract. Hash codes generated by hash functions have a unique property in that it is nearly impossible, if not impossible, to reverse the application of a hash function to identify the inputs that were used to create a hash code. Thus, reversing the application of the hash function to recreate the contract elements used to form the hash contract is nearly impossible. Accordingly, unlike with conventional asymmetric cryptography, even if the hash contract is transmitted over a network, written on a piece of paper, or read aloud and intercepted by a malicious device or user, the contents of the legally enforceable contract cannot be identified and would remain confidential.

Furthermore, a hash code generated by a hash function is not temporary security like with encryption. For example, there is no mechanism by which a malicious device could determine the inputs to the hash function that were used to generate the hash code even if the malicious device had sufficient time and computing power. As an illustrative example, if the hash function is SHA-256, applying the hash function to a single word yields a 256 bit hash code. Applying the hash function to 1000 words also yields a 256 bit hash code. There is no correlation between the size or quantity of inputs with the resulting hash code. In addition, application of the hash function to two different documents that have a single difference (for example, one additional space or character) can result in two different hash codes that do not share any common sequence of characters. Thus, the hash contract described herein provides more permanent security as compared to asymmetric cryptography, credit card chip technology, Bitcoin and/or other digital currency transactions, and/or the like.

Figure 3B:
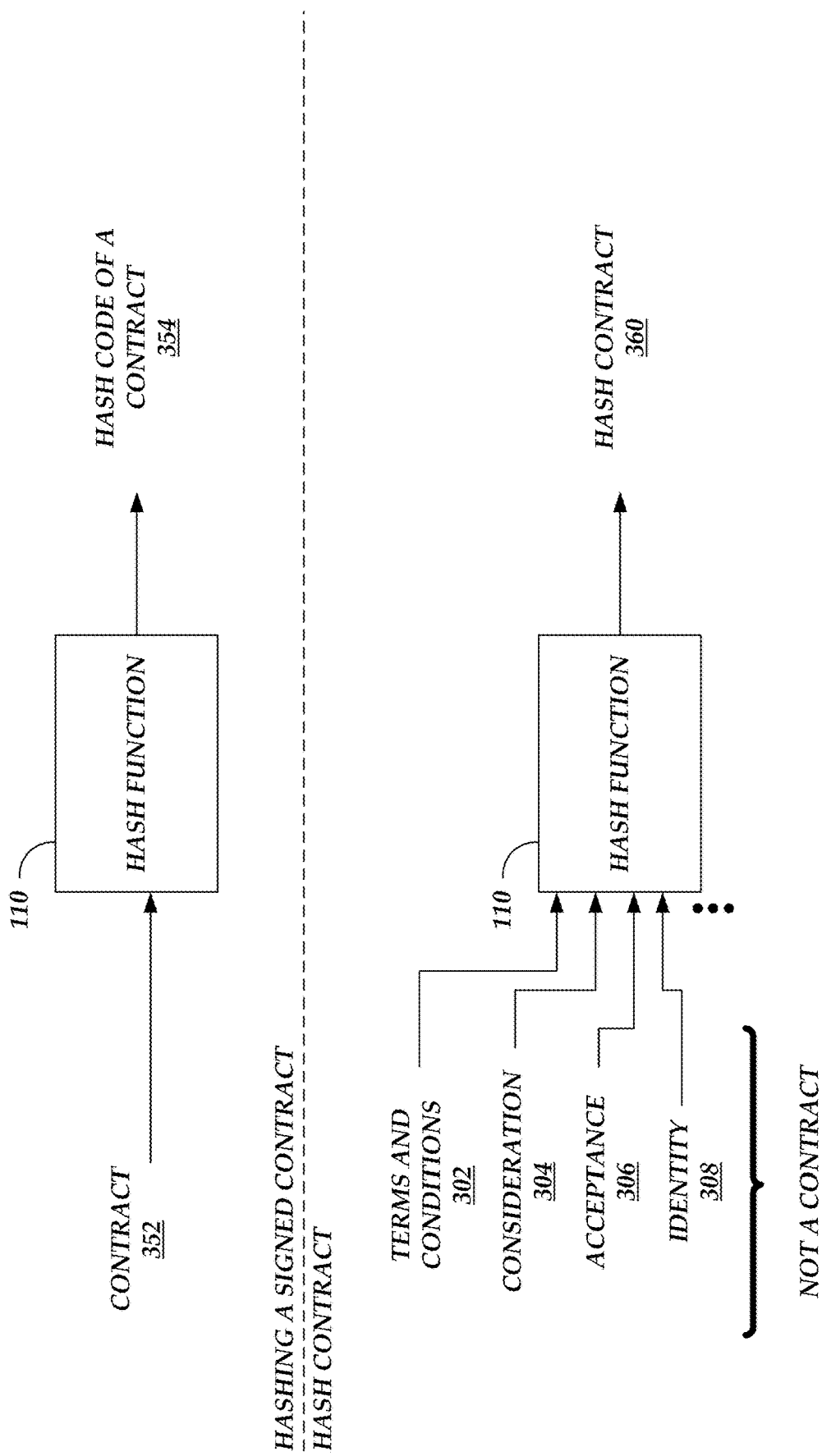
FIG. 3B illustrates an exemplary block diagram depicting differences between hashing a signed contract and a hash contract.

FIG. 3B illustrates an exemplary block diagram depicting differences between hashing a signed contract 352 and a hash contract 360. As illustrated in FIG. 3B, a hash code of a contract 354 is formed by applying the hash function 110 to the contract 352. For example, the contents of the contract 352 may be in a digital format and the contents can be hashed using the hash function 110 to form the hash code of the contract 354. The input to the hash function 110—the contract 352—represents a legally enforceable agreement. Thus, the hash code of the contract 354 is merely a hash of a legally enforceable agreement.

However, in the case of a hash contract, the contract element inputs to the hash function 110 (for example, the terms and conditions 302, the consideration 304, the acceptance 306, the identity 308, and/or the like) individually or in combination do not represent a legally enforceable agreement. Rather, the output of the hash function 110—the hash contract 360—represents a legally enforceable agreement. Thus, in the case of a hash contract, application of the hash function 110 to the contract element inputs binds the contract element inputs together to create a legally enforceable agreement.

While the disclosure describes the use of credit cards, this is not meant to be limiting. For example, the techniques described herein can be implemented with credit cards, debit cards, electronic payments, automated teller machine (ATM) deposits and/or withdrawals, digital currency (for example, crypto-currency) transactions, scheduled transactions, and/or any other type of electronic transfer of funds. Similarly, while the disclosure describes entities that can implement all or a portion of the techniques described herein as being a bank, a merchant, a credit company, or a credit reporting agency, this is not meant to be limiting. For example, other entities can include a network-based data storage provider (for example, a network-based data storage provider may authorize the transfer and/or retrieval of data based on the hash code comparisons described herein), an electronic transaction provider or user, an electronic payment provider or user, and/or the like.

In addition, while the techniques disclosed herein are described in the context of authorizing transactions, this is not meant to be limiting. For example, the techniques disclosed herein can be implemented to authenticate a user's identity, to authorize the transfer and/or retrieval of data, to authorize the execution of a computer-executable instruction (for example, to install an application update, to open an application, etc.), to instruct a physical object to perform an action (for example, to instruct a valve to open, to instruct a heating, ventilation, and air conditioning (HVAC) unit to heat or cool a structure, to instruct a lighting fixture to turn on off, etc.), and/or to authorize the performance of any other type of action.

The hash contract may provide additional technical benefits over typical network-based contract generation, use, and transmission techniques. Such benefits are described herein with respect to FIGS. 4 through 21.

Example Hash Contract Generation and Verification Environment

Figure 4:
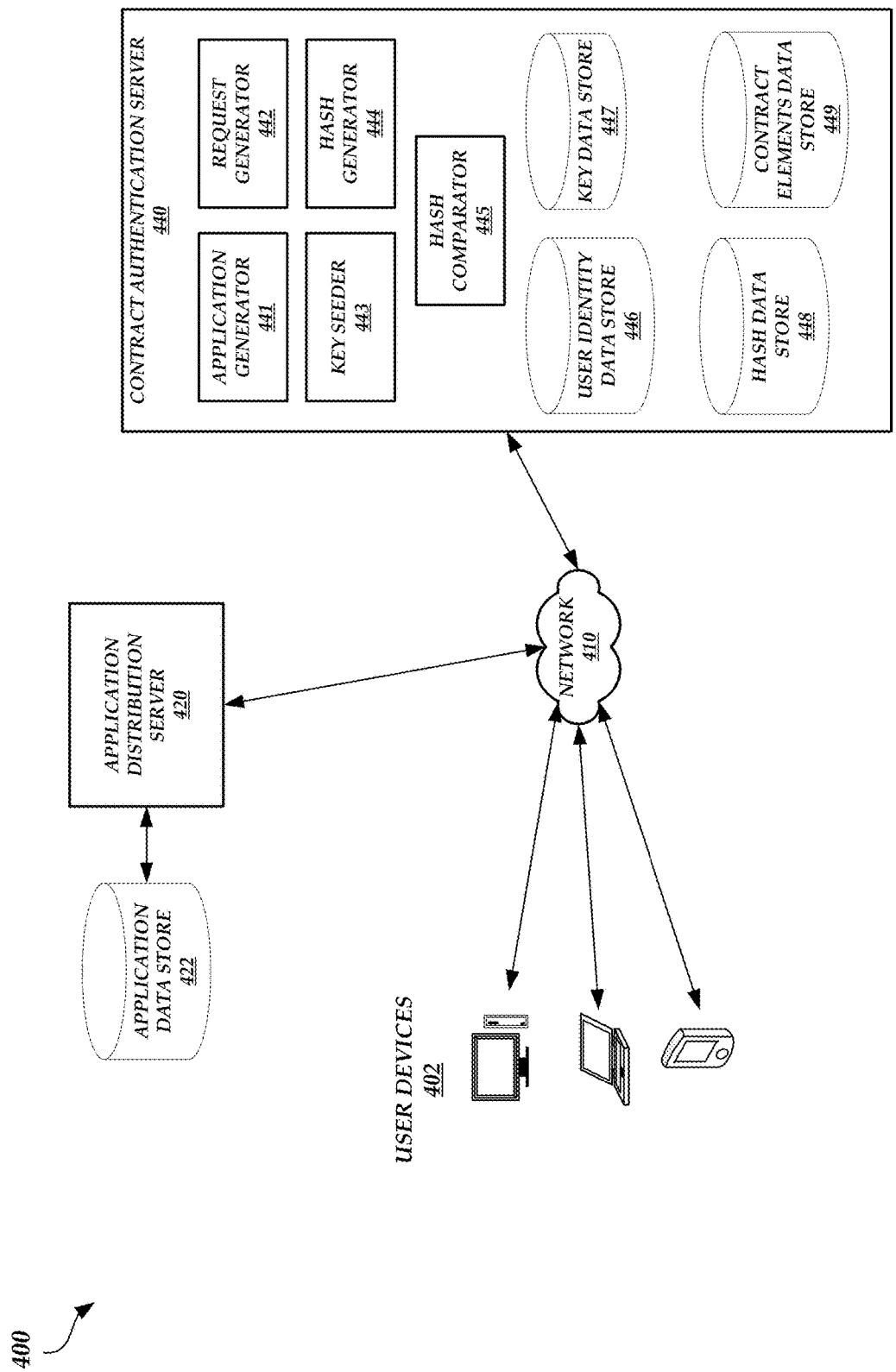
FIG. 4 is a block diagram of an illustrative hash contract generation and verification environment.

FIG. 4 is a block diagram of an illustrative hash contract generation and verification environment 400. As illustrated in FIG. 4, the hash contract generation and verification environment 400 includes user devices 402, an application distribution server 420, an application data store 422, and a contract authentication server 440.

While FIG. 4 illustrates a single application distribution server 420, a single application data store 422, and a single contract authentication server 440, this is not meant to be limiting. The hash contract generation and verification environment 400 may include any number of application distribution servers 420, application data stores 422, and contract authentication servers 440, where each application distribution server 420 communicates with a separate application data store 422. For example, multiple application distribution servers 420 may be present, where each application distribution server 420 is operated by a different entity. As another example, any entity that provides offers to users and/or engages in transactions with users may operate an independent contract authentication server 440.

In addition, the hash contract generation and verification environment 400 may include other devices or components that are not depicted. For example, intermediary networking devices, a system operated by a financial entity, and/or the like may be present in the hash contract generation and verification environment 400 and may interact with any of the depicted devices or components.

The user devices 402, the application distribution server 420, and the contract authentication server 440 may communicate with each other via one or more communication networks 410. The network 410 may include any wired network, wireless network, or combination thereof. For example, the network 410 may be a personal area network, local area network, wide area network, over-the-air broadcast network (for example, for radio or television), cable network, satellite network, cellular telephone network, or combination thereof. As a further example, the network 410 may be a publicly accessible network of linked networks, possibly operated by various distinct parties, such as the Internet. In some embodiments, the network 410 may be a semi-private network, such as a corporate or university intranet, or a private network. The network 410 may include one or more wireless networks, such as a Global System for Mobile Communications (GSM) network, a Code Division Multiple Access (CDMA) network, a Long Term Evolution (LTE) network, or any other type of wireless network. The network 410 can use protocols and components for communicating via the Internet or any of the other aforementioned types of networks. For example, the protocols used by the network 410 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Various example user devices 402 are shown in FIG. 4, including a desktop computer, laptop, and a mobile phone, each provided by way of illustration. In general, the user devices 402 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, kiosk, ATM, and/or the like. The user devices 402 may execute an application (for example, a browser, a stand-alone third party application, etc.) that generates, transmits, and/or verifies hash contracts, thereby allowing a user to accept an offer, to verify that the terms of an offer are unaltered, to verify that another user intended to accept and/or did accept an offer, and/or to verify the identity of a user that accepted an offer. The process(es) implemented by the application to generate and/or verify a hash contract are described in greater detail below with respect to FIGS. 5A through 21.

In a simple use case, a first user device 402 may communicate with a second user device 402 to allow two users to enter into a contract. For example, the first user device 402 may generate the terms and conditions and consideration that define an offer and transmit such information to the second user device 402 via the network 410. The second user device 402 may then display at least a portion of the offer and prompt a user to accept or reject the offer and provide an input representing an identity of the user. If the user elects to accept the offer, then the second user device 402 may generate a first hash contract using at least the terms and conditions, the consideration, a value representing the acceptance, and a value based on the provided input (and possibly additional inputs). The second user device 402 can then transmit the first hash contract to the first user device 402 via the network 410. If the user elects to reject the offer, then the second user device 402 may generate a first decline hash code using at least the terms and conditions, the consideration, a value representing a rejection of the offer, and a value based on the provided input (and possibly additional inputs). The second user device 402 can then transmit the first decline hash code to the first user device 402 via the network 410

Independently, the first user device 402 can generate a second hash contract using the terms and conditions, the consideration, a value representing the acceptance, and a value representing an identity of the user (for example, which was previously provided by the second user device 402) (and possibly additional inputs). The first user device 402 may also generate a second decline hash code using the terms and conditions, the consideration, a value representing a rejection of the offer, and a value representing an identity of the user (and possibly additional inputs). The first user device 402 can compare the data received from the second user device 402 (for example, the first hash contract or the first decline hash code) with the second hash contract and/or second decline hash code. If the received data matches the second hash contract, then the first user device 402 determines that an offer was accepted and that a legally enforceable contract has been formed. If the received data matches the second decline hash code, then the first user device 402 determines that the offer was rejected and that no legally enforceable contract has been formed. Finally, if the received data does not match second hash contract and the second decline hash code, then the first user device 402 may determine that fraudulent or malicious activity has occurred and may perform appropriate actions (for example, terminate communications with the second user device 402, notify the second user device 402 of suspected fraudulent or malicious activity, etc.).

In more complex use cases, a user device 402 may communicate with the application distribution server 420 and/or the contract authentication server 440 to authorize transactions or otherwise enter into contracts. The application distribution server 420 can be a computing system (for example, with physical hardware, such as one or more processors, memory, graphical processing power, input/output devices, an internal bus, etc.) configured to distribute applications (for example, mobile applications, desktop and/or laptop applications, other stand-alone third party applications, etc.) to various user devices 402. For example, upon a request submitted by a user device 402 for an application, the application distribution server 420 may retrieve the requested application from the application data store 422 and transmit the requested application to the user device 402.

The application distribution server 420 may be a single computing device, or it may include multiple distinct computing devices, such as computer servers, logically or physically grouped together to collectively operate as a server system. The components of the application distribution server 420 can each be implemented in application-specific hardware (for example, a server computing device with one or more ASICs) such that no software is necessary, or as a combination of hardware and software. In addition, the modules and components of the application distribution server 420 can be combined on one server computing device or separated individually or into groups on several server computing devices. The application distribution server 420 can be located local to the application data store 422 and/or the contract authentication server 440 (for example, in the same building or complex as the application data store 422 and/or the contract authentication server 440) or remote from the application data store 422 and/or the contract authentication server 440 (for example, located in a geographic location that is different than the location of the application data store 422 and/or the contract authentication server 440). In some embodiments, the application distribution server 420 may include additional components than illustrated in FIG. 4.

In some embodiments, the features and services provided by the application distribution server 420 may be implemented as web services consumable via the communication network 410. In further embodiments, the application distribution server 420 is provided by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment.

The application data store 422 may store one of more types of applications distributed by the application distribution server 420 to the various user devices 402. In particular, the application data store 422 may store applications generated by the contract authentication server 440 for distribution to user devices 402 (described below). The application data store 422 may store multiple versions of the same application. For example, as described in greater detail below, while the contract authentication server 440 may offer the same application to multiple user devices 402, each application may be embedded with a unique initialization key. Thus, each application version stored in the application data store 422 may include a unique initialization key. Alternatively, as described in greater detail below, the application data store 422 may store a single version of the same application, and a unique initialization key can be derived independently by the user device 402 and the contract authentication server 440 based on communications between the two. While the application data store 422 is depicted in FIG. 4 as being external to the application distribution server 420, this is not meant to be limiting. For example, not shown, the application data store 422 may located internal to the application distribution server 420.

The contract authentication server 440 can be a computing system (for example, with physical hardware, such as one or more processors, memory, graphical processing power, input/output devices, an internal bus, etc.) configured to generate applications for distribution to user devices 402, generate hash contracts, generate decline hash codes, authorize transactions based on verifying whether an offer is accepted or rejected, and/or suspend user accounts in response to detecting potentially fraudulent or malicious activity. For example, the contract authentication server 440 may be a single computing device, or it may include multiple distinct computing devices, such as computer servers, logically or physically grouped together to collectively operate as a server system. The components of the contract authentication server 440 can each be implemented in application-specific hardware (for example, a server computing device with one or more ASICs) such that no software is necessary, or as a combination of hardware and software. In addition, the modules and components of the contract authentication server 440 can be combined on one server computing device or separated individually or into groups on several server computing devices. In some embodiments, the contract authentication server 440 may include additional or fewer components than illustrated in FIG. 4.

In some embodiments, the features and services provided by the contract authentication server 440 may be implemented as web services consumable via the communication network 410. In further embodiments, the contract authentication server 440 is provided by one more virtual machines implemented in a hosted computing environment. The hosted computing environment (for example, the cloud computing environment) may include one or more rapidly provisioned and released computing resources, which computing resources may include computing, networking, and/or storage devices.

The contract authentication server 440 may include various modules, components, data stores, and/or the like to provide the functionality described herein. For example, the contract authentication server 440 may include an application generator 441, a request generator 442, a key seeder 443, a hash generator 444, a hash comparator 445, a user identity data store 446, a key data store 447, a hash data store 448, and/or a contract elements data store 449.

The application generator 441 may generate applications for storage in the application data store 422 and eventual distribution to the user devices 402 via the application distribution server 420. For example, the application generator 441 may generate one or more unique initialization keys. As described in greater detail below, an initialization key may be used to generate a symmetric key. The application generator 441 can then insert each unique initialization key into the code of an application or into an application package that includes the code of an application, application metadata, and/or other information to form unique versions of the application. The application generator 441 may insert each unique initialization key into the code of the application or into the application package in a manner such that the respective unique initialization key is inaccessible until a computing device (for example, a user device 402) executes instructions to install the application locally. Thus, the unique initialization keys may be protected from unauthorized access. The application generator 441 can then transmit the unique versions of the application to the application distribution server 420 for storage in the application data store 422.

In an embodiment, no two user devices 402 are allowed to retrieve the same version of an application (for example, an application with the same initialization key). Thus, the application generator 441 may continue to generate unique versions of the application as applications continue to be distributed by the application distribution server 420.

In addition to including the initialization keys with the application code or in the application package, the application generator 441 can locally store the unique initialization keys. For example, the application generator 441 can store the unique initialization keys in the key data store 447 in association with an identification of a version of the application. When a user device 402 retrieves a particular version of the application from the application distribution server 420, the application distribution server 420 can notify the application generator 441 of an identification of a user of the user device 402 or of the user device 402 itself that retrieved the application and the version that was retrieved. The application generator 441 may then update the entry in the key data store 447 associated with the application version with an identification of the user of the user device 402 or of the user device 402 itself.

Alternatively, the application generator 441 does not generate initialization keys and insert such keys into the code of the application or into the application package. Rather, the application generator 441 transmits a single version of the application to the application distribution server 420 for storage in the application data store 422. Each user device 402 can then retrieve the same version of the application from the application distribution server 420. However, upon the download of the application being complete and/or when a user attempts to open the application for the first time, the application downloaded to the user device 402 and the application distribution server 420 can communicate with each other and independently generate the initialization key without having to transmit the initialization key over the network 410. For example, the application and the application generator 441 can use the Diffie-Hellman key exchange process to independently generate the initialization key. As an illustrative example, upon the download of the application being complete and/or when a user attempts to open the application for the first time, the application can transmit a message to the application generator 441 in which the message identifies a prime number p and a primitive root modulo of the prime number, represented as g. The application can then select a first secret integer value a and transmit a message to the application generator 441 in which the message includes a value C equal to $g^a$ mod p. In response, the application generator 441 can select a second secret integer value b and transmit a message to the application in which the message includes a value D equal to $g^b$ mod p. The application can then generate a first code by setting the first code equal to $D^a$ mod p. The application generator 441 can independently generate the same first code as the application by calculating $C^b$ mod p (where $C^b$ mod p equals $D^a$ mod p).

Alternatively or in addition, the application and the application generator 441 can use the elliptic curve version of the Diffie-Hellman key exchange process. For example, the application and the application generator 441 can use elliptic curves in place of the modulo operations described above to generate the same first code. As another example, the application and the application generator 441 can use a combination of elliptic curves and modulo operations to generate the first code. As another example, the application and the application generator 441 can use elliptic curves to generate the first code, modulo operations to generate a second code, elliptic curves or modulo operations to generate a third code, and so on.

The application and the application generator 441 can each perform the code generation process described above one or more times to each generate one or more codes (for example, two codes each, three codes each, four codes each, etc.). For example, the application and the application generator 441 can select different secret integer values and/or private keys (for example, in the elliptic curves version of the Diffie-Hellman key exchange process) each time the process is performed to generate different code(s). Once the code(s) are generated, the application and the application generator 441 can each independently generate the initialization key given that the application and the application generator 441 have both generated the same code(s). For example, the application can hash the code(s) generated by the application to form the initialization key (for example, concatenate the code(s) in a certain order and hash the concatenated code(s), where the order of concatenation may depend on the values of a generated code, prior messages transmitted between the application and the application generator 441, etc.). As another example, the application can hash the code(s) in a cascading manner to form the initialization key by hashing one or more codes to form a first hash code, hashing one or more remaining codes and the first hash code to form a second hash code, hashing one or more remaining codes and the second hash code to form a third hash code, and so on. The application can repeat the hashing operation one or more times to form the initialization key (for example, where the first hash code can become the initialization key, the second hash code can become the initialization key, the third hash code can become the initialization key, etc.). Similarly, the application generator 441 can hash the code(s) generated by the application generator 441 to form the same initialization key. The application generator 441 can then store the generated initialization key in an entry in the key data store 447 with an identification of the user of the user device 402 or of the user device 402 itself (as this information may be provided by the application).

As described herein, the user device 402 and the contract authentication server 440 can use the initialization key to generate a master key. Alternatively, the user device 402 and/or the contract authentication server 440 can use the initialization key as the master key.

The request generator 442 may request and/or receive identity information from user devices 402. For example, the request generator 442 may transmit a request to a user device 402 for data representing an identity of a user that operates the user device 402. The user device 402 may then prompt the user to provide one or more inputs that uniquely represent an identity of the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 may convert the input(s) into one or more values (for example, an alphanumeric value, a hexadecimal value, a string value, etc.) and then apply a hash function to the value(s) to generate an identity hash code (also referred to as a "hash identity code"). In general, if the user device 402 or the contract authentication server 440 is attempting to apply a hash function to multiple inputs, the user device 402 or contract authentication server 440 can concatenate the inputs into a single string and apply a hash function to the single string, where each input may or may not be separated with a divider (for example, an underscore character, a number appended to the front or back of an input that identifies a length of the input, etc.). The user device 402 may then transmit the identity hash code to the request generator 442 to satisfy the request. Alternatively, the request generator 442 may receive the identity hash code without requesting such information (for example, the user device 402 prompts the user to provide one or more inputs that uniquely represent an identity of the user when the application retrieved from the application distribution server 420 is first installed, when a user makes a selection to provide the input(s), etc.). Once the identity hash code is received, the request generator 442 can store the identity hash code in the user identity data store 446 in an entry associated with the user operating the user device 402 and/or the user device 402 itself.

The request generator 442 may also respond to requests from user devices 402 for zero transactions or any other type of message that can be used to generate a master key and/or symmetric key. For example, in response to receiving a request for a zero transaction from a user device 402, the request generator 442 may generate the zero transaction, which may include data like a date, parties to a transaction, an amount (for example, zero), an item corresponding to the transaction, and/or the like. The request generator 442 can then transmit the zero transaction to the user device 402 that submitted the request.

The key seeder 443 may generate a master key and one or more symmetric keys. For example, the key seeder 443 can receive an identifier from the request generator 442 that was included in a zero transaction request. The identifier may be an address of the user device 402 (for example, a media access control (MAC) address, an Internet protocol (IP) address, etc.) that requested the zero transaction or another value that uniquely identifies the user device 402. The key seeder 443 may then retrieve, from the key data store 447, the unique initialization key associated with the identifier. The key seeder 443 can generate the master key by applying a hash function to the identifier and the unique initialization key. The key seeder 443 may then store the master key in the key data store 447 in the entry associated with the identifier.

The key seeder 443 may generate one or more symmetric keys using the master key. For example, the key seeder 443 can receive a copy of a zero transaction transmitted to a user device 402 and apply a hash function to the master key and at least a portion of the data included in the zero transaction to form a symmetric key. The key seeder 443 may then store the symmetric key in the key data store 447 in an entry associated with the identifier (for example, the data that identifies a user and/or user device 402). If another zero transaction request and/or an actual transaction request is received by the contract authentication server 440, then the key seeder 443 may apply a hash function to the master key and at least a portion of the data included in the zero transaction or the actual transaction to form a new symmetric key that replaces the previous symmetric key. Thus, the key seeder 443 can periodically reset a symmetric key by generating a new symmetric key. The key seeder 443 may store the new symmetric key in the key data store 447 in place of the previous symmetric key.

Optionally, the key seeder 443 can stretch the generated master key and/or the one or more symmetric keys. For example, the key seeder 443 may add bits to a master key and/or a symmetric key (for example, at the beginning, middle, or end of the bits of the key and/or interleaved with bits of the key) to mask the actual master and/or symmetric key. Optionally, the key seeder 443 can salt the generated master key and/or the one or more symmetric keys. For example, the key seeder 443 can apply a function to a master key and/or a symmetric key that modifies the value of the respective key. Before the master key or symmetric key is used as described herein, the key seeder 443 or another component of the contract authentication server 440 may perform the reverse operation (for example, undo the application of the function) to re-derive the master key and/or symmetric key for use.

The hash generator 444 may generate hash contracts and/or decline hash codes. The hash generator 444 may retrieve contract elements stored in the contract elements data store 449, a symmetric key stored in the key data store 447, an identity hash code stored in the user identity data store 446, and/or a previous hash contract or decline hash code stored in the hash data store 448 to be used in generating the hash contracts and/or decline hash codes. The hash generator 444 may store a generated hash contract and/or decline hash code in the hash data store 448 for future use.

The hash comparator 445 may compare hash values received from user devices 402 (for example, hash contracts or decline hash codes) with hash contracts and/or decline hash codes generated by the hash generator 444. Based on the results of the comparison, the hash comparator 445 may determine whether a user accepted an offer, whether a user rejected an offer, or whether potential fraudulent or malicious activity has occurred. If potential fraudulent or malicious activity has occurred, the hash comparator 445 may suspend an account associated with the user device 402, notify the user device 402 of such potential activity, and/or the like.

The user identity data store 446 stores identity hash codes and stores each identity hash code in an entry associated with the user and/or user device 402 (for example, an identifier that identifies the user device 402) that provided the respective identity hash code. The user identity data store 446 may be located internal to the contract authentication server 440. In other embodiments, not shown, the user identity data store 446 is located external to the contract authentication server 440, such as on a separate system or server.

The key data store 447 stores unique initialization keys, master keys, and/or symmetric keys and stores each key in an entry associated with a user and/or user device 402 (for example, an identifier that identifies the user device 402). The key data store 447 may be located internal to the contract authentication server 440. In other embodiments, not shown, the key data store 447 is located external to the contract authentication server 440, such as on a separate system or server. Note that additional security measures may be applied to the key data store 447 such that components or devices external to the contract authentication server 440 may not have access to the key data store 447. For example, the key data store 447 may be encrypted with a key accessible to certain components within the contract authentication server 440 (and therefore may be decrypted each time the key data store 447 is accessed).

The hash data store 448 stores hash contracts and/or decline hash codes and stores each hash value in an entry associated with a user and/or user device 402 (for example, an identifier that identifies the user device 402). The hash data store 448 may be located internal to the contract authentication server 440. In other embodiments, not shown, the hash data store 448 is located external to the contract authentication server 440, such as on a separate system or server.

The contract elements data store 449 stores data representing contract elements (for example, terms and conditions of an offer, consideration, etc. in machine-encoded text format) and stores each contract element in an entry associated with a user and/or user device 402 (for example, an identifier that identifies the user device 402). The contract elements data store 449 may be located internal to the contract authentication server 440. In other embodiments, not shown, the contract elements data store 449 is located external to the contract authentication server 440, such as on a separate system or server.

Example Hash Contract Generation Routines

Figure 5A:
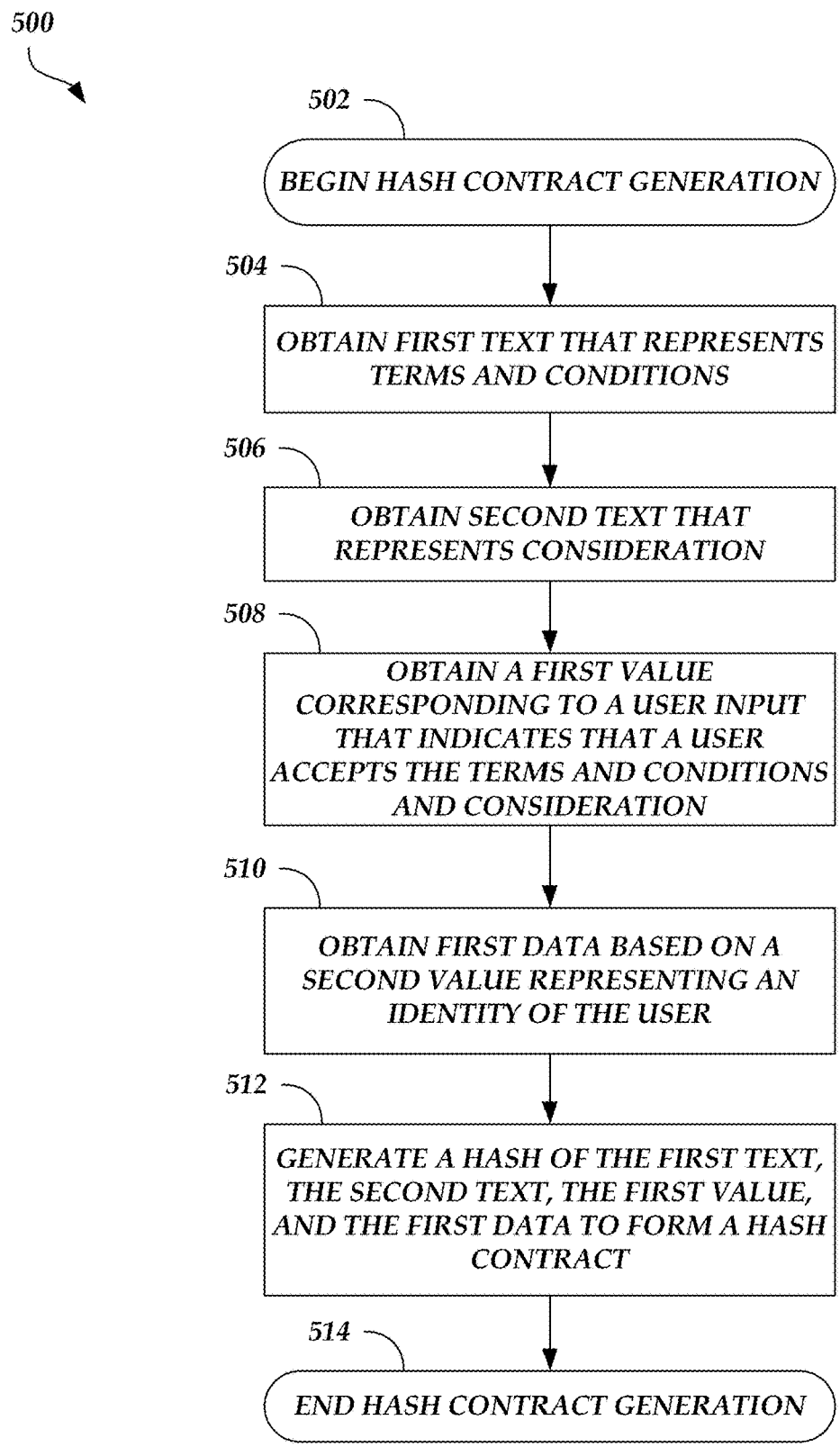
FIG. 5A is a flow diagram depicting a hash contract generation routine illustratively implemented by a user device or a contract authentication server, according to one embodiment.

FIG. 5A is a flow diagram depicting a hash contract generation routine 500 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract generation routine 500. The hash contract generation routine 500 begins at block 502.

At block 504, first text that represents terms and conditions of an offer is obtained. For example, the user device 402 or the contract authentication server 440 may (1) scan a physical or digital document that includes terms and conditions of an offer; (2) apply optical character recognition techniques to convert the scanned data into machine-encoded text; and (3) apply natural language processing techniques to the machine-encoded text to identify the terms and conditions of the offer. In particular, the user device 402, the contract authentication server 440, and/or another computing device can train a natural language model to identify the terms and conditions of the offer, where the natural language model is trained using a set of contracts that are each labeled to identify terms and conditions of an offer. The first text may be the machine-encoded text identified as the terms and conditions of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the terms and conditions of the offer, where the first text may be the machine-encoded text identified as the terms and conditions of the offer by the natural language processing techniques. As another example, the user device 402 or the contract authentication server 440 may receive the first text from another computing device (for example, via the network 410). As another example, the user device 402 or the contract authentication server 440 may receive the first text via user input.

At block 506, second text that represents consideration of an offer is obtained. For example, the user device 402 or the contract authentication server 440 may (1) scan a physical or digital document that includes consideration of an offer; (2) apply optical character recognition techniques to convert the scanned data into machine-encoded text; and (3) apply natural language processing techniques to the machine-encoded text to identify the consideration of the offer. In particular, the user device 402, the contract authentication server 440, and/or another computing device can train a natural language model to identify the consideration of the offer, where the natural language model is trained using a set of contracts that are each labeled to identify consideration of an offer. The second text may be the machine-encoded text identified as the consideration of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the consideration of the offer, where the second text may be the machine-encoded text identified as the consideration of the offer by the natural language processing techniques. As another example, the user device 402 or the contract authentication server 440 may receive the second text from another computing device (for example, via the network 410). As another example, the user device 402 or the contract authentication server 440 may receive the second text via user input.

At block 508, a first value corresponding to a user input that indicates that a user accepts the terms and conditions and consideration is obtained. For example, the user device 402 may display, in a user interface generated by an application retrieved from the application distribution server 420, information identifying a transaction (for example, terms and conditions, consideration, a merchant, a date, a location, etc.) and prompt a user to identify whether the user accepts or rejects the transaction. If the user provides an input (for example, a selection of a button or box in the user interface, text that indicates acceptance, a voice command, a touch gesture, a nod or other facial movement detected by a camera, etc.) that corresponds with an acceptance of the transaction, then this input may result in the user device 402 obtaining the first value. This input may also cause the user device 402 to initiate the application of a hash function to the contract element inputs (if, for example, the other contract element inputs have been obtained). As another example, the contact authentication server 440 may associate the first value with an acceptance of a transaction and may associate a different value with a rejection of a transaction. As described in greater detail below, the contract authentication server 440 may be generating a hash contract for transaction verification purposes and can therefore obtain the first value.

At block 510, first data based on a second value representing an identity of the user is obtained. For example, the user device 402 may prompt a user, in a user interface generated by the application retrieved from the application distribution server 420, to provide one or more inputs that uniquely represent the user. The prompt may be presented to the user when the user device 402 receives a transaction authorization request. For example, such input can include at least one multi-factor authentication factor. Such factors can include a fingerprint, a vein reading, an iris scan, face-recognition, a passcode, a single-use code, a key card, a digital certificate, a digital token, and/or any other item that represents a biological characteristic of the user, something that the user knows, or something that the user has. The component(s) that receive the input(s) (for example, a fingerprint reader, a vein reader, an iris scanner, a camera, a key card reader, etc.) or the user device 402 can then convert the input(s) into a second value, which may be an alphanumeric value, a hexadecimal value, a string value, and/or the like. For example, the component(s) or the user device 402 can retrieve mapping information that indicates how to convert the input(s) into the second value. If more than one input is provided, the user device 402 can concatenate the resulting second values to form a single second value in a manner as described herein. The user device 402 may then apply a hash function to the second value to form the first data. Reception of the input(s) and formation of the first data may cause the user device 402 to initiate the application of a hash function to the contract element inputs (if, for example, the other contract element inputs have been obtained). Thus, the first data may be a hash code, also referred to herein as an identity hash code.

The contract authentication server 440 may obtain the first data from the user device 402. For example, when the application running on the user device 402 is first installed or when a user is otherwise setting up the application, the user device 402 may generate the first data and transmit the first data to the contract authentication server 440. The contract authentication server 440 may then store the first data in the user identity data store 446 and retrieve the first data when generating the hash contract. Note that the user device 402 may not store the first data. Rather, each time a transaction authorization request is received, the user device 402 may prompt the user to provide one or more inputs that uniquely represent the user and the user device 402 may perform the process described herein to generate a new copy of the first data. Thus, if an unauthorized or malicious user attempts to authorize a transaction and cannot provide the one or more inputs that uniquely represent the user, then the new copy of the first data generated by the user device 402 would not match the first data originally received by the contract authentication server 440 and the transaction authorization would ultimately fail (for example, because the hash contract generated by the user device 402 would not match the hash contract generated by the contract authentication server 440 given that different inputs would be used by each device in generating the hash contracts).

At block 512, a hash of the first text, the second text, the first value, and the first data is generated to form a hash contract. For example, the user device 402 or contract authentication server 440 may concatenate the first text, the second text, the first value, and the first data to form a single string in a manner as described herein and apply a hash function to the single string to form the hash contract. The first text, the second text, the first value, and the first data may be concatenated in any order. For example, the user device 402 or contract authentication server 440 can append the first data to the end of the first value, append the combined first data and first value to the end of the second text, and append the combined first data, first value, and second text to the end of the first text to form the single string. As another example, the user device 402 or contract authentication server 440 can append the first value to the end of the first data, append the combined first value and first data to the end of the first text, and append the combined first value, first data, and first text to the end of the second text to form the single string. The user device 402 may generate the hash in response to obtaining some or all necessary contract element inputs. For example, the user device 402 may generate the hash in response to the user providing an input to accept or reject a transaction and/or in response to obtaining the first data (for example, in response to the user providing one or more inputs that uniquely represent the user). The contract authentication server 440 may generate the hash in response to requesting the user device 402 to accept or decline a transaction and after some or all necessary contract element inputs are obtained. Once the hash contract is formed, the hash contract generation routine 500 is complete, as shown at block 514.

While FIG. 5A depicts blocks 504, 506, 508, and 510 in a specific order, this is merely an illustrative example and is not meant to be limiting. Blocks 504, 506, 508, and/or 510 can be completed in any order.

In addition, while FIG. 5A depicts a hash function being applied to the first text, the second text, the first value, and the first data in order to form the hash contract, this is merely an illustrative example and is not meant to be limiting. In particular, any of the first text, the second text, the first value, and the first data can be hashed individually or in combination with other contract elements (for example, where the contract elements are the first text, the second text, the first value, and the first data) before the hash function that generates the hash contract is applied. The resulting hash value(s) can then be hashed with any contract elements that have not yet been included as an input to a hash function to form another hash value (for example, if at least one contract element has not been used as an input to a hash function) or the hash contract (for example, if all contract elements have been used as an input to a hash function). If another hash value is formed, then this hash value can be hashed with any contract elements that have not yet been included as an input to a hash function to form another hash value or the hash contract, and this process can continue until all contract elements have been used as an input to a hash function.

In one illustrative example, the user device 402 or contract authentication server 440 can apply a hash function to the first text to form a first hash value and then apply a hash function to the first hash value, the second text, the first value, and the first data to form the hash contract. As another illustrative example, the user device 402 or contract authentication server 440 can apply a hash function to the first text and the second text to form a first hash value and then apply a hash function to the first hash value, the first value, and the first data to form the hash contract. As another illustrative example, the user device 402 or contract authentication server 440 can (1) apply a first hash function to the first text to form a first hash value and a second hash function to the second text to form a second hash value; (2) apply a third hash function to the first hash value, the second hash value, and the first data to form a third hash value; and (3) apply a fourth hash function to the third hash value and the first value to form the hash contract.

Figure 5B:
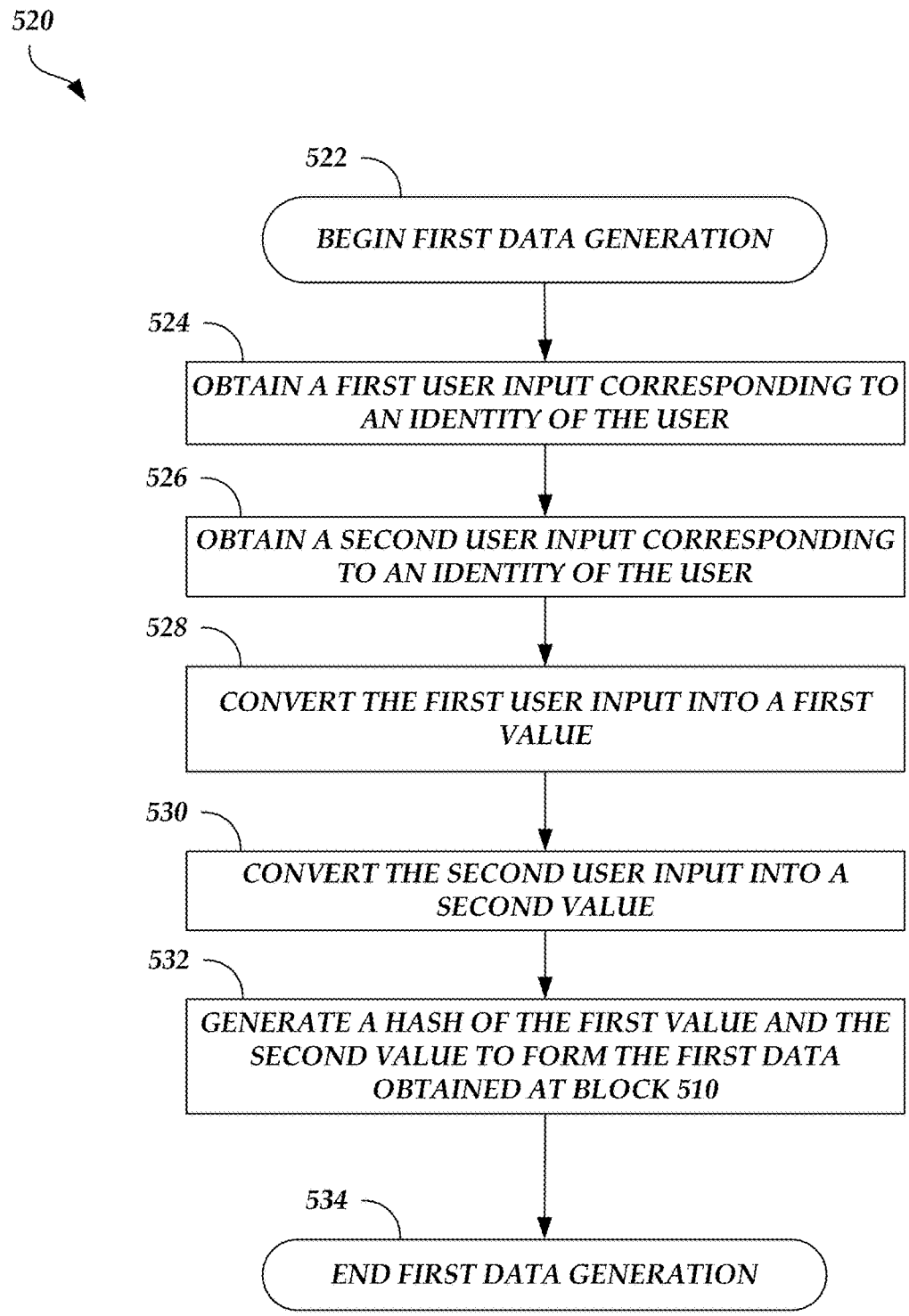
FIG. 5B is a flow diagram depicting a first data generation routine illustratively implemented by a user device, according to one embodiment.

FIG. 5B is a flow diagram depicting a first data generation routine 520 illustratively implemented by a user device, according to one embodiment. As an example, the user device 402 of FIG. 4 (for example, the application retrieved from the application distribution server 420) can be configured to execute the first data generation routine 520. The first data generation routine 520 may be performed when the application retrieved from the application distribution server 420 is first initialized, when a user initiates an action to enter input(s) uniquely representing the user, and/or when the user device 402 is attempting to generate a hash contract to authorize a transaction (for example, in response to reaching block 510 when executing the hash contract generation routine 500) or a decline hash code to decline a transaction. The first data generation routine 520 begins at block 522.

At block 524, a first user input corresponding to an identity of the user is obtained. For example, the first user input may be a fingerprint, a vein reading, an iris scan, face-recognition, a passcode, a single-use code, a key card, a digital certificate, a digital token, and/or any other item that represents a biological characteristic of the user, something that the user knows, or something that the user has.

At block 526, a second user input corresponding to an identity of the user is obtained. For example, the second user input may be a fingerprint, a vein reading, an iris scan, face-recognition, a passcode, a single-use code, a key card, a digital certificate, a digital token, and/or any other item that represents a biological characteristic of the user, something that the user knows, or something that the user has. The first user input and the second user input may be different.

At block 528, the first user input is converted into a first value. For example, the user device 402 can convert the first user input into a first value, which may be an alphanumeric value, a hexadecimal value, a string value, and/or the like. The user device 402 can retrieve mapping information that indicates how to convert the first user input into the first value.

At block 530, the second user input is converted into a second value. For example, the user device 402 can convert the second user input into a second value, which may be an alphanumeric value, a hexadecimal value, a string value, and/or the like. The user device 402 can retrieve mapping information that indicates how to convert the second user input into the second value.

At block 532, a hash of the first value and the second value is generated to form the first data (for example, an identity hash code) that is obtained at block 510 of FIG. 5A. For example, the user device 402 can concatenate the first value and the second value in any order to form a string value and then apply a hash function to the string value to form the first data. Once the first data is formed, the first data generation routine 520 is complete, as shown at block 534.

While FIG. 5B depicts blocks 524, 526, 528, and 530 in a specific order, this is merely an illustrative example and is not meant to be limiting. For example, block 524 occurs before block 528 and block 526 occurs before block 530, but blocks 524, 526, 528, and 530 can otherwise be completed in any order.

In addition, blocks 526 and 530 may be optional. For example, the user device 402 can generate the first data by applying a hash function to the first value only. Similarly, additional user inputs that uniquely represent the user may be obtained and converted into values to be used as inputs to the hash function that forms the first data.

Finally, while FIG. 5B depicts a hash function being applied to the first value and the second value, this is merely an illustrative example and is not meant to be limiting. In particular, any of the first value and the second value can be hashed individually or in combination with other values derived from other user inputs (for example, other user inputs in addition to the first and second user inputs) before the hash function that generates the first data is applied. The resulting hash value(s) can then be hashed with any values that have not yet been included as an input to a hash function to form another hash value (for example, if at least one value has not been used as an input to a hash function) or the first data (for example, if all values have been used as an input to a hash function). If another hash value is formed, then this hash value can be hashed with any values that have not yet been included as an input to a hash function to form another hash value or the first data, and this process can continue until all values have been used as an input to a hash function. In an illustrative example, the user device 402 can apply a hash function to the first value to form a first hash value and then apply a hash function to the first hash value and the second value to form the first data.

Figure 6A:
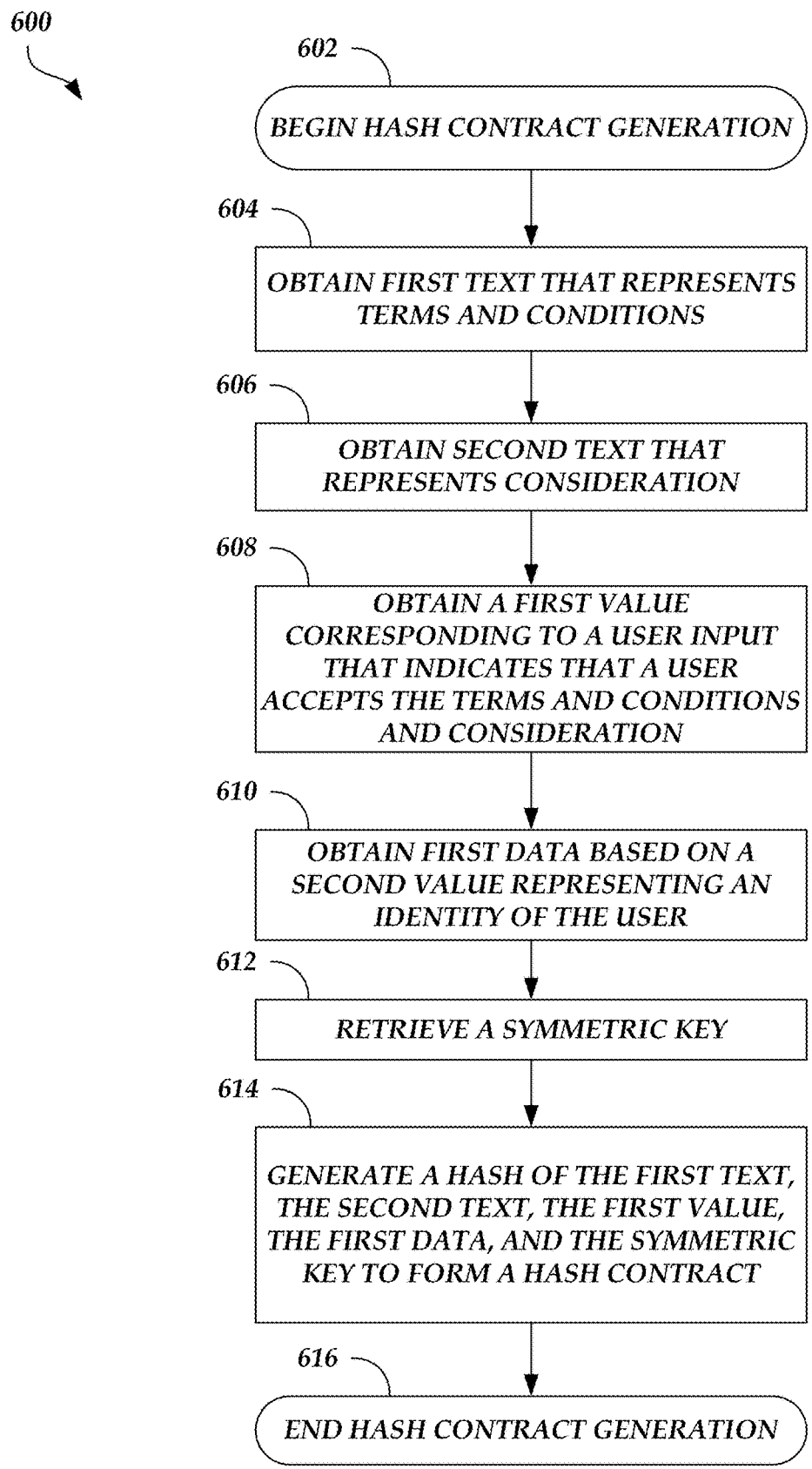
FIG. 6A is a flow diagram depicting another hash contract generation routine illustratively implemented by a user device or a contract authentication server, according to one embodiment.

FIG. 6A is a flow diagram depicting another hash contract generation routine 600 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract generation routine 600. The hash contract generation routine 600 may include using a symmetric key (for example, a secret key that may or may not be a single-use key) to prevent a malicious device from successfully spoofing the user device 402 and authorizing a transaction unbeknownst to the user even if the malicious device is able to intercept some inputs to the hash function used to generate a hash contract. The hash contract generation routine 600 begins at block 602.

At block 604, first text that represents terms and conditions of an offer is obtained. For example, the user device 402 or the contract authentication server 440 may (1) scan a physical or digital document that includes terms and conditions of an offer; (2) apply optical character recognition techniques to convert the scanned data into machine-encoded text; and (3) apply natural language processing techniques to the machine-encoded text to identify the terms and conditions of the offer. In particular, the user device 402, the contract authentication server 440, and/or another computing device can train a natural language model to identify the terms and conditions of the offer, where the natural language model is trained using a set of contracts that are each labeled to identify terms and conditions of an offer. The first text may be the machine-encoded text identified as the terms and conditions of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the terms and conditions of the offer, where the first text may be the machine-encoded text identified as the terms and conditions of the offer by the natural language processing techniques. As another example, the user device 402 or the contract authentication server 440 may receive the first text from another computing device (for example, via the network 410). As another example, the user device 402 or the contract authentication server 440 may receive the first text via user input.

At block 606, second text that represents consideration of an offer is obtained. For example, the user device 402 or the contract authentication server 440 may (1) scan a physical or digital document that includes consideration of an offer; (2) apply optical character recognition techniques to convert the scanned data into machine-encoded text; and (3) apply natural language processing techniques to the machine-encoded text to identify the consideration of the offer. In particular, the user device 402, the contract authentication server 440, and/or another computing device can train a natural language model to identify the consideration of the offer, where the natural language model is trained using a set of contracts that are each labeled to identify consideration of an offer. The second text may be the machine-encoded text identified as the consideration of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the consideration of the offer, where the second text may be the machine-encoded text identified as the consideration of the offer by the natural language processing techniques. As another example, the user device 402 or the contract authentication server 440 may receive the second text from another computing device (for example, via the network 410). As another example, the user device 402 or the contract authentication server 440 may receive the second text via user input.

At block 608, a first value corresponding to a user input that indicates that a user accepts the terms and conditions and consideration is obtained. For example, the user device 402 may display, in a user interface generated by an application retrieved from the application distribution server 420, information identifying a transaction (for example, terms and conditions, consideration, a merchant, a date, a location, etc.) and prompt a user to identify whether the user accepts or rejects the transaction. If the user provides an input (for example, a selection of a button or box in the user interface, text that indicates acceptance, a voice command, a touch gesture, a nod or other facial movement detected by a camera, etc.) that corresponds with an acceptance of the transaction, then this input may result in the user device 402 obtaining the first value. As another example, the contact authentication server 440 may associate the first value with an acceptance of a transaction and may associate a different value with a rejection of a transaction. As described in greater detail below, the contract authentication server 440 may be generating a hash contract for transaction verification purposes and can therefore obtain the first value.

At block 610, first data based on a second value representing an identity of the user is obtained. For example, the user device 402 may prompt a user, in a user interface generated by the application retrieved from the application distribution server 420, to provide one or more inputs that uniquely represent the user (for example, one or more multi-factor authentication factors). For example, such input can include a fingerprint, a vein reading, an iris scan, face-recognition, a passcode, a single-use code, a key card, a digital certificate, a digital token, and/or any other item that represents a biological characteristic of the user, something that the user knows, or something that the user has. The component(s) that receive the input(s) (for example, a fingerprint reader, a vein reader, an iris scanner, a camera, a key card reader, etc.) or the user device 402 can then convert the input(s) into a second value, which may be an alphanumeric value, a hexadecimal value, a string value, and/or the like. For example, the component(s) or the user device 402 can retrieve mapping information that indicates how to convert the input(s) into the second value. If more than one input is provided, the user device 402 can concatenate the resulting second values to form a single second value in a manner as described herein. The user device 402 may then apply a hash function to the second value to form the first data. Thus, the first data may be a hash code, also referred to herein as an identity hash code.

The contract authentication server 440 may obtain the first data from the user device 402. For example, when the application running on the user device 402 is first installed or when a user initially provides the input(s) uniquely representing the user, the user device 402 may generate the first data and transmit the first data to the contract authentication server 440. The contract authentication server 440 may then store the first data in the user identity data store 446 and retrieve the first data when generating the hash contract.

At block 612, a symmetric key is retrieved. The user device 402 may generate the symmetric key based on a master key that is derived using a unique initialization key embedded in an application retrieved from the application distribution server 420. The contract authentication server 440 may have generated the unique initialization key that is embedded in the application retrieved from the application distribution server 420 and executed by the user device 402. Thus, the contract authentication server 440 may generate the symmetric key based on a master key that is derived from the generated unique initialization key. The retrieved symmetric key may be a single-use key (for example, a new symmetric key is generated each time the user device 402 receives a transaction authorization request and/or each time the contract authentication server 440 verifies whether a transaction was authorized or declined). Additional details regarding the generation of the symmetric key are described below with respect to FIGS. 8A-8B.

At block 614, a hash of the first text, the second text, the first value, the first data, and the symmetric key is generated to form a hash contract. For example, the user device 402 or contract authentication server 440 may concatenate the first text, the second text, the first value, the first data, and the symmetric key to form a single string in a manner as described herein and apply a hash function to the single string to form the hash contract. The first text, the second text, the first value, the first data, and the symmetric key may be concatenated in any order. Once the hash contract is formed, the hash contract generation routine 600 is complete, as shown at block 616.

While FIG. 6A depicts blocks 604, 606, 608, 610, and 612 in a specific order, this is merely an illustrative example and is not meant to be limiting. Blocks 604, 606, 608, 610, and 612 can be completed in any order.

Figure 6B:
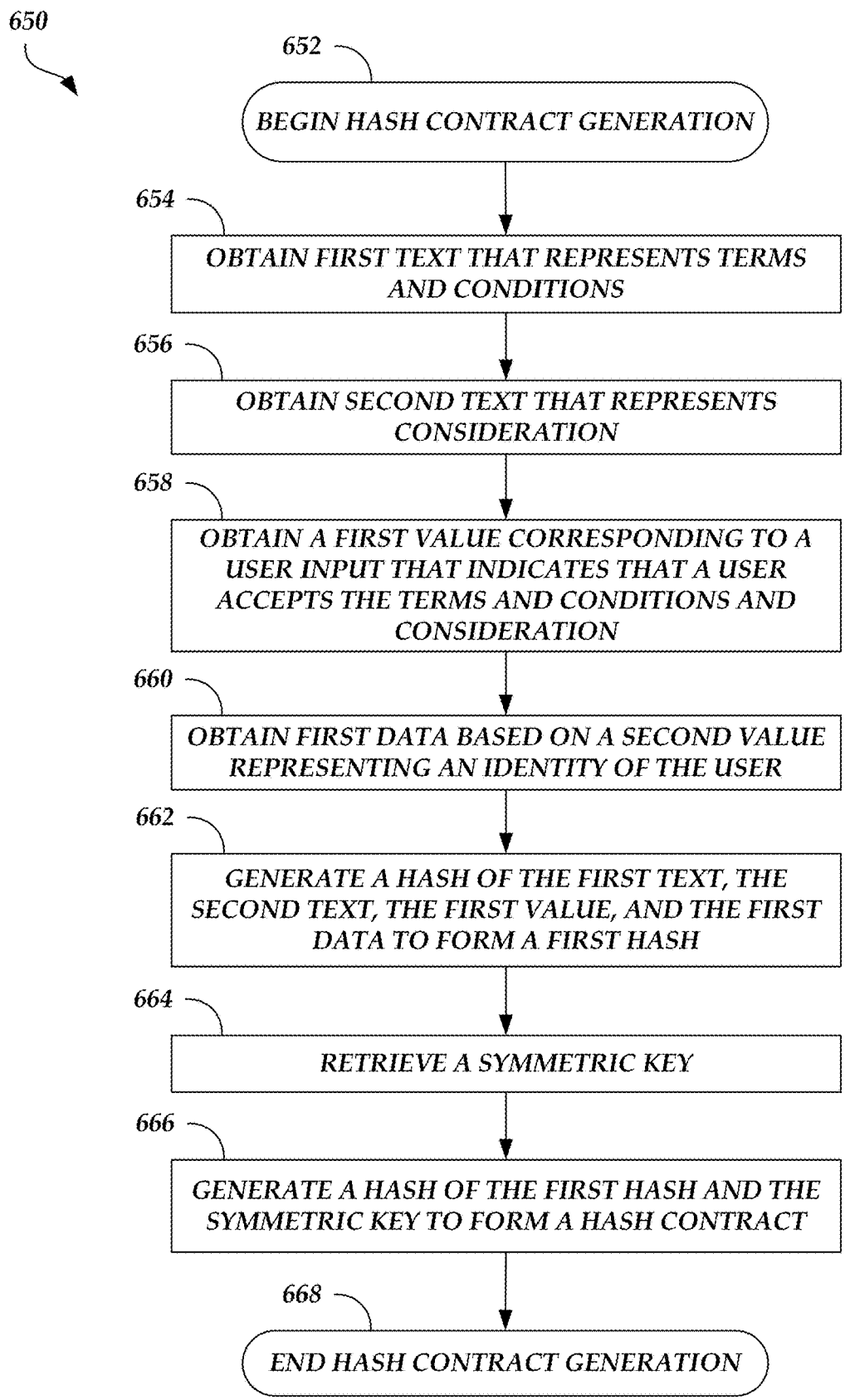
FIG. 6B is a flow diagram depicting another hash contract generation routine illustratively implemented by a user device or a contract authentication server, according to one embodiment.

In addition, while FIG. 6A depicts a hash function being applied to the first text, the second text, the first value, the first data, and the symmetric key in order to form the hash contract, this is merely an illustrative example and is not meant to be limiting. In particular, any of the first text, the second text, the first value, the first data, and the symmetric key can be hashed individually or in combination with other contract elements (for example, where the contract elements are the first text, the second text, the first value, the first data, and the symmetric key) before the hash function that generates the hash contract is applied. The resulting hash value(s) can then be hashed with any contract elements that have not yet been included as an input to a hash function to form another hash value (for example, if at least one contract element has not been used as an input to a hash function) or the hash contract (for example, if all contract elements have been used as an input to a hash function). If another hash value is formed, then this hash value can be hashed with any contract elements that have not yet been included as an input to a hash function to form another hash value or the hash contract, and this process can continue until all contract elements have been used as an input to a hash function. FIG. 6B described below depicts one illustrative example.

FIG. 6B is a flow diagram depicting another hash contract generation routine 650 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract generation routine 650. The hash contract generation routine 650 may include using a symmetric key (for example, a secret key that may or may not be a single-use key) to prevent a malicious device from successfully spoofing the user device 402 and authorizing a transaction unbeknownst to the user even if the malicious device is able to intercept some inputs to the hash function used to generate a hash contract. The hash contract generation routine 650 begins at block 652.

At block 654, first text that represents terms and conditions of an offer is obtained. For example, the user device 402 or the contract authentication server 440 may (1) scan a physical or digital document that includes terms and conditions of an offer; (2) apply optical character recognition techniques to convert the scanned data into machine-encoded text; and (3) apply natural language processing techniques to the machine-encoded text to identify the terms and conditions of the offer. In particular, the user device 402, the contract authentication server 440, and/or another computing device can train a natural language model to identify the terms and conditions of the offer, where the natural language model is trained using a set of contracts that are each labeled to identify terms and conditions of an offer. The first text may be the machine-encoded text identified as the terms and conditions of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the terms and conditions of the offer, where the first text may be the machine-encoded text identified as the terms and conditions of the offer by the natural language processing techniques. As another example, the user device 402 or the contract authentication server 440 may receive the first text from another computing device (for example, via the network 410). As another example, the user device 402 or the contract authentication server 440 may receive the first text via user input.

At block 656, second text that represents consideration of an offer is obtained. For example, the user device 402 or the contract authentication server 440 may (1) scan a physical or digital document that includes consideration of an offer; (2) apply optical character recognition techniques to convert the scanned data into machine-encoded text; and (3) apply natural language processing techniques to the machine-encoded text to identify the consideration of the offer. In particular, the user device 402, the contract authentication server 440, and/or another computing device can train a natural language model to identify the consideration of the offer, where the natural language model is trained using a set of contracts that are each labeled to identify consideration of an offer. The second text may be the machine-encoded text identified as the consideration of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the consideration of the offer, where the second text may be the machine-encoded text identified as the consideration of the offer by the natural language processing techniques. As another example, the user device 402 or the contract authentication server 440 may receive the second text from another computing device (for example, via the network 410). As another example, the user device 402 or the contract authentication server 440 may receive the second text via user input.

At block 658, a first value corresponding to a user input that indicates that a user accepts the terms and conditions and consideration is obtained. For example, the user device 402 may display, in a user interface generated by an application retrieved from the application distribution server 420, information identifying a transaction (for example, terms and conditions, consideration, a merchant, a date, a location, etc.) and prompt a user to identify whether the user accepts or rejects the transaction. If the user provides an input (for example, a selection of a button or box in the user interface, text that indicates acceptance, a voice command, a touch gesture, a nod or other facial movement detected by a camera, etc.) that corresponds with an acceptance of the transaction, then this input may result in the user device 402 obtaining the first value. As another example, the contact authentication server 440 may associate the first value with an acceptance of a transaction and may associate a different value with a rejection of a transaction. As described in greater detail below, the contract authentication server 440 may be generating a hash contract for transaction verification purposes and can therefore obtain the first value.

At block 660, first data based on a second value representing an identity of the user is obtained. For example, the user device 402 may prompt a user, in a user interface generated by the application retrieved from the application distribution server 420, to provide one or more inputs that uniquely represent the user (for example, one or more multi-factor authentication factors). For example, such input can include a fingerprint, a vein reading, an iris scan, face-recognition, a passcode, a single-use code, a key card, a digital certificate, a digital token, and/or any other item that represents a biological characteristic of the user, something that the user knows, or something that the user has. The component(s) that receive the input(s) (for example, a fingerprint reader, a vein reader, an iris scanner, a camera, a key card reader, etc.) or the user device 402 can then convert the input(s) into a second value, which may be an alphanumeric value, a hexadecimal value, a string value, and/or the like. For example, the component(s) or the user device 402 can retrieve mapping information that indicates how to convert the input(s) into the second value. If more than one input is provided, the user device 402 can concatenate the resulting second values to form a single second value in a manner as described herein. The user device 402 may then apply a hash function to the second value to form the first data. Thus, the first data may be a hash code, also referred to herein as an identity hash code.

The contract authentication server 440 may obtain the first data from the user device 402. For example, when the application running on the user device 402 is first installed or when a user initially provides the input(s) uniquely representing the user, the user device 402 may generate the first data and transmit the first data to the contract authentication server 440. The contract authentication server 440 may then store the first data in the user identity data store 446 and retrieve the first data when generating the hash contract.

At block 662, a hash of the first text, the second text, the first value, and the first data is generated to form a first hash. For example, the user device 402 or contract authentication server 440 may concatenate the first text, the second text, the first value, and the first data to form a single string in a manner as described herein and apply a hash function to the single string to form the first hash. The first text, the second text, the first value, and the first data may be concatenated in any order.

At block 664, a symmetric key is retrieved. The user device 402 may generate the symmetric key based on a master key that is derived using a unique initialization key embedded in an application retrieved from the application distribution server 420. The contract authentication server 440 may have generated the unique initialization key that is embedded in the application retrieved from the application distribution server 420 and executed by the user device 402. Thus, the contract authentication server 440 may generate the symmetric key based on a master key that is derived from the generated unique initialization key. The retrieved symmetric key may be a single-use key (for example, a new symmetric key is generated each time the user device 402 receives a transaction authorization request and/or each time the contract authentication server 440 verifies whether a transaction was authorized or declined). Additional details regarding the generation of the symmetric key are described below with respect to FIGS. 8A-8B.

At block 666, a hash of the first hash and the symmetric key is generated to form a hash contract. For example, the user device 402 or contract authentication server 440 may concatenate the first hash and the symmetric key to form a single string in a manner as described herein and apply a hash function to the single string to form the hash contract. The first text and the symmetric key may be concatenated in any order. Once the hash contract is formed, the hash contract generation routine 650 is complete, as shown at block 668.

While FIG. 6B depicts blocks 654, 656, 658, 660, and 664 in a specific order, this is merely an illustrative example and is not meant to be limiting. Blocks 654, 656, 658, 660, and 664 can be completed in any order.

Figure 7:
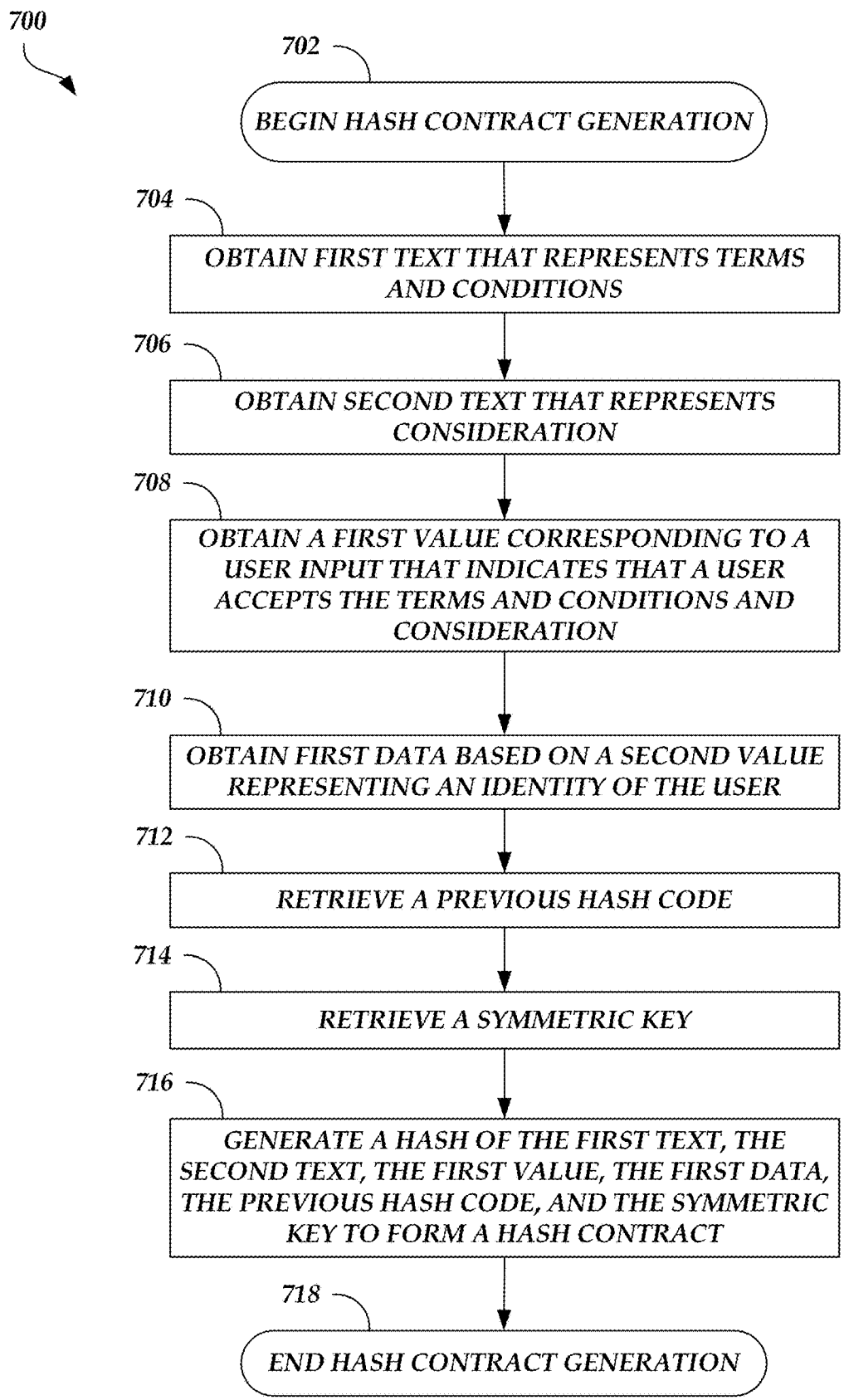
FIG. 7 is a flow diagram depicting another hash contract generation routine illustratively implemented by a user device or a contract authentication server, according to one embodiment.

FIG. 7 is a flow diagram depicting another hash contract generation routine 700 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract generation routine 700. The hash contract generation routine 700 may include using a symmetric key (for example, a secret key that may or may not be a single-use key) and a previously generated hash code to prevent a malicious device from successfully spoofing the user device 402 and authorizing a transaction unbeknownst to the user even if the malicious device is able to intercept some inputs to the hash function used to generate a hash contract. The hash contract generation routine 700 begins at block 702.

At block 704, first text that represents terms and conditions of an offer is obtained. For example, the user device 402 or the contract authentication server 440 may (1) scan a physical or digital document that includes terms and conditions of an offer; (2) apply optical character recognition techniques to convert the scanned data into machine-encoded text; and (3) apply natural language processing techniques to the machine-encoded text to identify the terms and conditions of the offer. In particular, the user device 402, the contract authentication server 440, and/or another computing device can train a natural language model to identify the terms and conditions of the offer, where the natural language model is trained using a set of contracts that are each labeled to identify terms and conditions of an offer. The first text may be the machine-encoded text identified as the terms and conditions of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the terms and conditions of the offer, where the first text may be the machine-encoded text identified as the terms and conditions of the offer by the natural language processing techniques. As another example, the user device 402 or the contract authentication server 440 may receive the first text from another computing device (for example, via the network 410). As another example, the user device 402 or the contract authentication server 440 may receive the first text via user input.

At block 706, second text that represents consideration of an offer is obtained. For example, the user device 402 or the contract authentication server 440 may (1) scan a physical or digital document that includes consideration of an offer; (2) apply optical character recognition techniques to convert the scanned data into machine-encoded text; and (3) apply natural language processing techniques to the machine-encoded text to identify the consideration of the offer. In particular, the user device 402, the contract authentication server 440, and/or another computing device can train a natural language model to identify the consideration of the offer, where the natural language model is trained using a set of contracts that are each labeled to identify consideration of an offer. The second text may be the machine-encoded text identified as the consideration of the offer by the natural language processing techniques. As another example, the user device 402 or the contract authentication server 440 may receive a digital document that already includes machine-encoded text. Thus, the user device 402 or the contract authentication server 440 can apply natural language processing techniques to the machine-encoded text to identify the consideration of the offer, where the second text may be the machine-encoded text identified as the consideration of the offer by the natural language processing techniques. As another example, the user device 402 or the contract authentication server 440 may receive the second text from another computing device (for example, via the network 410). As another example, the user device 402 or the contract authentication server 440 may receive the second text via user input.

At block 708, a first value corresponding to a user input that indicates that a user accepts the terms and conditions and consideration is obtained. For example, the user device 402 may display, in a user interface generated by an application retrieved from the application distribution server 420, information identifying a transaction (for example, terms and conditions, consideration, a merchant, a date, a location, etc.) and prompt a user to identify whether the user accepts or rejects the transaction. If the user provides an input (for example, a selection of a button or box in the user interface, text that indicates acceptance, a voice command, a touch gesture, a nod or other facial movement detected by a camera, etc.) that corresponds with an acceptance of the transaction, then this input may result in the user device 402 obtaining the first value. As another example, the contract authentication server 440 may associate the first value with an acceptance of a transaction and may associate a different value with a rejection of a transaction. As described in greater detail below, the contract authentication server 440 may be generating a hash contract for transaction verification purposes and can therefore obtain the first value.

At block 710, first data based on a second value representing an identity of the user is obtained. For example, the user device 402 may prompt a user, in a user interface generated by the application retrieved from the application distribution server 420, to provide one or more inputs that uniquely represent the user (for example, one or more multi-factor authentication factors). For example, such input can include a fingerprint, a vein reading, an iris scan, face-recognition, a passcode, a single-use code, a key card, a digital certificate, a digital token, and/or any other item that represents a biological characteristic of the user, something that the user knows, or something that the user has. The component(s) that receive the input(s) (for example, a fingerprint reader, a vein reader, an iris scanner, a camera, a key card reader, etc.) or the user device 402 can then convert the input(s) into a second value, which may be an alphanumeric value, a hexadecimal value, a string value, and/or the like. For example, the component(s) or the user device 402 can retrieve mapping information that indicates how to convert the input(s) into the second value. If more than one input is provided, the user device 402 can concatenate the resulting second values to form a single second value in a manner as described herein. The user device 402 may then apply a hash function to the second value to form the first data. Thus, the first data may be a hash code, also referred to herein as an identity hash code.

The contract authentication server 440 may obtain the first data from the user device 402. For example, when the application running on the user device 402 is first installed or when a user initially provides the input(s) uniquely representing the user, the user device 402 may generate the first data and transmit the first data to the contract authentication server 440. The contract authentication server 440 may then store the first data in the user identity data store 446 and retrieve the first data when generating the hash contract.

At block 712, a previous hash code is retrieved. For example, the contract authentication server 440 may have previously requested the user device 402 to authorize a transaction. If the user device 402 authorized the transaction (for example, via the generation of a hash contract), then this previously generated hash contract is retrieved. However, if the user device 402 declined the transaction (for example, via the generation of a decline hash code), then this previously generated decline hash code is retrieved. In some embodiments, the previous hash code is the last hash code that was generated. Thus, if the user device 402 authorized a transaction the last time the contract authentication server 440 requested the user device 402 to authorize a transaction, then a hash contract is retrieved. Otherwise, if the user device 402 declined a transaction the last time the contract authentication server 440 requested the user device 402 to authorize a transaction, then a decline hash code is retrieved.

At block 714, a symmetric key is retrieved. The user device 402 may generate the symmetric key based on a master key that is derived using a unique initialization key embedded in an application retrieved from the application distribution server 420. The contract authentication server 440 may have generated the unique initialization key that is embedded in the application retrieved from the application distribution server 420 and executed by the user device 402. Thus, the contract authentication server 440 may generate the symmetric key based on a master key that is derived from the generated unique initialization key. The retrieved symmetric key may be a single-use key (for example, a new symmetric key is generated each time the user device 402 receives a transaction authorization request and/or each time the contract authentication server 440 verifies whether a transaction was authorized or declined). Additional details regarding the generation of the symmetric key are described below with respect to FIGS. 8A-8B.

At block 716, a hash of the first text, the second text, the first value, the first data, the previous hash code, and the symmetric key is generated to form a hash contract. For example, the user device 402 or contract authentication server 440 may concatenate the first text, the second text, the first value, the first data, the previous hash code, and the symmetric key to form a single string in a manner as described herein and apply a hash function to the single string to form the hash contract. The first text, the second text, the first value, the first data, the previous hash code, and the symmetric key may be concatenated in any order. Once the hash contract is formed, the hash contract generation routine 700 is complete, as shown at block 718.

While FIG. 7 depicts blocks 704, 706, 708, 710, 712, and 714 in a specific order, this is merely an illustrative example and is not meant to be limiting. Blocks 704, 706, 708, 710, 712, and 714 can be completed in any order.

In addition, while FIG. 7 depicts a hash function being applied to the first text, the second text, the first value, the first data, the previous hash code, and the symmetric key in order to form the hash contract, this is merely an illustrative example and is not meant to be limiting. In particular, any of the first text, the second text, the first value, the first data, the previous hash code, and the symmetric key can be hashed individually or in combination with other contract elements (for example, where the contract elements are the first text, the second text, the first value, the first data, the previous hash code, and the symmetric key) before the hash function that generates the hash contract is applied. The resulting hash value(s) can then be hashed with any contract elements that have not yet been included as an input to a hash function to form another hash value (for example, if at least one contract element has not been used as an input to a hash function) or the hash contract (for example, if all contract elements have been used as an input to a hash function). If another hash value is formed, then this hash value can be hashed with any contract elements that have not yet been included as an input to a hash function to form another hash value or the hash contract, and this process can continue until all contract elements have been used as an input to a hash function.

Figure 8A:
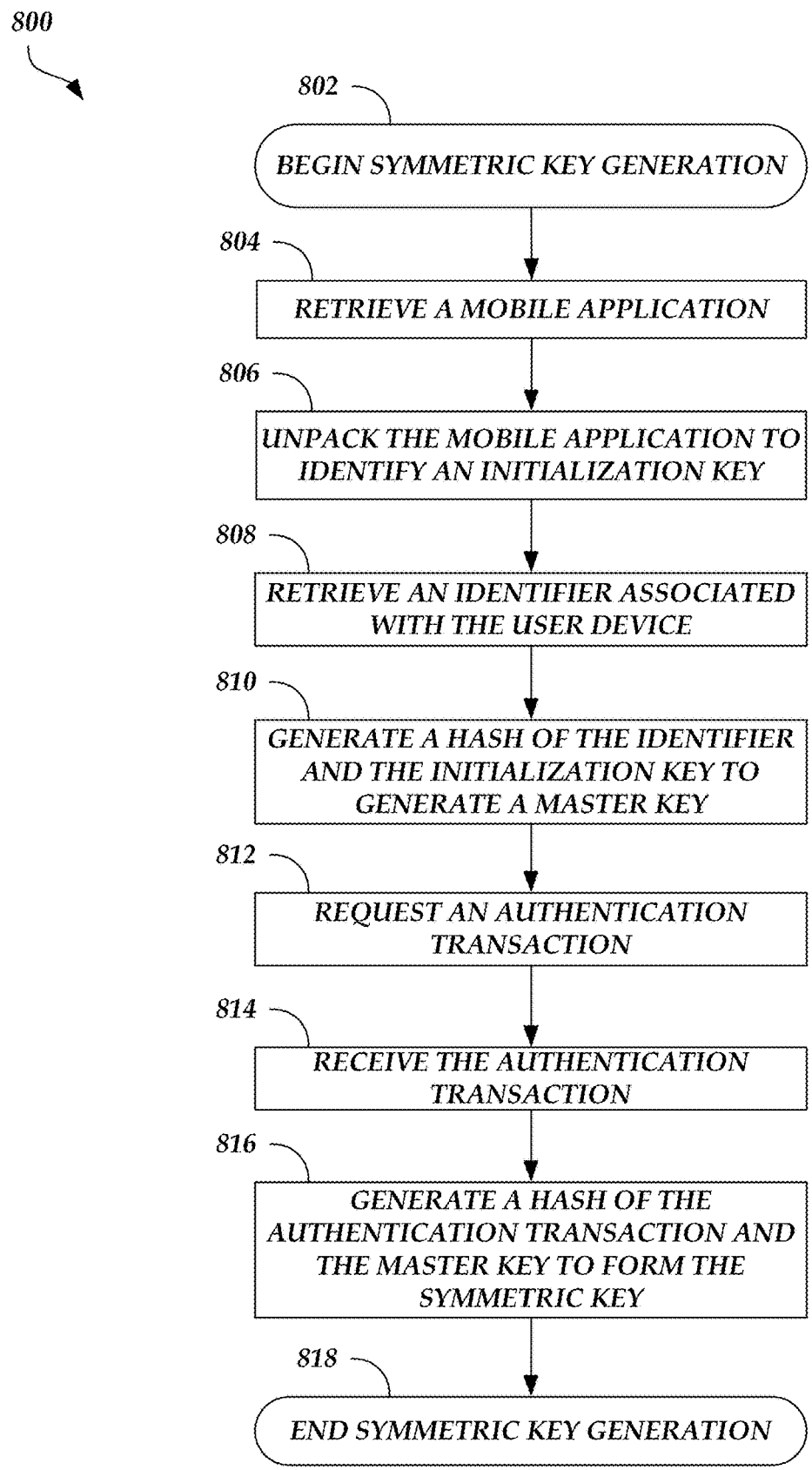
FIG. 8A is a flow diagram depicting a symmetric key generation routine illustratively implemented by a user device, according to one embodiment.

FIG. 8A is a flow diagram depicting a symmetric key generation routine 800 illustratively implemented by a user device, according to one embodiment. As an example, the user device 402 of FIG. 4 (for example, the application retrieved from the application distribution server 420) can be configured to execute the symmetric key generation routine 800. The symmetric key generation routine 800 begins at block 802.

At block 804, a mobile application is retrieved. For example, the mobile application may be retrieved from the application distribution server 420 via the application data store 422. Alternatively, a desktop or laptop application may be retrieved.

At block 806, the mobile application is unpacked to identify an initialization key. For example, each version of the mobile application stored in the application data store 422 may include a unique initialization key. The user device 402 may unpack the mobile application when installing the mobile application after the mobile application is retrieved. During the unpacking process, the installer running on the user device 402 may obtain the initialization key and store the initialization key locally in a secure location (for example, in an encrypted folder in the user device 402 file system). The initialization key may be stored such that the initialization key is not accessible via the network 410.

At block 808, an identifier associated with the user device is retrieved. For example, the identifier may be a MAC address of the user device 402, an IP address of the user device 402, a peripheral identification of the user device 402, a name of the user device 402, or another value that can uniquely identify the user device 402. Alternatively or in addition, an identifier associated with a user is retrieved. For example, an identifier associated with the user may be a name, an address, a unique identifier (for example, social security number, a value assigned to the user, or any other unique number), a fingerprint, a vein reading, an iris scan, face-recognition, a passcode, a single-use code, a key card, a digital certificate, a digital token, and/or another value that can uniquely identifier the user (for example, another multi-factor authentication factor).

At block 810, a hash of the identifier and the initialization key is generated to generate a master key. For example, the user device 402 can retrieve the initialization key from the secure location, concatenate the identifier and the initialization key in any order to form a string value, and then apply a hash function to the string value to generate the master key. The user device 402 may then store the master key locally in a secure location (for example, in an encrypted folder in the user device 402 file system). The master key may be stored such that the master key is not accessible via the network 410.

At block 812, an authentication transaction is requested. For example, the authentication transaction may be a zero transaction or any other type of message that allows the user device 402 to form a master key and/or symmetric key (for example, a zero transaction, a transaction with a non-zero amount, a symmetric key generation message, a master key generation message, and/or the like). As used herein, a zero transaction may be a transaction in which an amount is zero. The user device 402 may transmit the request to the contract authentication server 440 (for example, the request generator 442). The request may include an identifier associated with the user device 402 (or an identifier associated with a user, a hash of an identifier associated with the user device 402, a hash of an identifier associated with a user, and/or a combination thereof) or the identifier may be transmitted to the contract authentication server 440 separately from the request.

At block 814, the authentication transaction is received. The authentication transaction may include transaction metadata, such as at least one of a date, an identification of an entity (for example, a merchant, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

At block 816, a hash of the authentication transaction and the master key is generated to form the symmetric key. For example, the user device 402 may concatenate the master key and at least a portion of the transaction metadata included in the authentication transaction to form a single string in a manner as described herein and apply a hash function to the single string to form the symmetric key. The master key and the transaction metadata may be concatenated in any order. Once the symmetric key is formed, the symmetric key generation routine 800 is complete, as shown at block 818.

The user device 402 may execute the symmetric key generation routine 800 to generate the initial symmetric key. If the user device 402 uses a single-use symmetric key such that a new symmetric key is generated each time a request for an authorization of a transaction is received, then the user device 402 may repeat blocks 812, 814, and 816 each time a new request for an authorization of a transaction is received. Thus, the user device 402 may generate the master key once and use the same master key in generating each new symmetric key.

Figure 8B:
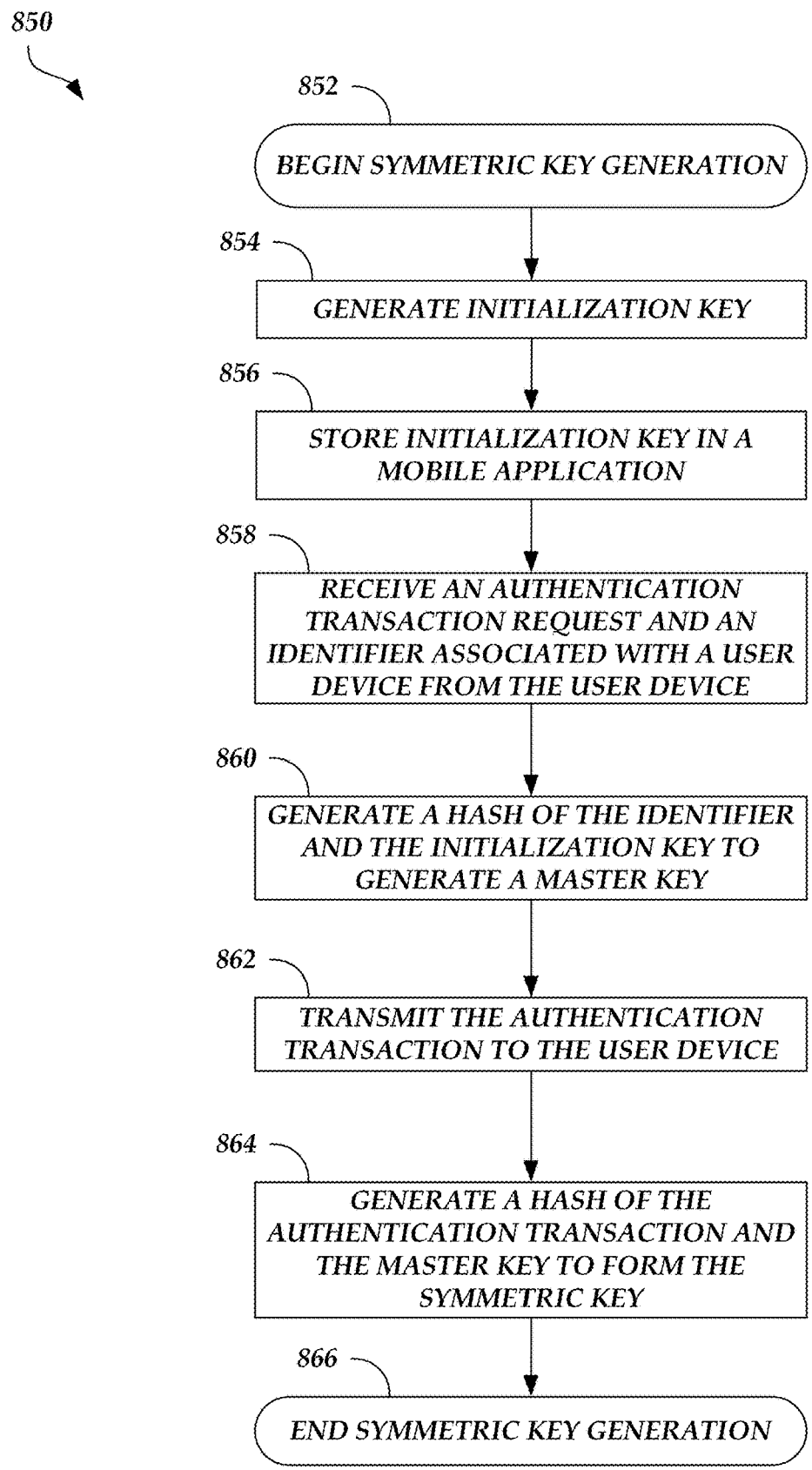
FIG. 8B is a flow diagram depicting a symmetric key generation routine illustratively implemented by a contract authentication server, according to one embodiment.

FIG. 8B is a flow diagram depicting a symmetric key generation routine 850 illustratively implemented by a contract authentication server, according to one embodiment. As an example, the contract authentication server 440 of FIG. 4 can be configured to execute the symmetric key generation routine 850. The symmetric key generation routine 850 begins at block 852.

At block 854, an initialization key is generated. For example, a sequential number generator, a random number generator, a pseudorandom number generator, a previous initialization key, and/or the like can be used to generate the initialization key.

At block 856, the initialization key is stored in a mobile application. For example, the contract authentication server 440 (for example, the application generator 441) can insert the initialization key into the code of an application or into an application package that includes the code of an application, application metadata, and/or other information to form a unique version of the application. The contract authentication server 440 may the initialization key into the code of the application or into the application package in a manner such that the initialization key is inaccessible until a computing device (for example, a user device 402) executes instructions to install the application locally. Thus, the initialization key may be protected from unauthorized access. The contract authentication server 440 can then transmit the unique version of the application to the application distribution server 420 for storage in the application data store 422. The initialization key may further be stored in the key data store 447 in an entry associated that will be associated with the user device 402 once the user device 402 retrieves the unique version of the application from the application distribution server 420.

At block 858, an authentication transaction request and an identifier associated with a user device is received from the user device. For example, the authentication transaction request and the identifier may be transmitted by the user device 402 after the user device 402 has retrieved the unique version of the application from the application distribution server 420 and installed the unique version of the application locally. The identifier may be a MAC address of the user device 402, an IP address of the user device 402, a peripheral identification of the user device 402, or another value that can uniquely identify the user device 402. Alternatively or in addition, an identifier associated with a user is received. For example, an identifier associated with the user may be a name, an address, a unique identifier (for example, social security number, a value assigned to the user, or any other unique number), a fingerprint, a vein reading, an iris scan, face-recognition, a passcode, a single-use code, a key card, a digital certificate, a digital token, and/or another value that can uniquely identifier the user. The identifier associated with the user may be transmitted by the user device 402 after the user device 402 has retrieved the unique version of the application from the application distribution server 420 and installed the unique version of the application locally.

At block 860, a hash of the identifier and the initialization key is generated to generate a master key. For example, the contract authentication server 440 can retrieve the initialization key from the key data store 447, concatenate the identifier and the initialization key in any order to form a string value, and then apply a hash function to the string value to generate the master key. The contract authentication server 447 may then store the master key in the key data store 447 in the same entry as the initialization key. The master key may be stored such that the master key is not accessible via the network 410.

At block 862, the authentication transaction is transmitted to the user device. For example, the authentication transaction may be any message that allows the user device 402 to form a master key and/or symmetric key (for example, a zero transaction, a transaction with a non-zero amount, a symmetric key generation message, a master key generation message, and/or the like). The authentication transaction may include transaction metadata, such as at least one of a date, an identification of one or more entities (for example, a merchant, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

While block 862 is depicted in FIG. 8B as occurring after block 860, this is not meant to be limiting. For example, block 862 may be performed before block 860.

At block 864, a hash of the authentication transaction and the master key is generated to form the symmetric key. For example, the contract authentication server 440 may concatenate the master key and at least a portion of the transaction metadata included in the authentication transaction to form a single string in a manner as described herein and apply a hash function to the single string to form the symmetric key. The master key and the transaction metadata may be concatenated in any order. Once the symmetric key is formed, the symmetric key generation routine 850 is complete, as shown at block 866.

The contract authentication server 440 may execute the symmetric key generation routine 850 to generate the initial symmetric key. If the contract authentication server 440 uses a single-use symmetric key such that a new symmetric key is generated each time a request for an authorization of a transaction is transmitted, then the contract authentication server 440 may repeat blocks 858, 862, and 864 each time a new request for an authorization of a transaction is transmitted. Thus, the contract authentication server 440 may generate the master key once and use the same master key in generating each new symmetric key.

The routines 500, 520, 600, 650, 700, 800, and 850 depicted in FIGS. 5A through 8B may also be executed by the user device 402 and/or the contract authentication server 440 when such devices generate a decline hash code. However, instead of obtaining a first value corresponding to a user input that indicates that a user accepts the terms and conditions and consideration, the user device 402 and/or contract authentication server 440 may instead obtain a rejection value corresponding to a user input that indicates that a user rejects the terms and conditions and/or consideration. Thus, the first value corresponding to an acceptance may be replaced with the rejection value in the routines 500, 600, 650, 700, 800, and 850.

Example Block Diagram for Generating a Symmetric Key

Figure 9A:
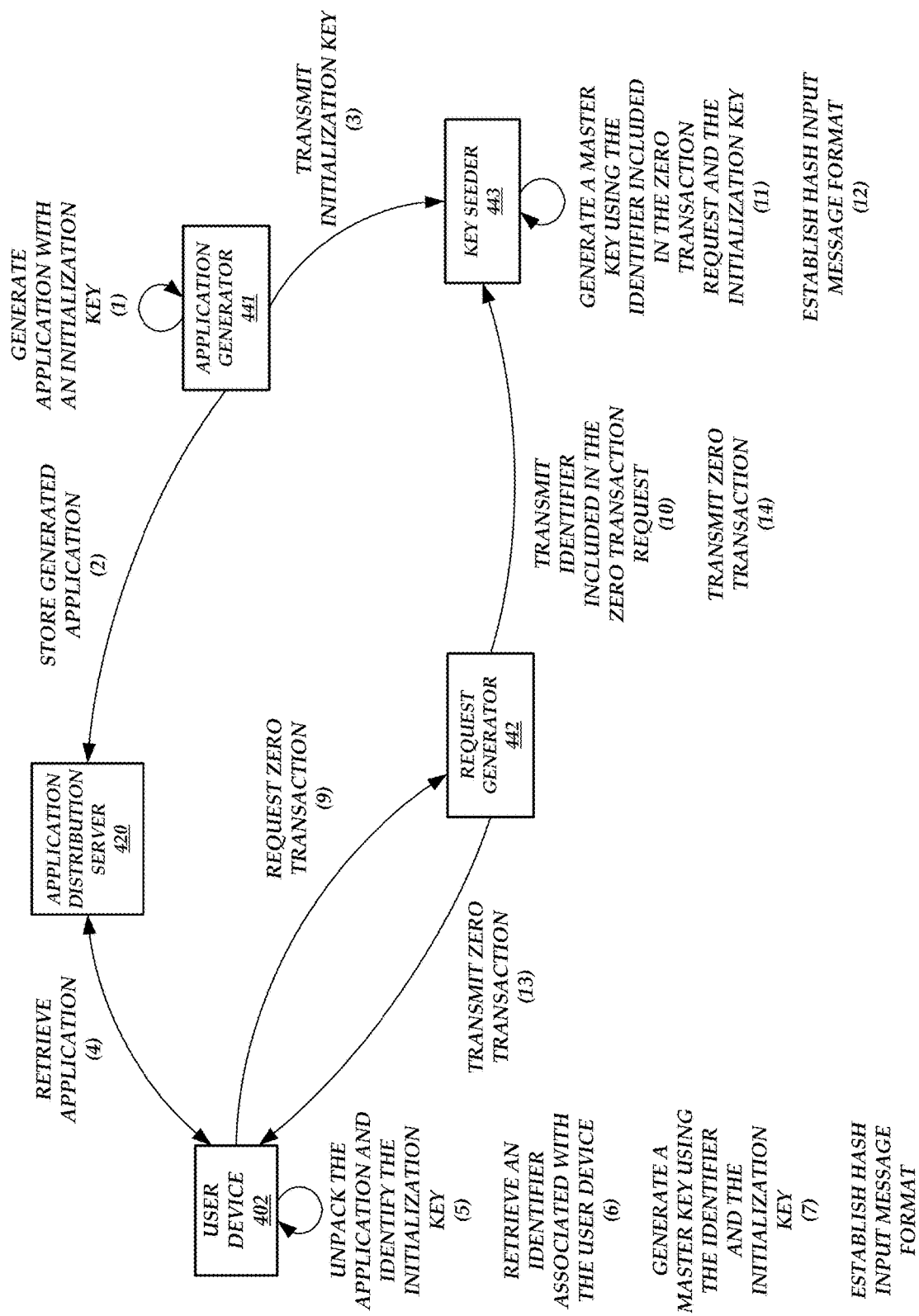
FIGS. 9A-9B are block diagrams of the hash contract generation and verification environment of FIG. 4 illustrating the operations performed by the components of the hash contract generation and verification environment to generate a symmetric key.
Figure 9B:
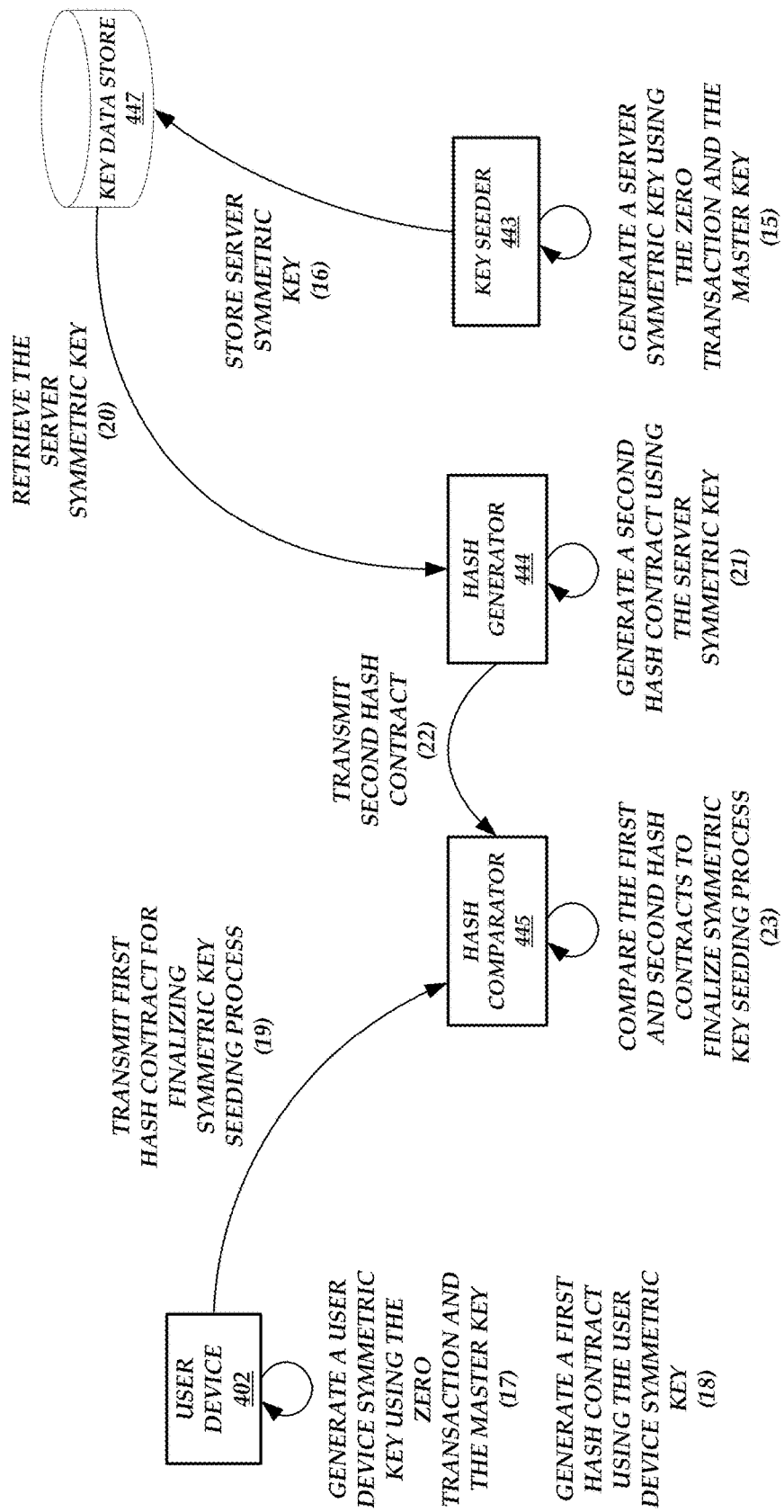

FIGS. 9A-9B are block diagrams of the hash contract generation and verification environment 400 of FIG. 4 illustrating the operations performed by the components of the hash contract generation and verification environment 400 to generate a symmetric key. For simplicity, FIGS. 9A-9B depict the generation of a symmetric key via the use of a zero transaction. However, this is not meant to be limiting. For example, any type of authentication transaction described herein may be substituted for the zero transaction in order to generate the symmetric key.

As illustrated in FIG. 9A, the application generator 441 generates an application with an initialization key at (1). For example, the application generator 441 can generate the initialization key and insert the initialization key into the code of the application or into an application package that includes the code of the application. The application generator 441 can then transmit the generated application to the application distribution server 420 for storage at (2). Before, during, or after transmitting the generated application to the application distribution server 420, the application generator 441 can transmit the initialization key to the key seeder 443 at (3). Alternatively or in addition, the application generator 441 can store the initialization key in the key data store 447.

At a later time, the user device 402 may retrieve the application from the application distribution server 420 at (4). Once the user device 402 has retrieved the application, the user device 402 may unpack the application and identify the initialization key inserted into the code of the application or into the application package at (5). For example, the user device 402 may unpack the application when installing the application. During the unpacking process, the installer running on the user device 402 may obtain the initialization key and store the initialization key locally in a secure location (for example, in an encrypted folder in the user device 402 file system).

The following steps performed by the user device 402 may specifically be performed by the retrieved application running on the user device 402. The user device 402 can then retrieve an identifier associated with the user device at (6) and/or an identifier associated with a user (not shown). For example, the identifier may be a MAC address of the user device 402, an IP address of the user device 402, a peripheral identification of the user device 402, or another value that can uniquely identify the user device 402 and/or the user. The user device 402 can then generate a master key using the identifier and the initialization key at (7). For example, the user device 402 can apply a hash function to the identifier and the initialization key to generate the master key. The user device 402 may discard the initialization key after the master key is generated so that the master key cannot be recreated.

The user device 402 may also use the initialization key and/or the identifier to establish a hash input message format at (8). For example, the hash input message format may determine the order in which contract elements are concatenated before a hash function is applied to the concatenated value to form a hash contract. The hash input message format may be dependent on the values of the initialization key and/or the identifier. In particular, a set of rules (for example, defined by code included in the application) may define how the user device 402 analyzes the initialization key and/or the identifier to set the hash input message format. As an illustrative example, the set of rules may dictate that (1) if the first two bits of the initialization key and the first two bits of the identifier are each "0," then the terms and conditions are the first hash function input, consideration is the second hash function input, acceptance or denial is the third hash function input, and identity is the fourth hash function input; (2) if the first two bits of the initialization key are "00" and the first two bits of the identifier are "01," then the terms and conditions are the second hash function input, consideration is the first hash function input, acceptance or denial is the third hash function input, and identity is the fourth hash function input; (3) if the first two bits of the initialization key are "00" and the first two bits of the identifier are "10," then the terms and conditions are the second hash function input, consideration is the first hash function input, acceptance or denial is the fourth hash function input, and identity is the third hash function input; and so on.

Once the hash input message format is set, the user device 402 can transmit a zero transaction request to the request generator 442 at (9). In an embodiment, the zero transaction request includes an identifier associated with the user device 402. In response to receiving the request, the request generator 442 can transmit the identifier to the key seeder 443 at (10).

The key seeder 443 can generate a master key using the identifier and the initialization key at (11). For example, the key seeder 443 can apply a hash function to the identifier and the initialization key to generate the master key. The key seeder 443 may discard the initialization key after the master key is generated so that the master key cannot be recreated. The key seeder 443 can further establish a hash input message format at (12) to be used by the contract authentication server 440 for transactions associated with the user of the user device 402. The key seeder 443 may use the same set of rules as the user device 402 in establishing the hash input message format. By using the same set of rules as the user device 402, the key seeder 443 may ensure that accurate transaction authorization verifications can be performed.

Before, during, or after the key seeder 443 generates the master key and establishes the hash input message format, the request generator 442 generates and transmits the zero transaction to the user device 402 at (13). The key seeder 443 may also transmit the zero transaction to the key seeder 443 at (14). The zero transaction may include transaction metadata, such as a date, an identification of one or more entities (for example, a merchant, a name of the entity that operates the contract authentication server 440, a name of the user associated with the user device 402, etc.), an amount (for example, zero), a location at which the transaction was initiated, terms and conditions, an item corresponding to the transaction, and/or the like.

As illustrated in FIG. 9B, the key seeder 443 generates a server symmetric key using the zero transaction and the master key at (15). For example, the key seeder 443 may apply a hash function to the zero transaction and the master key to generate the server symmetric key. The key seeder 443 may then store the server symmetric key in the key data store 447 at (16).

Before, during, or after the key seeder 443 generate and stores the server symmetric key, the user device 402 generates a user device symmetric key using the zero transaction and the master key at (17). For example, the user device 402 may apply a hash function to the zero transaction and the master key to generate the user device symmetric key. The user device 402 may then generate a first hash contract using the user device symmetric key at (18). For example, the user device 402 can apply a hash function to the user device symmetric key, data representing an acceptance, and/or other contract elements of the zero transaction (for example, terms and conditions, consideration, identity, etc.) to generate the first hash contract. The user device 402 then transmits the first hash contract to the hash comparator 445 at (19) for, for example, finalizing the symmetric key seeding process, as described below.

Before, during, or after the user device 402 generates the user device symmetric key and/or the first hash contract, the hash generator 444 retrieves the server symmetric key from the key data store 447 at (20). The hash generator 444 then generates a second hash contract using the server symmetric key at (21). For example, the hash generator 444 can apply a hash function to the server symmetric key, data representing an acceptance, and/or other contract elements of the zero transaction (for example, terms and conditions, consideration, identity, etc.) to generate the second hash contract. The hash generator 444 then transmits the second hash contract to the hash comparator 445 at (22).

The hash comparator 445 compares the first and second hash contracts to finalize the symmetric key seeding process at (23). For example, the hash comparator 445 determines whether the first hash contract matches the second hash contract. If the first and second hash contracts match, then the hash comparator 445 determines that the symmetric key generation process, as performed by the user device 402 and the contact authentication server 420, was executed correctly and/or that the contract authentication server 440 can begin sending transaction authorization requests to the user device 402. Otherwise, if the first and second hash contracts do not match, then the hash comparator 445 determines that an error occurred. In this case, the hash comparator 445 may instruct other components of the contract authentication server 440 and/or the user device 402 to repeat some or all of the steps depicted in FIGS. 9A-9B.

Counterpart Contracts

Figure 10:
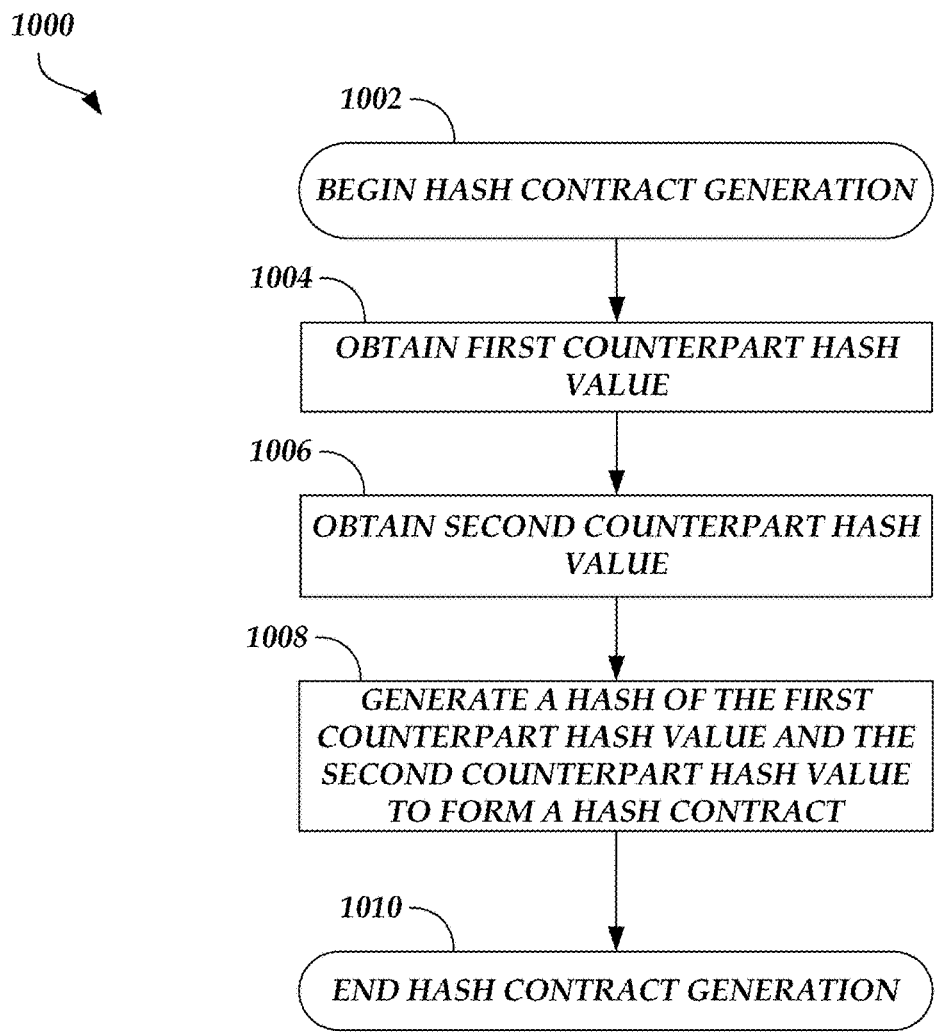
FIG. 10 is a flow diagram depicting a hash contract generation routine that uses counterpart contracts illustratively implemented by a user device or a contract authentication server, according to one embodiment.

FIG. 10 is a flow diagram depicting a hash contract generation routine 1000 that uses counterpart contracts illustratively implemented by a user device or a contract authentication server, according to one embodiment. As an example, the user device 402 or the contract authentication server 440 of FIG. 4 can be configured to execute the hash contract generation routine 1000. The hash contract generation routine 1000 begins at block 1002.

At block 1004, a first counterpart hash value is obtained. Generally, a counterpart contract may include a clause that allows parties to an agreement to execute separate copies of the agreement. The counterpart contracts, individually, when each counterpart is signed, may form a single legally enforceable contract. Thus, in a situation in which a contract is executed by one party and a counterpart clause is included in the terms and conditions, then the user device 402 or contract authentication server 440 may apply a hash function to data representing acceptance by one party and/or other contract elements to form the first counterpart hash value. In other words, the user device 402 or contract authentication server 440 may perform the same operations used to generate a hash contract in generating the first counterpart hash value.

At block 1006, a second counterpart hash value is obtained. For example, a different copy of the contract may be executed by a second party. The user device 402 or contract authentication server 440 may apply a hash function to data representing acceptance by the second party and/or other contract elements to form the second counterpart hash value.

At block 1008, a hash of the first counterpart hash value and the second counterpart hash value is generated to form a hash contract. For example, the user device 402 or contract authentication server 440 may concatenate the first counterpart hash value and the second counterpart hash value to form a single string in a manner as described herein and apply a hash function to the single string to form the hash contract. The first counterpart hash value and the second counterpart hash value may be concatenated in any order. Once the hash contract is formed, the hash contract generation routine 1000 is complete, as shown at block 1010. The hash contract generation routine 1000 is advantageous in that the routine cannot be performed with other types of digital contracts.

While FIG. 10 depicts blocks 1004 and 1006 in a specific order, this is merely an illustrative example and is not meant to be limiting. Blocks 1004 and 1006 can be completed in the reverse order.

Figure 11:
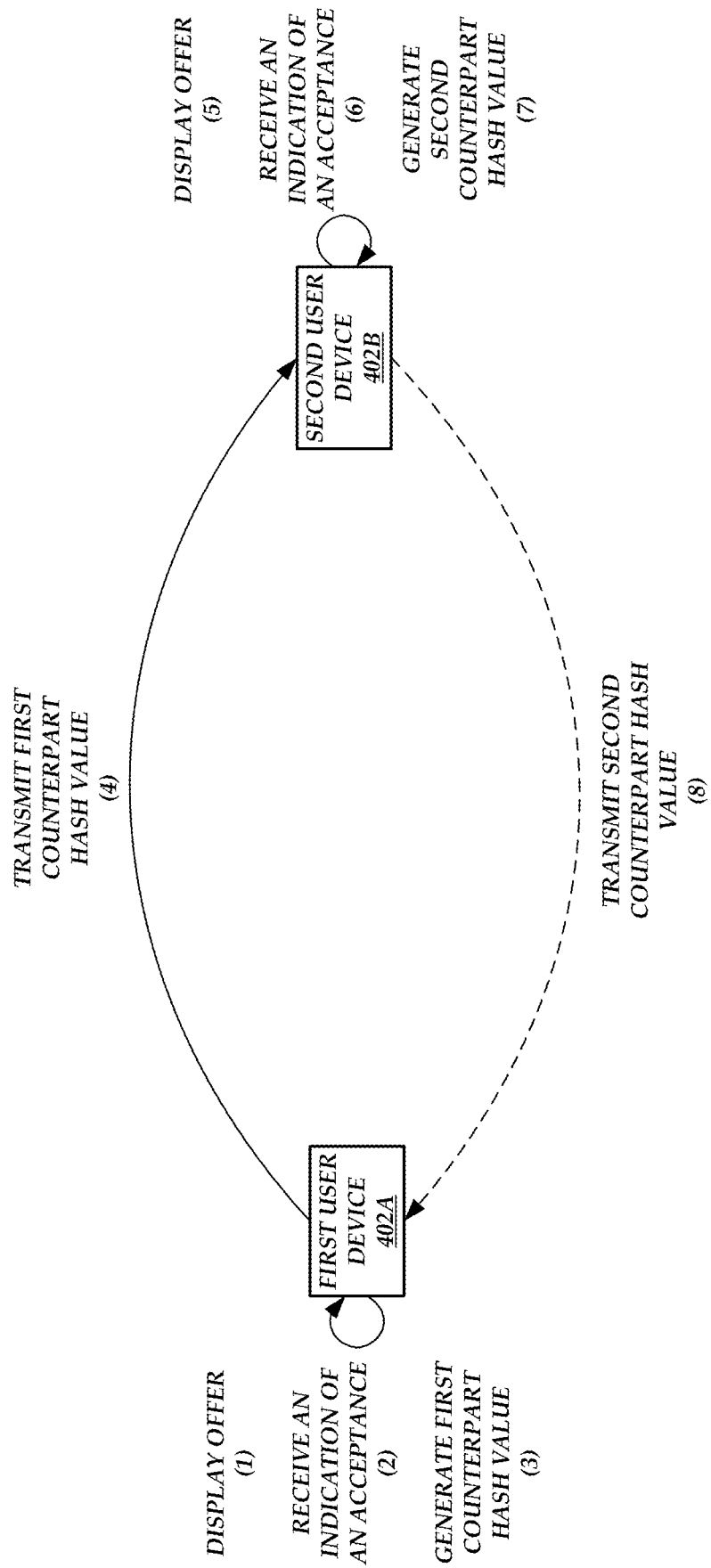
FIG. 11 is a block diagram of the hash contract generation and verification environment of FIG. 4 illustrating the operations performed by the components of the hash contract generation and verification environment to generate and transmit counterpart hash values.

FIG. 11 is a block diagram of the hash contract generation and verification environment 400 of FIG. 4 illustrating the operations performed by the components of the hash contract generation and verification environment 400 to generate and transmit counterpart hash values. As illustrated in FIG. 11, the hash contract generation and verification environment 400 includes a first user device 402A and a second user device 402B. The first and second user devices 402A-B may each be running an application retrieved from the application distribution server 420. The applications may each execute the operations described below as being performed by the first or second user devices 402A-B, respectively.

The first user device 402A may display an offer at (1). For example, the first user device 402A may display the terms and conditions and consideration. The offer may be displayed for review by a first user. If the first user agrees to the terms and conditions and consideration, then the first user device 402A may receive an indication of an acceptance of the offer at (2). The first user device 402A may further prompt the first user to provide one or more input(s) that uniquely identify the first user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). In response to receiving the acceptance and/or the input(s), the first user device 402A generates a first counterpart hash value at (3) (for example, using data representing the acceptance and/or the input(s)). For example, the first user device 402A may apply a hash function to data representing acceptance by the first user and/or other contract elements to form the first counterpart hash value. The first counterpart hash value may be a hash contract if all parties to the agreement have signed their respective counterpart contract. The first user device 402A can then transmit the first counterpart hash value to the second user device 402B at (4).

In response to receiving the first counterpart hash value indicating that the first user accepted the offer, the second user device 402B displays the offer at (5). The offer may be displayed for review by a second user. If the second user also agrees to the terms and conditions and consideration, then the second user device 402B may receive an indication of an acceptance of the offer at (6). The second user device 402B may further prompt the second user to provide one or more input(s) that uniquely identify the second user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). In response to receiving the acceptance and/or the input(s), the second user device 402B generates a second counterpart hash value at (7) (for example, using data representing the acceptance and/or the input(s)). For example, the second user device 402B may apply a hash function to data representing acceptance by the second user and/or other contract elements to form the second counterpart hash value, which results in the formation of a legally enforceable contract. Here, the second counterpart hash value is a hash contract because all parties have signed their respective counterpart contract. Optionally, the second user device 402B can then transmit the second counterpart hash value to the first user device 402A at (8).

The examples of FIGS. 10 and 11 may apply in situations in which no pre-existing agreement directed to the subject of the current agreement exists between the parties that enter into the current agreement. However, in the case of credit card transactions, mortgage applications, or other similar transactions, a user may have a pre-existing agreement with a bank, a merchant, a credit company, a credit reporting agency, and/or the like. For example, the pre-existing agreement may indicate that the user agrees to provide payment for transactions made with a credit card by a certain date in exchange for a credit card company or a bank providing payment to a merchant or a merchant's bank at the time that the user uses a credit card to make a purchase. Thus, counterpart contracts may not be necessary. Rather, the acceptance of a transaction by one party—the user—may result in the formation of a legally enforceable contract. FIGS. 13A through 19B depict such transactions accepted (or rejected) by one party.

Reordering Hash Inputs

Figure 12:
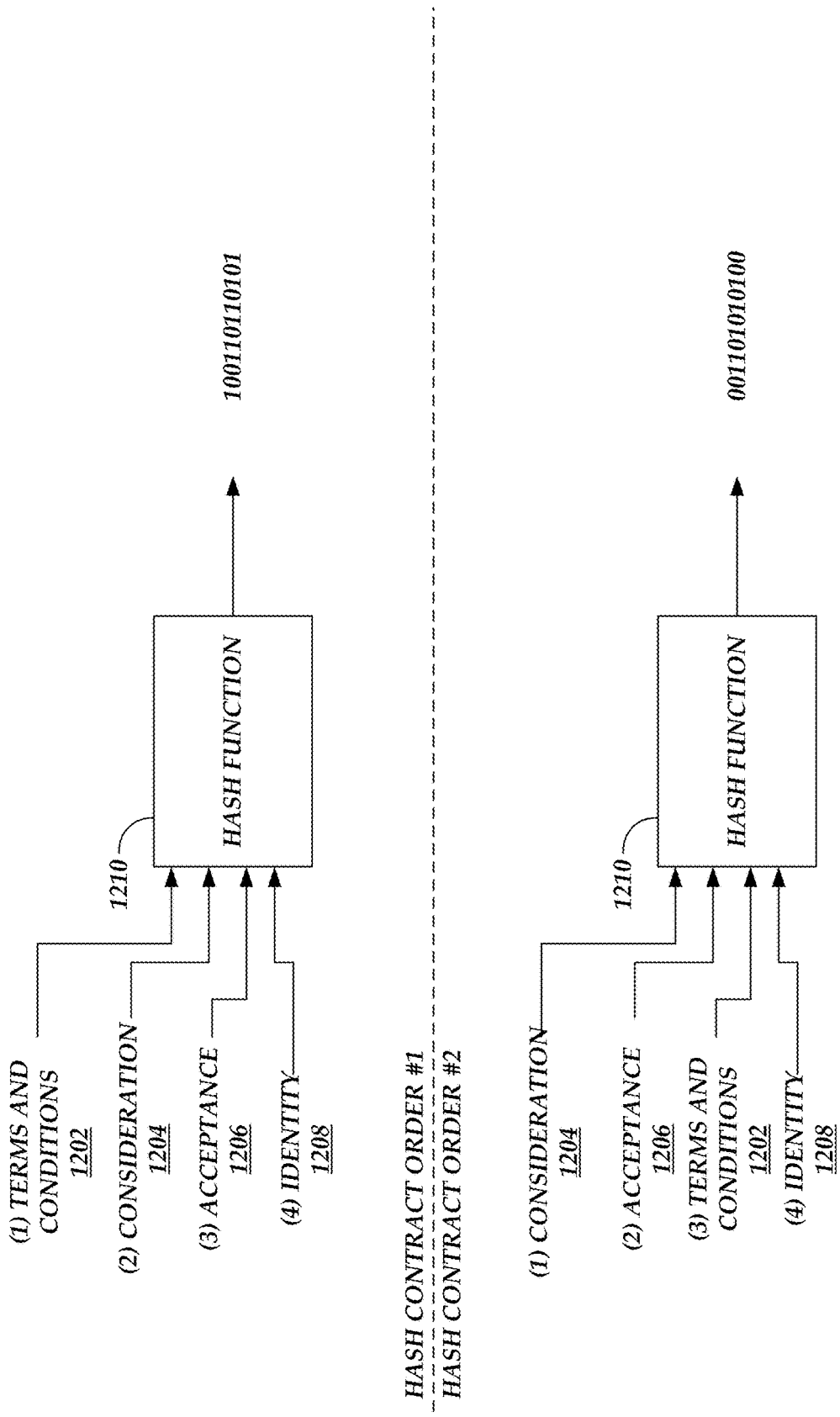
FIG. 12 illustrates an exemplary block diagram depicting the generation of hash contracts using different hash input message formats.

FIG. 12 illustrates an exemplary block diagram depicting the generation of hash contracts using different hash input message formats. As described above with respect to FIGS. 9A-9B, the user device 402 and the contract authentication server 440 (for example, the key seeder 443) may each establish a hash input message format. It may be important that each device establish the same hash input message format because a value of a resulting hash contract depends on the order of concatenated contract elements.

As illustrated in FIG. 12, in a first hash contract order, the contract elements are concatenated in the following order: terms and conditions 1202, consideration 1204, acceptance 1206, and identity 1208, where identity 1208 is appended to the end of the acceptance 1206, the acceptance 1206 is appended to the end of the consideration 1204, and the consideration 1204 is appended to the end of the terms and conditions 1202. Given this order, the hash function 1110 then produces the hash contract "100110110101."

In a second hash contract order, the same contract elements are concatenated in the following order: consideration 1204, acceptance 1206, terms and conditions 1202, and identity 1208, where identity 1208 is appended to the end of the terms and conditions 1202, the terms and conditions 1202 is appended to the end of the acceptance 1206, and the acceptance 1206 is appended to the end of the consideration 1204. Given this order, the hash function 1210 then produces the hash contract "001101010100." Thus, the two hash values are different even though the contract elements are the same. However, even though the two hash values are different, the two hash values still represent the same legally enforceable contract given that the contract elements are the same.

Given the importance of the order of concatenation, masking the order in which the contract elements are concatenated to form the hash contract may further secure the transaction authorization process from unauthorized or malicious devices attempting to spoof a user device 402. In fact, because the user device 402 and the contract authentication server 440 independently establish the hash input message format (for example, using the initialization key and/or the identifier associated with the user device 402), the hash input message format is not transmitted over a public network, such as the network 410, and therefore is not susceptible to unauthorized access.

The contract authentication server 440 may concatenate contract elements in a different order for different user devices 402, users, groups of users, networks, applications, systems, and/or any other criteria that may define an entity or a group of entities. For example, the contract authentication server 440 may concatenate contract elements according to the first hash contract order for a first user device 402 and may concatenate contract elements according to the second hash contract order for a second user device 402.

The techniques described herein for varying the order of contract element concatenation can be applied not only to the generation of hash contracts, but also to the generation of an identity hash, the generation of an authentication hash, and/or the generation of any other hash code.

Example Out-of-Band Credit Card Transaction Requests

Figure 13A:
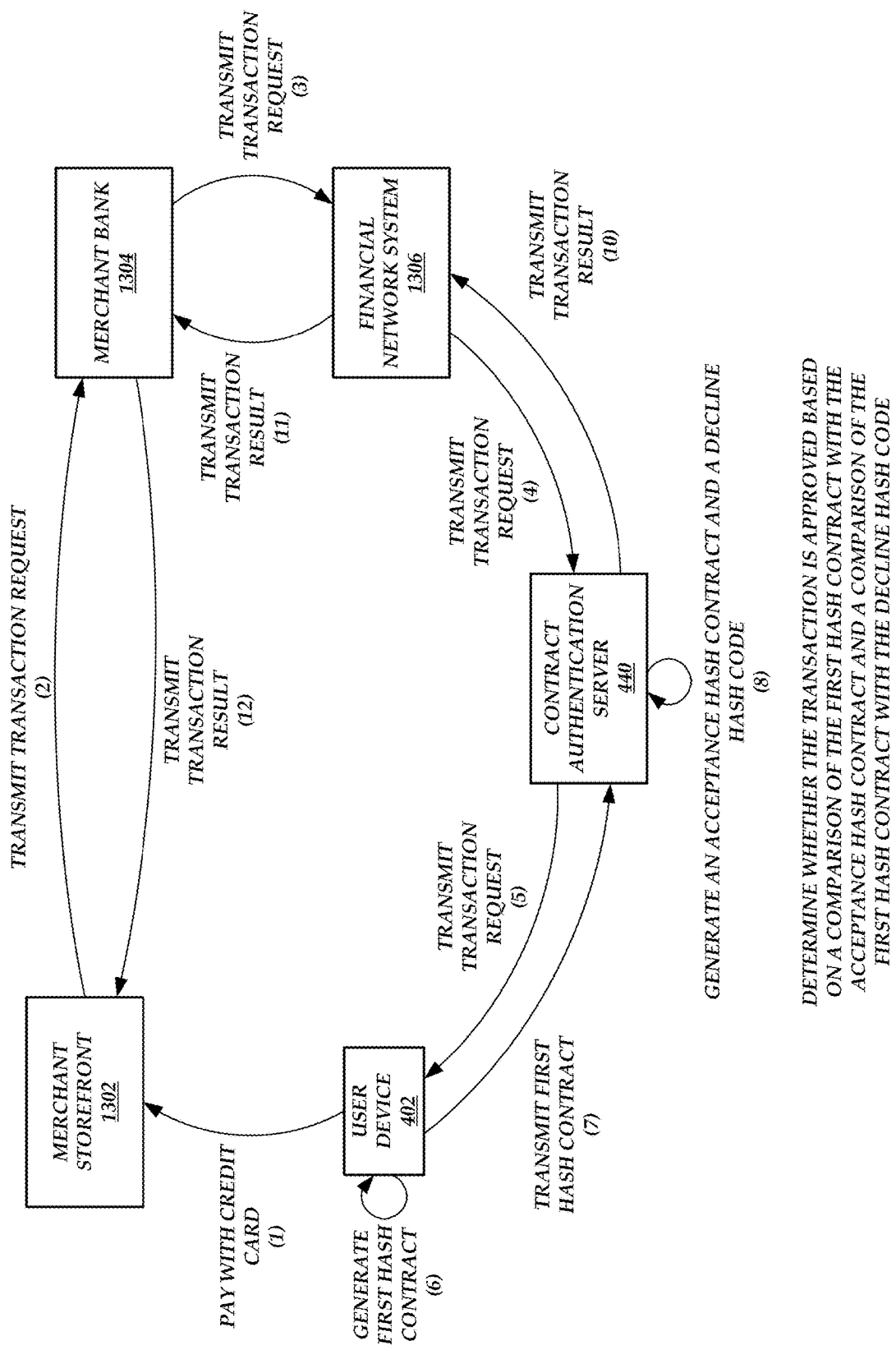
FIG. 13A is a block diagram of the hash contract generation and verification environment of FIG. 4 illustrating the operations performed by the components of the hash contract generation and verification environment to request authorization of a transaction out-of-band when a credit card is present.

FIG. 13A is a block diagram of the hash contract generation and verification environment 400 of FIG. 4 illustrating the operations performed by the components of the hash contract generation and verification environment 400 to request authorization of a transaction out-of-band when a credit card is present. As used herein, an out-of-band transaction request occurs when the contract authentication server 440 communicates directly with the user device 402 to request authorization of a transaction. The contract authentication server 400 communicates directly with the user device 402 to request authorization of a transaction without going through the entity with which the user or user device 402 is attempting to enter into an agreement (for example, a device representing a POS, such as the merchant storefront 1302, credit card processing network gateway 1308, or mortgage company server 1902). Conversely, an in-band transaction request occurs when the entity with which the user or user device 402 is attempting to enter into an agreement (for example, a device representing a POS, such as the merchant storefront 1302, credit card processing network gateway 1308, or mortgage company server 1902) requests authorization of a transaction and forwards the resulting hash code (for example, hash contract or decline hash code) to the contract authorization server 440. The contract authorization server 440 then authorizes or rejects the transaction through the entity with which the user or user device 402 is attempting to enter into an agreement. In other words, an in-band transaction request may occur when the contract authentication server 440 does not directly communicate with the user device 402.

As illustrated in FIG. 13A, a user pays for an item or service with a credit card at (1). The user may pay in person and/or using the user device 402 (for example, via a mobile wallet application). The user may pay for the item or service at a merchant storefront 1302. The merchant storefront 1302 may be a physical location, such as a store that offers goods or services.

The merchant storefront 1302 can then transmit a transaction request to a merchant bank 1304 at (2). The merchant bank 1304 may be a bank that manages a bank account for the merchant storefront 1302. If the transaction is approved, then the user's credit card issuing bank, represented here as the contract authentication server 440, may pay the merchant bank 1304 the transaction amount (or some percentage thereof) and the merchant bank 1304 may credit the account of the merchant storefront 1302 with the transaction amount (or some percentage thereof). The transaction request may include transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

The merchant bank 1304 can forward the transaction request to a financial network system 1306 at (3). The financial network system 1306 may be operated by an entity that manages credit cards, such as the user's credit card. The financial network system 1306 may analyze the transaction request and route the transaction request to the user's credit card issuing bank (for example, the contract authentication server 440) at (4).

In response to receiving the transaction request, the contract authentication server 440 can transmit a transaction request to the user device 402 at (5). The transaction request may be received by the application retrieved from the application distribution server 420 that is running on the user device 402. Reception of the transaction request may cause the user device 402 (for example, the application) to prompt the user to accept or decline the transaction corresponding to the credit card payment at step (1). The prompt may include information associated with the transaction, such as some or all of the transaction metadata included in the transaction request transmitted by the merchant storefront 1302. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user accepts the transaction, then the user device 402 generates a first hash contract at (6) in a manner as described herein. The user device 402 can then transmit the first hash contract to the contract authentication server 440 at (7). Alternatively, not shown, if the user declines the transaction, then the user device 402 generates a decline hash code and transmits the decline hash code to the contract authentication server 440.

Before, during, or after the user device 402 generates the first hash contract, the contract authentication server 440 generates an acceptance hash contract and a decline hash code at (8). The contract authentication server 440 then determines whether the transaction is approved based on a comparison of the first hash contract with the acceptance hash contract and a comparison of the first hash contract with the decline hash code at (9). Here, because the user accepted the transaction, the first hash contract and the acceptance hash contract match and the first hash contract and the decline hash code do not match. Thus, the contract authentication server 440 determines that the transaction is approved.

The contract authentication server 440 can then transmit the transaction result (for example, an approval) to the financial network system 1306 at (10), which forwards the transaction result to the merchant bank 1304 at (11). The merchant bank 1304 can then forward the transaction result to the merchant storefront 1302 at (12), which results in the merchant storefront 1302 allowing the transaction to be completed. In this case, the merchant storefront 1302 may not need to keep the signed receipt as a contract for the user to pay because the user may have already signed a contract with the entity operating the contract authentication server 440 (for example, the card issuing bank) in which the entity agrees to pay the merchant storefront 1302 when a transaction is authorized.

Note that while FIG. 13A depicts the merchant bank 1304 and the financial network system 1306, these systems are not necessary. For example, the merchant storefront 1302 may communicate directly with the financial network system 1306 and/or the contract authentication server 440. Similarly, the merchant bank 1304 may communicate directly with the contract authentication server 440.

In addition, other systems not shown in FIG. 13A may be present in the workflow. For example, intermediary systems may be present between the merchant bank 1304 and the financial network system 1306 and/or between the financial network system 1306 and the contract authentication server 440. As another example, a credit card processing network gateway in communication with the user device 402 and/or the merchant storefront 1302 may be present in the workflow.

Figure 13B:
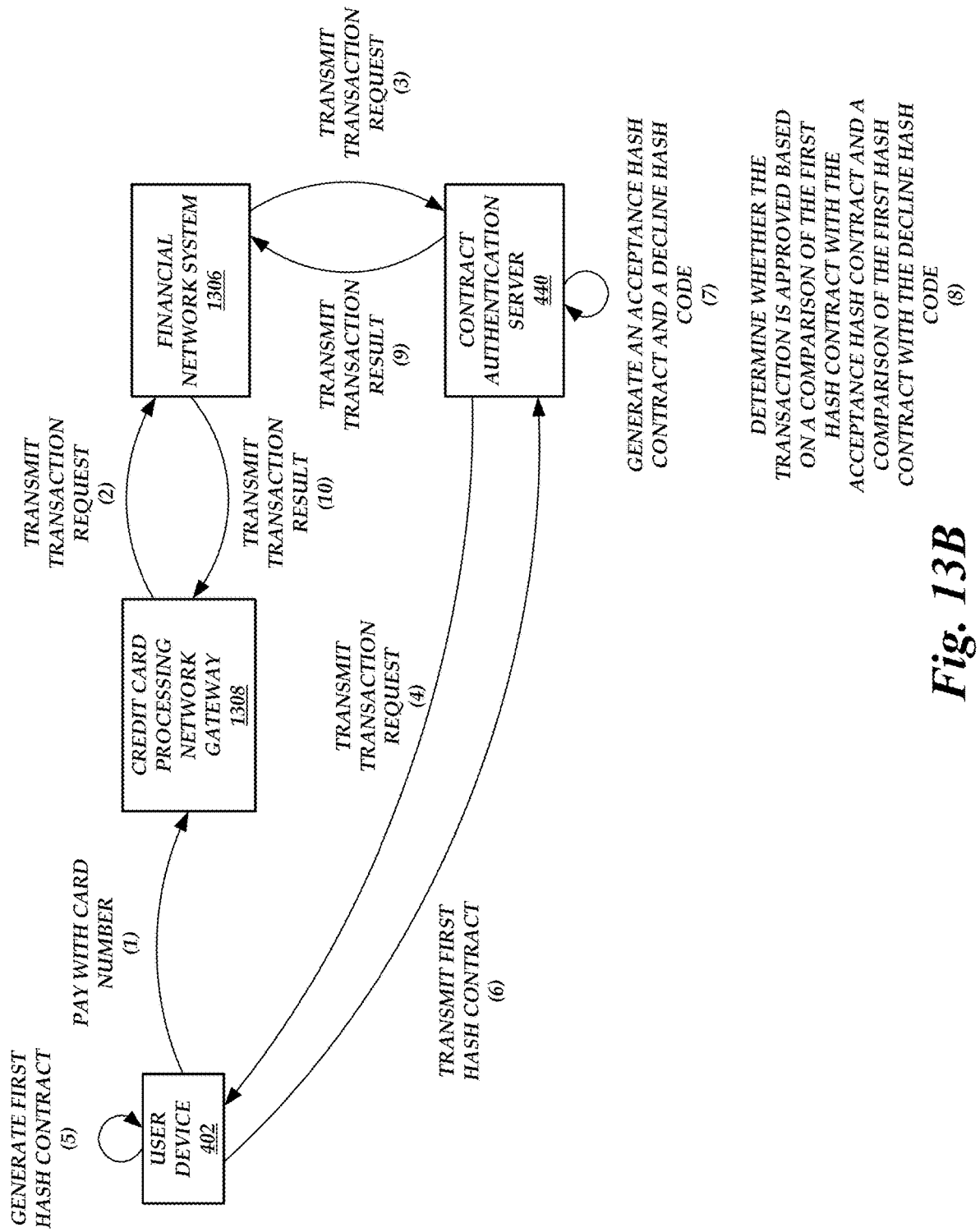
FIG. 13B is a block diagram of the hash contract generation and verification environment of FIG. 4 illustrating the operations performed by the components of the hash contract generation and verification environment to request authorization of a transaction out-of-band when a credit card is not present.

FIG. 13B is a block diagram of the hash contract generation and verification environment 400 of FIG. 4 illustrating the operations performed by the components of the hash contract generation and verification environment 400 to request authorization of a transaction out-of-band when a credit card is not present. As illustrated in FIG. 13B, a user pays for an item or service with a credit card number at (1). In other words, the user may pay for an item or service without using a physical credit card. Such payments may occur when the user purchases an item or service from a network-accessible merchant, such as a web store. The user may pay using the user device 402 or another user device (not shown). The user may pay for the item or service via a credit card processing network gateway 1308. The credit card processing network gateway 1308 may be a system that processes credit card transactions that occur when the credit card is not physically present (for example, transactions that occur over a network, such as the network 410). The user device 402 or other user device (not shown) may be redirected to the credit card processing network gateway 1308 by the network-accessible merchant.

The credit card processing network gateway 1308 can then transmit a transaction request to the financial network system 1306 at (2). The transaction request may include transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like. The credit card processing network gateway 1308 may be in communication with the network-accessible merchant (not shown) to obtain some or all of the transaction metadata included in the transaction request.

The financial network system 1306 may analyze the transaction request and route the transaction request to the user's credit card issuing bank (for example, the contract authentication server 440) at (3).

In response to receiving the transaction request, the contract authentication server 440 can transmit a transaction request to the user device 402 at (4). The transaction request may be received by the application retrieved from the application distribution server 420 that is running on the user device 402. Reception of the transaction request may cause the user device 402 (for example, the application) to prompt the user to accept or decline the transaction corresponding to the credit card payment at step (1). The prompt may include information associated with the transaction, such as some or all of the transaction metadata included in the transaction request transmitted by the credit card processing network gateway 1308. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user accepts the transaction, then the user device 402 generates a first hash contract at (5) in a manner as described herein. The user device 402 can then transmit the first hash contract to the contract authentication server 440 at (6). Alternatively, not shown, if the user declines the transaction, then the user device 402 generates a decline hash code and transmits the decline hash code to the contract authentication server 440.

Before, during, or after the user device 402 generates the first hash contract, the contract authentication server 440 generates an acceptance hash contract and a decline hash code at (7). The contract authentication server 440 then determines whether the transaction is approved based on a comparison of the first hash contract with the acceptance hash contract and a comparison of the first hash contract with the decline hash code at (8). Here, because the user accepted the transaction, the first hash contract and the acceptance hash contract match and the first hash contract and the decline hash code do not match. Thus, the contract authentication server 440 determines that the transaction is approved.

The contract authentication server 440 can then transmit the transaction result (for example, an approval) to the financial network system 1306 at (9), which forwards the transaction result to the credit card processing network gateway 1308 at (10). The credit card processing network gateway 1308 may then notify the network-accessible merchant that the transaction is approved, which results in the network-accessible merchant allowing the transaction to be completed.

Note that while FIG. 13B depicts the financial network system 1306 and the credit card processing network gateway 1308, these systems are not necessary. For example, the credit card processing network gateway 1308 may communicate directly with the contract authentication server 440. Similarly, the financial network system 1306 may communicate directly with the user device 402.

In addition, other systems not shown in FIG. 13B may be present in the workflow. For example, intermediary systems may be present between the credit card processing network gateway 1308 and the financial network system 1306 and/or between the financial network system 1306 and the contract authentication server 440. As another example, a merchant bank, such as the merchant bank 1304, in communication with the user device 402, the credit card processing network gateway 1308, and/or financial network system 1306 may be present in the workflow.

Example In-Band Credit Card Transaction Requests

Figure 14A:
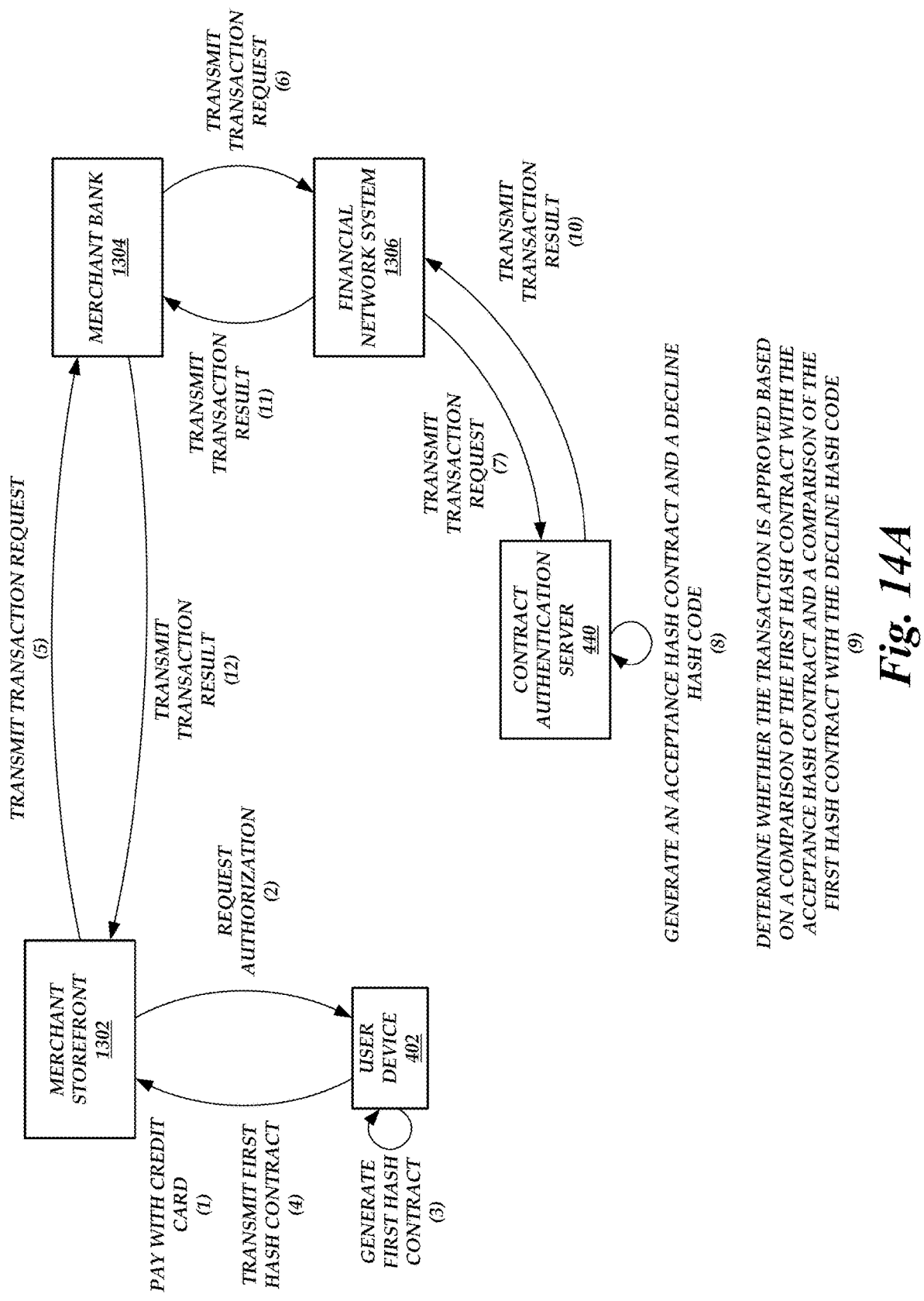
FIG. 14A is a block diagram of the hash contract generation and verification environment of FIG. 4 illustrating the operations performed by the components of the hash contract generation and verification environment to request authorization of a transaction in-band when a credit card is present.

FIG. 14A is a block diagram of the hash contract generation and verification environment 400 of FIG. 4 illustrating the operations performed by the components of the hash contract generation and verification environment 400 to request authorization of a transaction in-band when a credit card is present. As illustrated in FIG. 14A, a user pays for an item or service with a credit card at (1). The user may pay in person and/or using the user device 402 (for example, via a mobile wallet application). The user may pay for the item or service at a merchant storefront 1302.

In response to receiving the payment attempt, the merchant storefront 1302 may transmit a request to the user device 402 to authorize the transaction at (2). The authorization request may be received by the application retrieved from the application distribution server 420 that is running on the user device 402. Reception of the authorization request may cause the user device 402 (for example, the application) to prompt the user to accept or decline the transaction corresponding to the credit card payment at step (1). The prompt may include information associated with the transaction, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user accepts the transaction, then the user device 402 generates a first hash contract at (3) in a manner as described herein. The user device 402 can then transmit the first hash contract to the merchant storefront 1302 at (4). Alternatively, not shown, if the user declines the transaction, then the user device 402 generates a decline hash code and transmits the decline hash code to the merchant storefront 1302.

The merchant storefront 1302 can then transmit a transaction request to the merchant bank 1304 at (5). The transaction request may include the first hash contract and transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

The merchant bank 1304 can forward the transaction request to the financial network system 1306 at (6). The financial network system 1306 may analyze the transaction request and route the transaction request to the user's credit card issuing bank (for example, the contract authentication server 440) at (7).

In response to receiving the transaction request, the contract authentication server 440 generates an acceptance hash contract and a decline hash code at (8). The contract authentication server 440 then determines whether the transaction is approved based on a comparison of the first hash contract (for example, which is extracted from the transaction request) with the acceptance hash contract and a comparison of the first hash contract with the decline hash code at (9). Here, because the user accepted the transaction, the first hash contract and the acceptance hash contract match and the first hash contract and the decline hash code do not match. Thus, the contract authentication server 440 determines that the transaction is approved.

The contract authentication server 440 can then transmit the transaction result (for example, an approval) to the financial network system 1306 at (10), which forwards the transaction result to the merchant bank 1304 at (11). The merchant bank 1304 can then forward the transaction result to the merchant storefront 1302 at (12), which results in the merchant storefront 1302 allowing the transaction to be completed.

Note that while FIG. 14A depicts the merchant bank 1304 and the financial network system 1306, these systems are not necessary. For example, the merchant storefront 1302 may communicate directly with the financial network system 1306 and/or the contract authentication server 440. Similarly, the merchant bank 1304 may communicate directly with the contract authentication server 440.

In addition, other systems not shown in FIG. 14A may be present in the workflow. For example, intermediary systems may be present between the merchant bank 1304 and the financial network system 1306 and/or between the financial network system 1306 and the contract authentication server 440. As another example, a credit card processing network gateway in communication with the user device 402 and/or the merchant storefront 1302 may be present in the workflow.

Figure 14B:
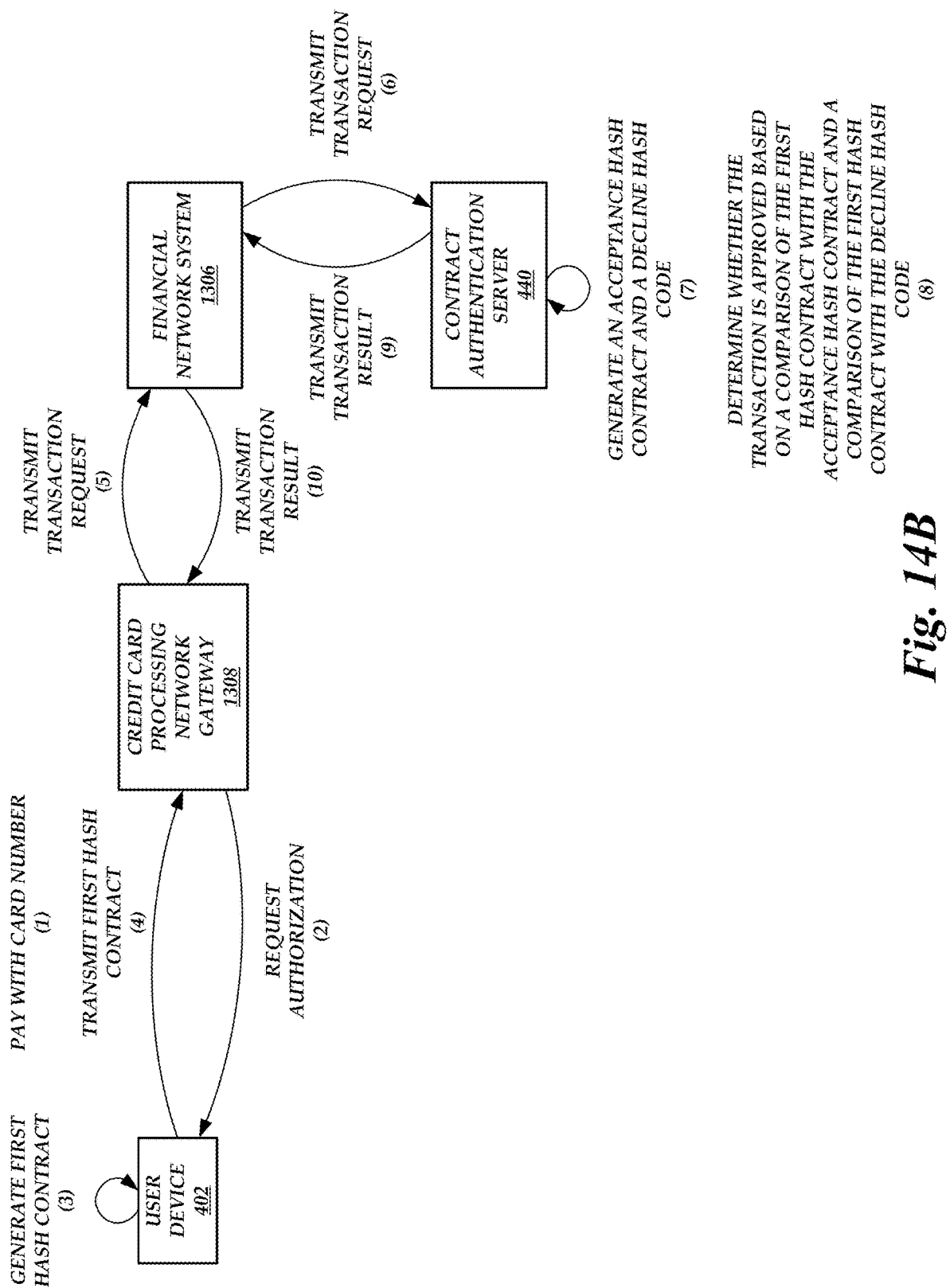
FIG. 14B is a block diagram of the hash contract generation and verification environment of FIG. 4 illustrating the operations performed by the components of the hash contract generation and verification environment to request authorization of a transaction in-band when a credit card is not present.

FIG. 14B is a block diagram of the hash contract generation and verification environment 400 of FIG. 4 illustrating the operations performed by the components of the hash contract generation and verification environment 400 to request authorization of a transaction in-band when a credit card is not present. As illustrated in FIG. 14B, a user pays for an item or service with a credit card number at (1). In other words, the user may pay for an item or service without using a physical credit card. Such payments may occur when the user purchases an item or service from a network-accessible merchant, such as a web store. The user may pay using the user device 402 or another user device (not shown). The user may pay for the item or service via the credit card processing network gateway 1308. The user device 402 or other user device (not shown) may be redirected to the credit card processing network gateway 1308 by the network-accessible merchant.

In response to receiving the payment attempt, the credit card processing network gateway 1308 may transmit a request to the user device 402 to authorize the transaction at (2). The authorization request may be received by the application retrieved from the application distribution server 420 that is running on the user device 402. Reception of the authorization request may cause the user device 402 (for example, the application) to prompt the user to accept or decline the transaction corresponding to the credit card payment at step (1). The prompt may include information associated with the transaction, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user accepts the transaction, then the user device 402 generates a first hash contract at (3) in a manner as described herein. The user device 402 can then transmit the first hash contract to the credit card processing network gateway 1308 at (4). Alternatively, not shown, if the user declines the transaction, then the user device 402 generates a decline hash code and transmits the decline hash code to the credit card processing network gateway 1308.

The credit card processing network gateway 1308 can then transmit a transaction request to the financial network system 1306 at (5). The transaction request may include the first hash contract and transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like. The credit card processing network gateway 1308 may be in communication with the network-accessible merchant (not shown) to obtain some or all of the transaction metadata included in the transaction request.

The financial network system 1306 may analyze the transaction request and route the transaction request to the user's credit card issuing bank (for example, the contract authentication server 440) at (6).

In response to receiving the transaction request, the contract authentication server 440 generates an acceptance hash contract and a decline hash code at (7). The contract authentication server 440 then determines whether the transaction is approved based on a comparison of the first hash contract (for example, which is extracted from the transaction request) with the acceptance hash contract and a comparison of the first hash contract with the decline hash code at (8).

Here, because the user accepted the transaction, the first hash contract and the acceptance hash contract match and the first hash contract and the decline hash code do not match. Thus, the contract authentication server 440 determines that the transaction is approved.

The contract authentication server 440 can then transmit the transaction result (for example, an approval) to the financial network system 1306 at (9), which forwards the transaction result to the credit card processing network gateway 1308 at (10). The credit card processing network gateway 1308 may then notify the network-accessible merchant that the transaction is approved, which results in the network-accessible merchant allowing the transaction to be completed.

Note that while FIG. 14B depicts the financial network system 1306 and the credit card processing network gateway 1308, these systems are not necessary. For example, the credit card processing network gateway 1308 may communicate directly with the contract authentication server 440. Similarly, the financial network system 1306 may communicate directly with the user device 402.

In addition, other systems not shown in FIG. 14B may be present in the workflow. For example, intermediary systems may be present between the credit card processing network gateway 1308 and the financial network system 1306 and/or between the financial network system 1306 and the contract authentication server 440. As another example, a merchant bank, such as the merchant bank 1304, in communication with the user device 402, the credit card processing network gateway 1308, and/or financial network system 1306 may be present in the workflow.

Example Transaction Authorization or Rejection Routines

Figure 15A:
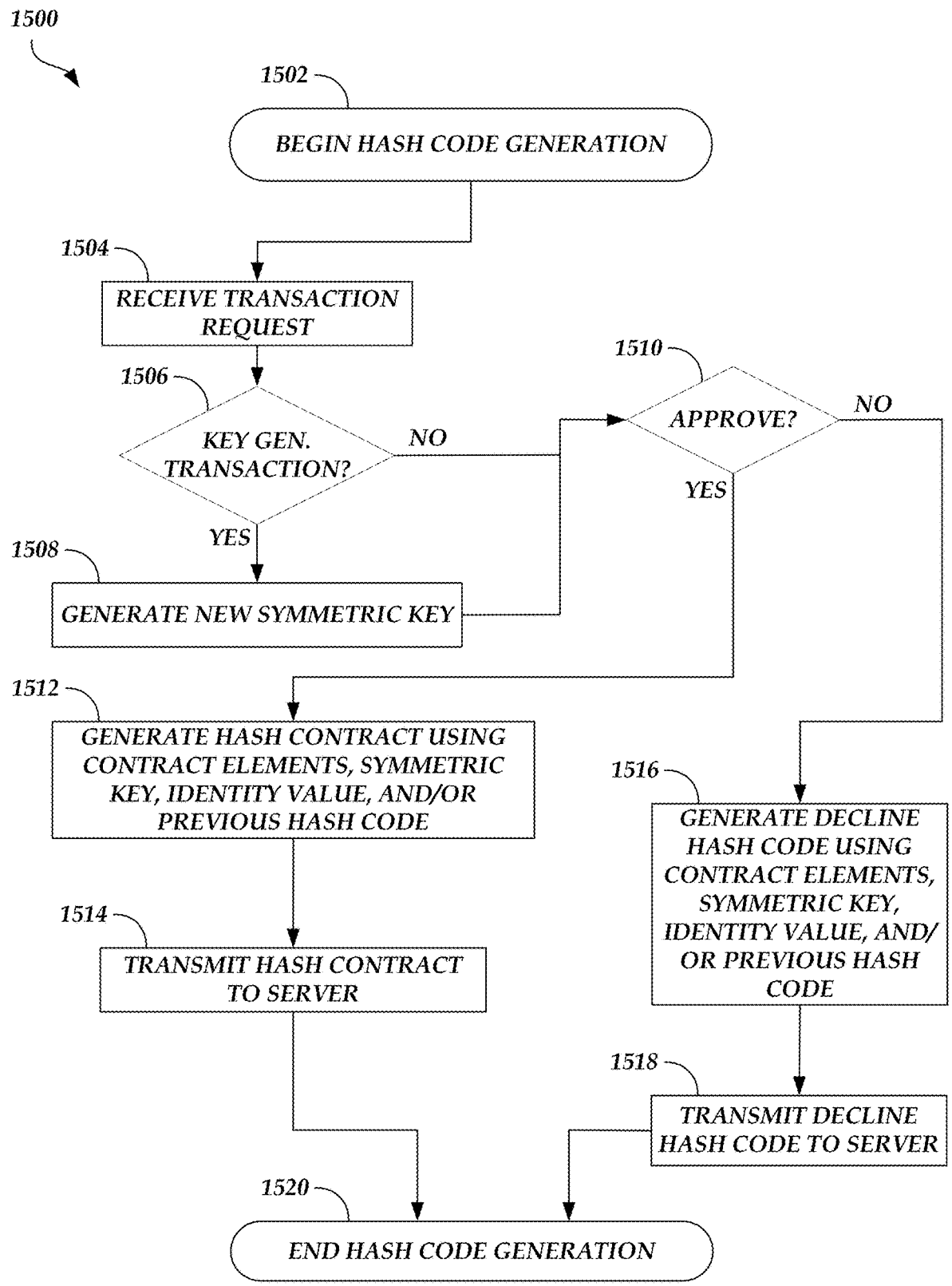
FIG. 15A is a flow diagram depicting a hash code generation routine illustratively implemented by a user device, according to one embodiment.

FIG. 15A is a flow diagram depicting a hash code generation routine 1500 illustratively implemented by a user device, according to one embodiment. As an example, the user device 402 of FIG. 4 (for example, the application retrieved from the application distribution server 420) can be configured to execute the hash code generation routine 1500. The user device 402 may execute the hash code generation routine 1500 in embodiments in which the symmetric key is not a single-use key. The hash code generation routine 1500 begins at block 1502.

At block 1504, a transaction request is received. For example, a user may be attempting to purchase an item or service. As another example, the transaction request may be for a transaction that instructs the user device 402 to reset the current symmetric key by replacing the current symmetric key with a new symmetric key (for example, a zero transaction, a key reset transaction, a new key generation transaction, etc.).

At block 1506, a determination is made as to whether the transaction is a new key generation transaction. For example, the user device 402 may analyze the amount included in the transaction to see if the value is zero, which would indicate that the transaction is a zero transaction. As another example, the user device 402 may analyze another field included in the transaction that may indicate whether a new symmetric key should be generated. If the transaction is a new key generation transaction, then the hash code generation routine 1500 proceeds to block 1508. Otherwise, if the transaction is not a new key generation transaction, then the hash code generation routine 1500 proceeds to block 1510.

In embodiments in which the symmetric key is a single-use key, the hash code generation routine 1500 would skip block 1506. Instead, the hash code generation routine 1500 would proceed directly to block 1508.

At block 1508, a new symmetric key is generated. For example, the user device 402 may apply a hash function to a master key and some or all of the transaction metadata included in the transaction to generate the new symmetric key. The new symmetric key may replace the previously current symmetric key. Once the new symmetric key is generated, the hash code generation routine 1500 proceeds to block 1510.

At block 1510, a determination is made as to whether the user approves the transaction. For example, the user device 402 may generate and display a user interface that asks the user whether the user accepts or declines the transaction. The user interface may further include information identifying the transaction. If the user indicates an acceptance of the transaction, then the hash code generation routine 1500 proceeds to block 1512. Otherwise, if the user indicates a rejection of the transaction, then the hash code generation routine 1500 proceeds to block 1516.

In further embodiments, not shown, the user device 402 may also prompt the user via the user interface to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The input(s) may then be converted into an identity hash code in a manner as described herein such that the identity hash code can be applied as an input to the hash function used to generate the hash contract and/or the decline hash code.

At block 1512, a hash contract is generated using contract elements, the current symmetric key (for example, the new symmetric key if it is generated at block 1508), an identity value (for example, an identity hash code), and/or a previous hash code (for example, a hash contract if the user device 402 generated a hash contract for a previous transaction authorization request or a decline hash code if the user device 402 generated a decline hash code for a previous transaction authorization request). The contract elements may include a value that represents an acceptance of the transaction.

At block 1514, the hash contract is transmitted to a server. For example, the user device 402 may transmit the hash contract to the contract authentication server 440 to allow the contract authentication server 440 to verify that the transaction approval can be authenticated. After the hash contract is transmitted to the server, the hash code generation routine 1500 is complete, as shown at block 1520.

At block 1516, a decline hash code is generated using contract elements, the current symmetric key (for example, the new symmetric key if it is generated at block 1508), an identity value (for example, an identity hash code), and/or a previous hash code (for example, a hash contract if the user device 402 generated a hash contract for a previous transaction authorization request or a decline hash code if the user device 402 generated a decline hash code for a previous transaction authorization request). The contract elements may include a value that represents a rejection of the transaction.

At block 1518, the decline hash code is transmitted to a server. For example, the user device 402 may transmit the decline hash code to the contract authentication server 440 to allow the contract authentication server 440 to verify that the transaction rejection can be authenticated. After the decline hash code is transmitted to the server, the hash code generation routine 1500 is complete, as shown at block 1520.

Figure 15B:
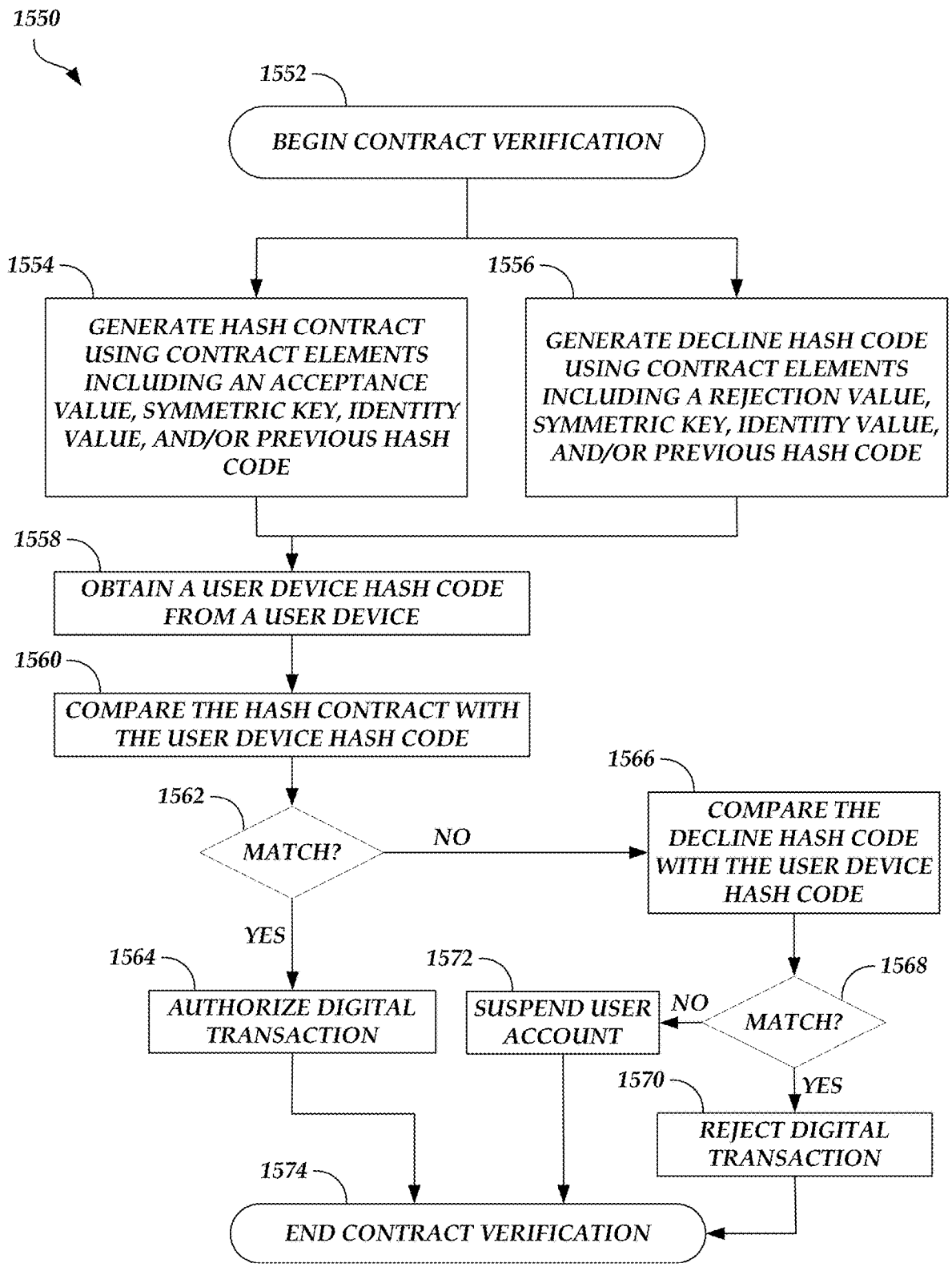
FIG. 15B is a flow diagram depicting a contract verification routine illustratively implemented by a contract authentication server, according to one embodiment.

FIG. 15B is a flow diagram depicting a contract verification routine 1550 illustratively implemented by a contract authentication server, according to one embodiment. As an example, the contract authentication server 440 of FIG. 4 can be configured to execute the contract verification routine 1550. The contract verification routine 1550 begins at block 1552.

At block 1554, a hash contract is generated using contract elements, the current symmetric key (for example, a new symmetric key if the contract authentication server 440 transmitted a new key generation request), an identity value (for example, an identity hash code), and/or a previous hash code (for example, a hash contract if the user device 402 generated a hash contract for a previous transaction authorization request or a decline hash code if the user device 402 generated a decline hash code for a previous transaction authorization request). The contract elements may include a value that represents an acceptance of the transaction.

At block 1556, a decline hash code is generated using contract elements, the current symmetric key (for example, a new symmetric key if the contract authentication server 440 transmitted a new key generation request), an identity value (for example, an identity hash code), and/or a previous hash code (for example, a hash contract if the user device 402 generated a hash contract for a previous transaction authorization request or a decline hash code if the user device 402 generated a decline hash code for a previous transaction authorization request). The contract elements may include a value that represents a rejection of the transaction.

The contract verification routine 1550 may perform blocks 1554 and 1556 simultaneously or in any order. Once the hash contract and decline hash codes are generated, the contract verification routine 1550 proceeds to block 1558.

At block 1558, a user device hash code is obtained from a user device. For example, the user device hash code may be a hash contract if the user operating the user device 402 accepts the transaction and may be a decline hash code if the user operating the user device 402 rejects the transaction.

At block 1560, the hash contract is compared with the user device hash code. For example, the hash contract may be generated using the same inputs concatenated in the same order as how the user device hash code is generated if the user device hash code is a hash contract.

At block 1562, a determination is made as to whether the hash contract and the user device hash code match. If the hash contract and the user device hash code match, then the contract verification routine 1550 proceeds to block 1564. Otherwise, if the hash contract and the user device hash code do not match, then the contract verification routine 1550 proceeds to block 1566.

At block 1564, the digital transaction is authorized. For example, the transaction is authorized because, based on the comparison, the contract authentication server 440 determines that the user device 402 generated a hash contract, indicating that the user accepted the transaction. In addition, because the hash contract generated by the contract authentication server 440 matches the user device hash code, the contract authentication server 440 implicitly authenticates an identity of the user and verifies that the user is the authorized user and not an unauthorized or malicious user (for example, because the contract authentication server 440 includes the identity hash code as an input to the hash function used to generate the hash contract and, given the match, the user therefore provided the same input that was used to generate the identity hash code when the user was prompted to authorize the transaction). After the digital transaction is authorized, the contract verification routine 1550 is complete, as shown at block 1574.

At block 1566, the decline hash code is compared with the user device hash code. For example, the decline hash code may be generated using the same inputs concatenated in the same order as how the user device hash code is generated if the user device hash code is a decline hash code.

At block 1568, a determination is made as to whether the decline hash code and the user device hash code match. If the decline hash code and the user device hash code match, then the contract verification routine 1550 proceeds to block 1570. Otherwise, if the decline hash code and the user device hash code do not match, then the contract verification routine 1550 proceeds to block 1572.

At block 1570, the digital transaction is rejected. For example, the transaction is rejected because, based on the comparison, the contract authentication server 440 determines that the user device 402 generated a decline hash code, indicating that the user rejected the transaction. In addition, because the decline hash code generated by the contract authentication server 440 matches the user device hash code, the contract authentication server 440 implicitly authenticates an identity of the user and verifies that the user is the authorized user and not an unauthorized or malicious user (for example, because the contract authentication server 440 includes the identity hash code as an input to the hash function used to generate the decline hash code and, given the match, the user therefore provided the same input that was used to generate the identity hash code when the user was prompted to authorize the transaction). After the digital transaction is rejected, the contract verification routine 1550 is complete, as shown at block 1574.

At block 1572, the user account associated with the operator of the user device 402 is suspended. For example, the user account is suspended because, based on the comparison, the contract authentication server 440 determines that the user device 402 did not generate a proper hash contract or decline hash code, indicating that either the user entered an incorrect input when prompted to enter an input to uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has) and/or an unauthorized or malicious user attempted to authorize (or reject) a transaction unbeknownst to the user associated with the user account. In other words, the user account is suspended because the contract authentication server 440 was unable to authenticate an identity of the user and/or verify that the user is the authorized user and not an unauthorized or malicious user. After the user account is suspended, the contract verification routine 1550 is complete, as shown at block 1574.

Example Accepted and Rejected Credit Card Transactions

Figure 16A:
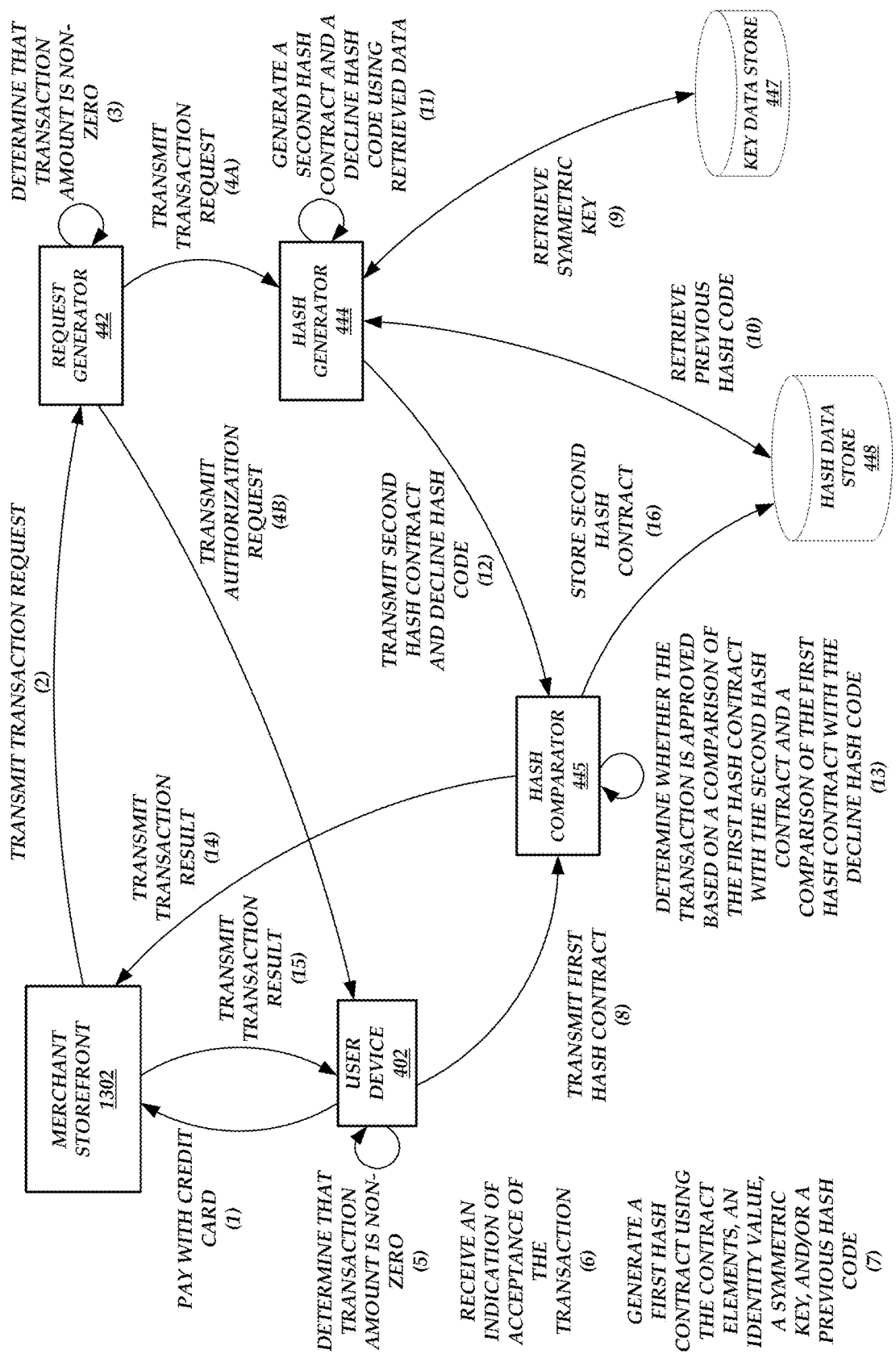
FIG. 16A is a block diagram of the hash contract generation and verification environment of FIG. 4 illustrating the operations performed by the components of the hash contract generation and verification environment when a credit card transaction is authorized.

FIG. 16A is a block diagram of the hash contract generation and verification environment 400 of FIG. 4 illustrating the operations performed by the components of the hash contract generation and verification environment 400 when a credit card transaction is authorized. For simplicity, several components, such as the merchant bank 1304 and/or the financial network system 1306, are excluded. The embodiment depicted in FIG. 16A may be performed when the symmetric key is not a single-use key. As illustrated in FIG. 16A, a user pays for an item or service with a credit card at (1). The user may pay with a physical credit card at the merchant storefront 1302. Alternatively, the user may pay with a credit card number instead of with the physical credit card via the credit card processing network gateway 1308 (not shown).

The merchant storefront 1302 can then transmit a transaction request to the request generator 442 (for example, via the merchant bank 1304 and/or the financial network system 1306) at (2). The transaction request may include transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

The request generator 442 can determine that the transaction amount included in the transaction request is non-zero at (3). If the transaction amount was zero, then the request generator 442 may instruct the key seeder 443 (not shown) to generate a new symmetric key. Alternatively, other data included in the transaction request may inform the request generator 442 whether a new symmetric key is to be generated. In response to determining that the transaction amount is non-zero, the request generator 442 can forward the transaction request to the hash generator 444 at (4A) and transmit an authorization request to the user device 402 at (4B). The authorization request may include some or all of the data included in the transaction request. The authorization request may specifically be sent to the application retrieved from the application distribution server 440 that is running on the user device 402.

Reception of the authorization request may cause the user device 402 (for example, the application) to determine that the transaction amount is non-zero at (5). Thus, the user device 402 may not generate a new symmetric key. The user device 402 may then prompt the user to accept or decline the transaction corresponding to the credit card payment at step (1). The prompt may include information associated with the transaction, such as the data provided in the authorization request. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

Here, the user accepts the transaction and therefore the user device 402 receives an indication of an acceptance of the transaction at (6). Accordingly, the user device 402 generates a first hash contract at (7) using the contract elements (for example, as provided in the authorization request), an identity value (for example, the identity hash code generated based on the input(s) that uniquely identify the user), a symmetric key (for example, a previously used symmetric key given that the transaction amount is non-zero), a value representing an acceptance of the transaction, and/or a previous hash code (for example, a hash contract if the user device 402 generated a hash contract for a previous transaction authorization request or a decline hash code if the user device 402 generated a decline hash code for a previous transaction authorization request). The user device 402 can then transmit the first hash contract to the hash comparator 445 at (8).

Before, during, or after the user device 402 executes the operations to generate the first hash contract, the hash generator 444 retrieves a symmetric key from the key data store 447 at (9). For example, the hash generator 444 may retrieve the symmetric key that is stored in the key data store 447 in association with the user operating the user device 402 (for example, as indicated by the transaction request). The hash generator 444 may also retrieve a previous hash code from the hash data store 448 at (10). For example, the previous hash code is a hash contract if the user device 402 generated a hash contract for a previous transaction authorization request transmitted by the request generator 442 and is a decline hash code if the user device 402 generated a decline hash code for a previous transaction authorization request transmitted by the request generator 442.

The hash generator 444 can then generate a second hash contract and a decline hash code at (11) using the retrieved data (for example, the symmetric key and/or the previous hash code), the contract elements (for example, provided in the transaction request received from the request generator 442, retrieved from the contract elements data store 449 (not shown) after the request generator 442 stores contract elements provided in the transaction request in the contract elements data store 449 in association with the user operating the user device 402, etc.), and/or an identity hash code retrieved from the user identity data store 446 (not shown). For example, the identity hash code may be an identity hash code initially provided by the user device 402 when the application running on the user device 402 is first installed or when a user is otherwise setting up the application. As described herein, the hash generator 444 may generate the second hash contract using a value representing an acceptance of the transaction and may generate the decline hash code using a value representing a rejection of the transaction. The hash generator 444 can then transmit the second hash contract and the decline hash code to the hash comparator 445 at (12).

The hash comparator 445 can determine whether the transaction is approved at (13) based on a comparison of the first hash contract with the second hash contract and a comparison of the first hash contract with the decline hash code. For example, here, the user device 402 generated a hash contract instead of a decline hash code. Thus, if the user provided the correct information when approving the transaction (for example, accurate values for the input(s) that uniquely represent the user such that the identity hash code generated by the user device 402 matches the identity hash code stored in the user identity data store 446 that was previously provided by the user device 402), then the hash comparator 445 determines that the transaction is approved. Otherwise, if the user did not provide the correct information when approving the transaction, the hash comparator 445 determines that an error occurred and may suspend the user's account and/or notify the user device 402 of the issue. The hash comparator 445 can transmit the transaction result (for example, an approval) to the merchant storefront 1302 at (14), which results in the merchant storefront 1302 allowing the transaction to be completed.

The merchant storefront 1302 may further forward the transaction result to the user device 402 at (15). Reception of the transaction result may cause the user device 402 (for example, the application) to generate and display a notification indicating that the transaction has been successfully approved.

Before, during, or after transmitting the transaction result to the merchant storefront 1302, the hash comparator 445 may store the second hash contract in the hash data store 448 at (16). The hash comparator 445 may store the second hash contract in the hash data store 448 instead of the decline hash code because the hash comparator 445 has determined that the user device 402 transmitted a hash contract that matches the second hash contract. The second hash contract may replace any hash code (for example, hash contract or decline hash code) that was previously stored in the hash data store 448 in association with the user operating the user device 402. Thus, the next time the user device 402 is provided with a transaction authorization request, the hash generator 444 can retrieve and use the second hash contract in generating a new hash contract and a new decline hash code for determining whether the next transaction authorization request is approved. As described herein, the previous hash code is not transmitted between the user device 402 and the contract authentication server 440 during a current transaction authorization request. Accordingly, even if a malicious device is able to intercept the other inputs to the hash function used to produce the hash contract and determines the proper order for concatenating the inputs, the malicious device may still be prevented from successfully approving the transaction because the previous hash code may be unknown to the malicious device.

Optionally, not shown, the hash comparator 445 may store the first hash contract in addition to the second hash contract (for example, in the hash data store 448). The first and second hash contracts may be stored for auditing or verification purposes. For example, the contract authentication server 440 may be requested by a user device 402 at a later time to provide the hash contract (or decline hash code) provided by the user device 402 or another user device 402 at a previous time. The contract authentication server 440 can then retrieve the hash contract from the hash data store 448 and provide the retrieved hash contract to the user device 402 to satisfy the request. In some embodiments, the first hash contract and/or the second hash contract may be associated with device metadata that indicates which device (user device 402 or contract authentication server 440) generated the respective hash contract. Thus, the contract authentication server 440 can use the device metadata to identify a specific hash contract generated by a specific device and then retrieve the hash contract from the hash data store 448.

Figure 16B:
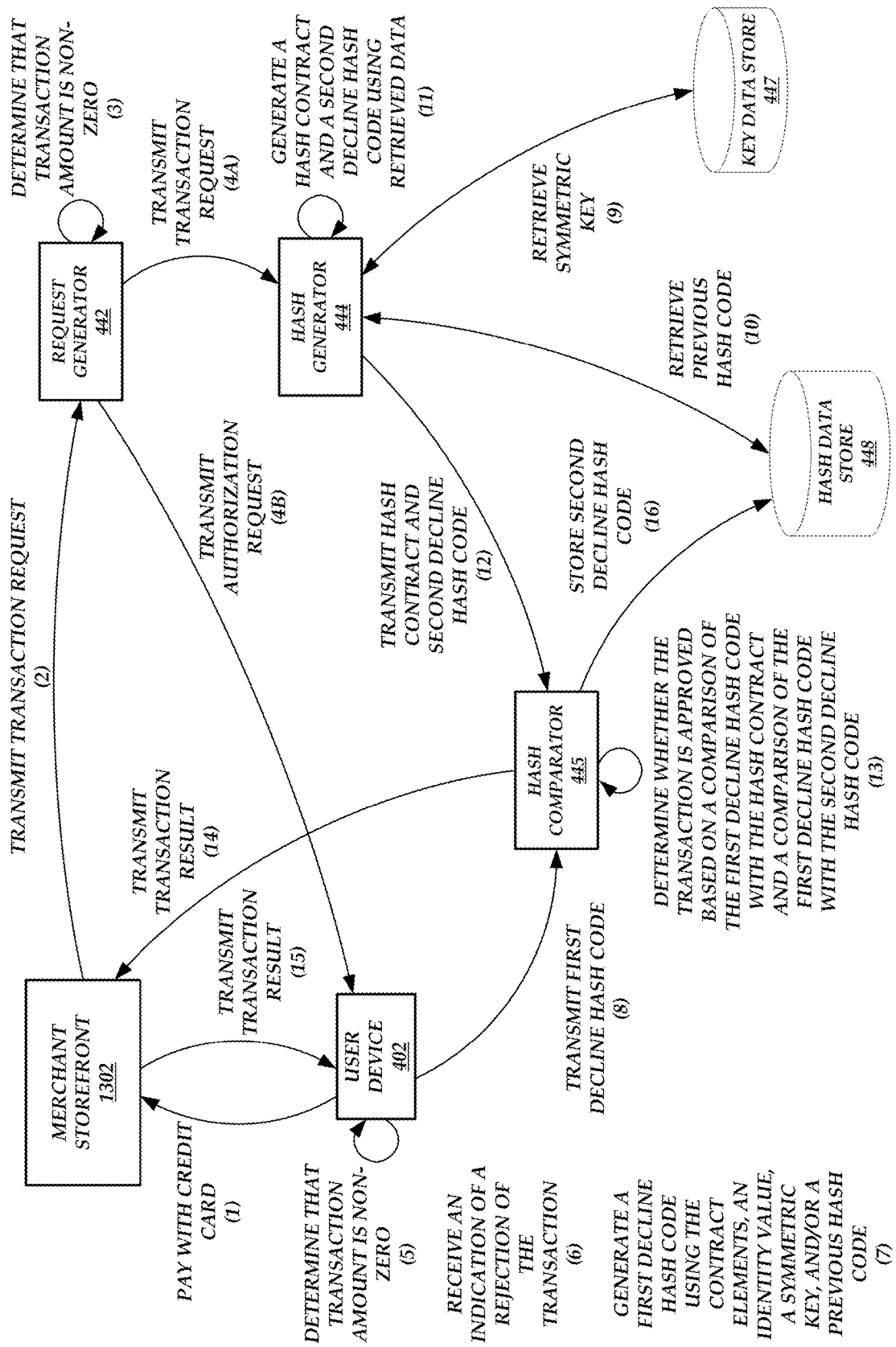
FIG. 16B is a block diagram of the hash contract generation and verification environment of FIG. 4 illustrating the operations performed by the components of the hash contract generation and verification environment when a credit card transaction is rejected.

FIG. 16B is a block diagram of the hash contract generation and verification environment 400 of FIG. 4 illustrating the operations performed by the components of the hash contract generation and verification environment 400 when a credit card transaction is rejected. For simplicity, several components, such as the merchant bank 1304 and/or the financial network system 1306, are excluded. The embodiment depicted in FIG. 16B may be performed when the symmetric key is not a single-use key. As illustrated in FIG. 16B, a user pays for an item or service with a credit card at (1). The user may pay with a physical credit card at the merchant storefront 1302. Alternatively, the user may pay with a credit card number instead of with the physical credit card via the credit card processing network gateway 1308 (not shown).

The merchant storefront 1302 can then transmit a transaction request to the request generator 442 (for example, via the merchant bank 1304 and/or the financial network system 1306) at (2). The transaction request may include transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

The request generator 442 can determine that the transaction amount included in the transaction request is non-zero at (3). If the transaction amount was zero, then the request generator 442 may instruct the key seeder 443 (not shown) to generate a new symmetric key. Alternatively, other data included in the transaction request may inform the request generator 442 whether a new symmetric key is to be generated. In response to determining that the transaction amount is non-zero, the request generator 442 can forward the transaction request to the hash generator 444 at (4A) and transmit an authorization request to the user device 402 at (4B). The authorization request may include some or all of the data included in the transaction request. The authorization request may specifically be sent to the application retrieved from the application distribution server 440 that is running on the user device 402.

Reception of the authorization request may cause the user device 402 (for example, the application) to determine that the transaction amount is non-zero at (5). Thus, the user device 402 may not generate a new symmetric key. The user device 402 may then prompt the user to accept or decline the transaction corresponding to the credit card payment at step (1). The prompt may include information associated with the transaction, such as the data provided in the authorization request. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

Here, the user rejects the transaction and therefore the user device 402 receives an indication of a rejection of the transaction at (6). Accordingly, the user device 402 generates a first decline hash code at (7) using the contract elements (for example, as provided in the authorization request), an identity value (for example, the identity hash code generated based on the input(s) that uniquely identify the user), a symmetric key (for example, a previously used symmetric key given that the transaction amount is non-zero), a value representing a rejection of the transaction, and/or a previous hash code (for example, a hash contract if the user device 402 generated a hash contract for a previous transaction authorization request or a decline hash code if the user device 402 generated a decline hash code for a previous transaction authorization request). The user device 402 can then transmit the first decline hash code to the hash comparator 445 at (8).

Before, during, or after the user device 402 executes the operations to generate the first decline hash code, the hash generator 444 retrieves a symmetric key from the key data store 447 at (9). For example, the hash generator 444 may retrieve the symmetric key that is stored in the key data store 447 in association with the user operating the user device 402 (for example, as indicated by the transaction request). The hash generator 444 may also retrieve a previous hash code from the hash data store 448 at (10). For example, the previous hash code is a hash contract if the user device 402 generated a hash contract for a previous transaction authorization request transmitted by the request generator 442 and is a decline hash code if the user device 402 generated a decline hash code for a previous transaction authorization request transmitted by the request generator 442.

The hash generator 444 can then generate a hash contract and a second decline hash code at (11) using the retrieved data (for example, the symmetric key and/or the previous hash code), the contract elements (for example, provided in the transaction request received from the request generator 442, retrieved from the contract elements data store 449 (not shown) after the request generator 442 stores contract elements provided in the transaction request in the contract elements data store 449 in association with the user operating the user device 402, etc.), and/or an identity hash code retrieved from the user identity data store 446 (not shown). For example, the identity hash code may be an identity hash code initially provided by the user device 402 when the application running on the user device 402 is first installed or when a user is otherwise setting up the application. As described herein, the hash generator 444 may generate the hash contract using a value representing an acceptance of the transaction and may generate the second decline hash code using a value representing a rejection of the transaction. The hash generator 444 can then transmit the hash contract and the second decline hash code to the hash comparator 445 at (12).

The hash comparator 445 can determine whether the transaction is approved at (13) based on a comparison of the first decline hash code with the hash contract and a comparison of the first decline hash code with the second decline hash code. For example, here, the user device 402 generated a decline hash code instead of a hash contract. Thus, if the user provided the correct information when rejecting the transaction (for example, accurate values for the input(s) that uniquely represent the user such that the identity hash code generated by the user device 402 matches the identity hash code stored in the user identity data store 446 that was previously provided by the user device 402), then the hash comparator 445 determines that the transaction is rejected. Otherwise, if the user did not provide the correct information when rejected the transaction, the hash comparator 445 determines that an error occurred and may suspend the user's account and/or notify the user device 402 of the issue. The hash comparator 445 can transmit the transaction result (for example, a rejection) to the merchant storefront 1302 at (14), which results in the merchant storefront 1302 preventing the transaction from being completed.

The merchant storefront 1302 may further forward the transaction result to the user device 402 at (15). Reception of the transaction result may cause the user device 402 (for example, the application) to generate and display a notification indicating that the transaction has been rejected.

Before, during, or after transmitting the transaction result to the merchant storefront 1302, the hash comparator 445 may store the second decline hash code in the hash data store 448 at (16). The hash comparator 445 may store the second decline hash code in the hash data store 448 instead of the hash contract because the hash comparator 445 has determined that the user device 402 transmitted a decline hash code that matches the second decline hash code. The second decline hash code may replace any hash code (for example, hash contract or decline hash code) that was previously stored in the hash data store 448 in association with the user operating the user device 402. Thus, the next time the user device 402 is provided with a transaction authorization request, the hash generator 444 can retrieve and use the second decline hash code in generating a new hash contract and a new decline hash code for determining whether the next transaction authorization request is approved. As described herein, the previous hash code is not transmitted between the user device 402 and the contract authentication server 440 during a current transaction authorization request. Accordingly, even if a malicious device is able to intercept the other inputs to the hash function used to produce the decline hash code and determines the proper order for concatenating the inputs, the malicious device may still be prevented from successfully terminating the transaction because the previous hash code may be unknown to the malicious device.

Optionally, not shown, the hash comparator 445 may store the first decline hash code in addition to the second decline hash code (for example, in the hash data store 448). The first and second decline hash codes may be stored for auditing or verification purposes. For example, the contract authentication server 440 may be requested by a user device 402 at a later time to provide the decline hash code provided by the user device 402 or another user device 402 at a previous time. The contract authentication server 440 can then retrieve the decline hash code from the hash data store 448 and provide the retrieved decline hash code to the user device 402 to satisfy the request. In some embodiments, the first decline hash code and/or the second decline hash code may be associated with device metadata that indicates which device (user device 402 or contract authentication server 440) generated the respective decline hash code. Thus, the contract authentication server 440 can use the device metadata to identify a specific decline hash code generated by a specific device and then retrieve the decline hash code from the hash data store 448.

Figure 17A:
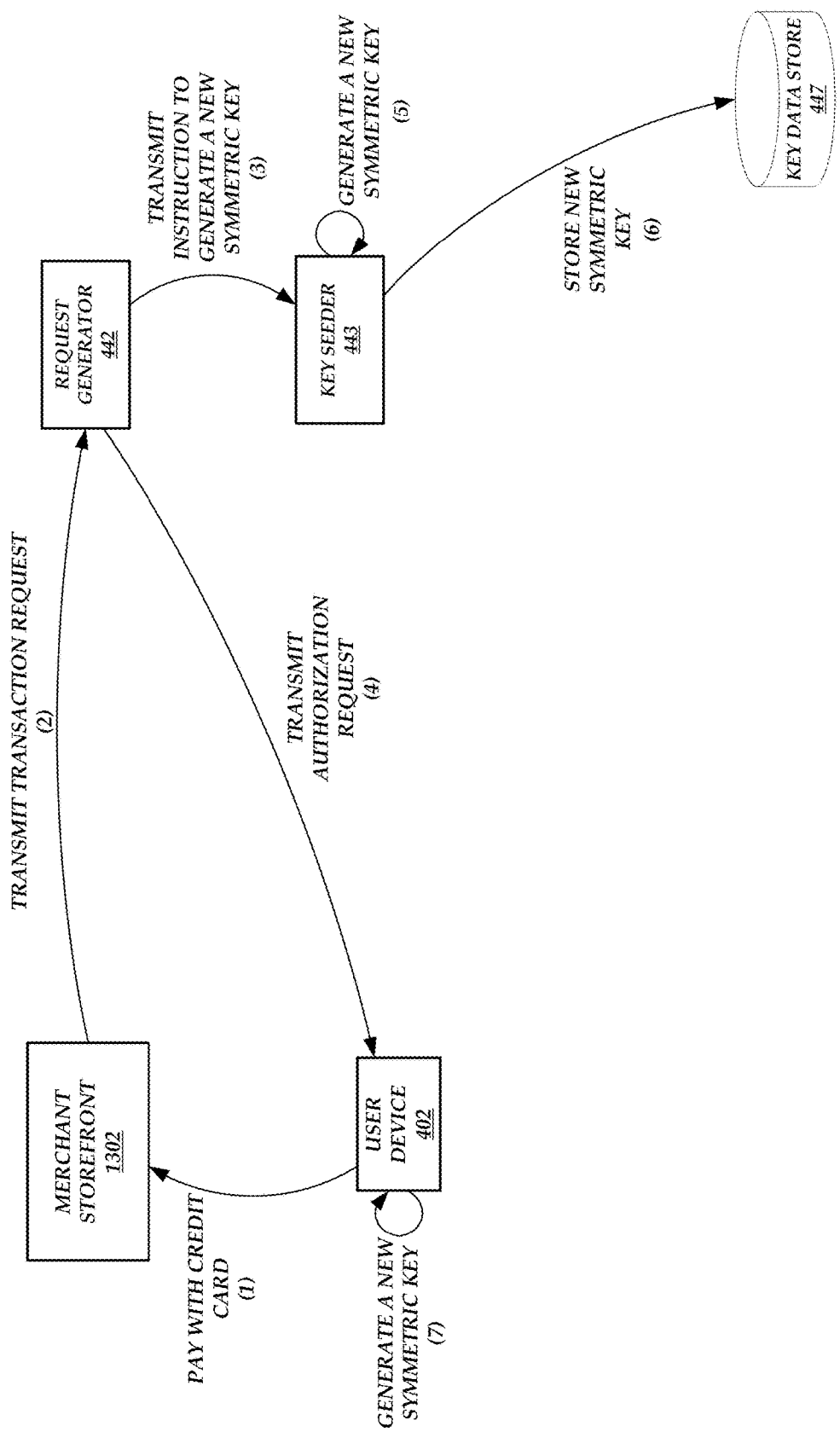
FIGS. 17A-17B are block diagrams of the hash contract generation and verification environment of FIG. 4 illustrating the operations performed by the components of the hash contract generation and verification environment when a credit card transaction is authorized.
Figure 17B:
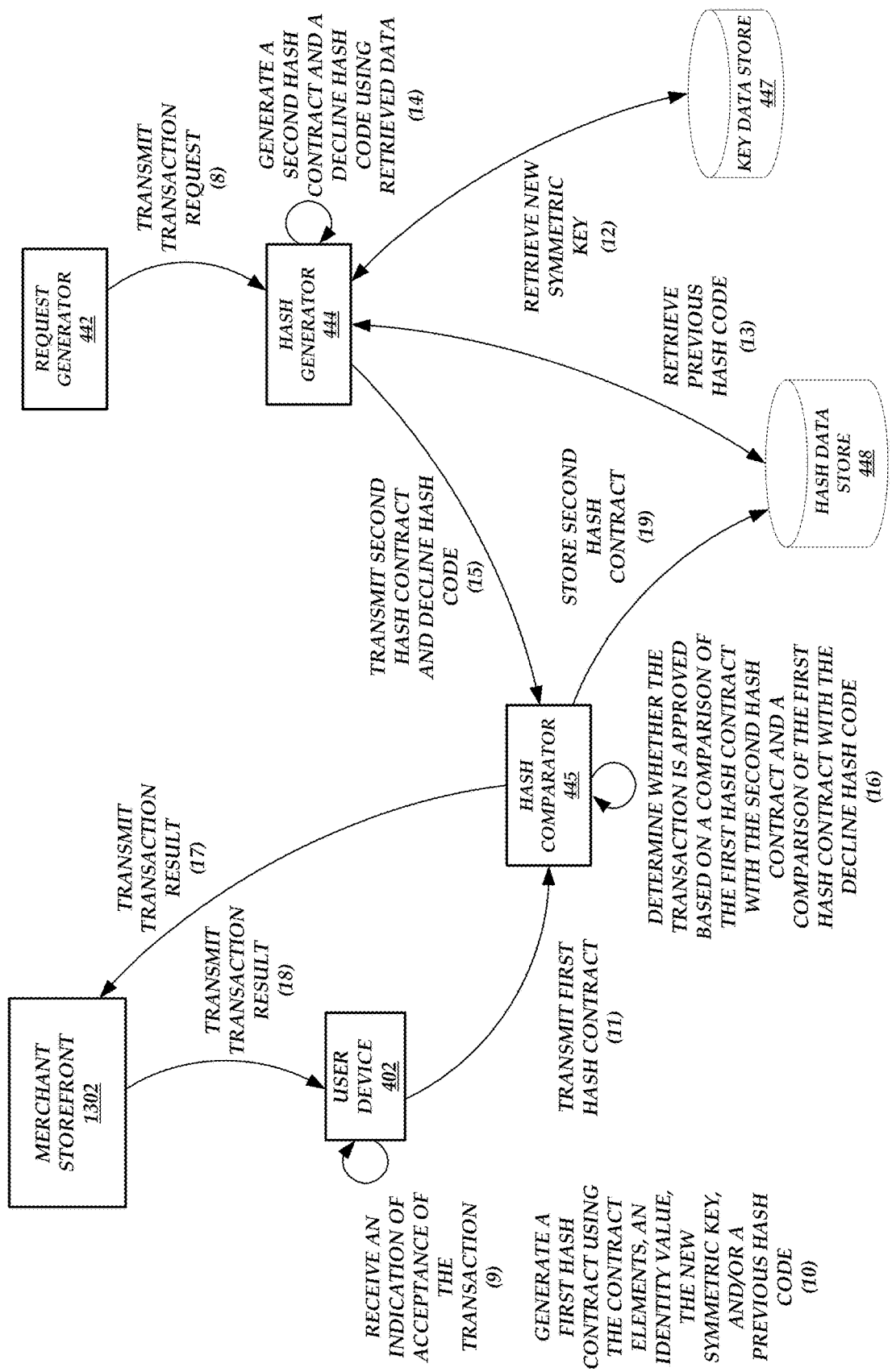

FIGS. 17A-17B are block diagrams of the hash contract generation and verification environment 400 of FIG. 4 illustrating the operations performed by the components of the hash contract generation and verification environment 400 when a credit card transaction is authorized. For simplicity, several components, such as the merchant bank 1304 and/or the financial network system 1306, are excluded. The embodiment depicted in FIGS. 17A-17B may be performed when the symmetric key is a single-use key. As illustrated in FIG. 17A, a user pays for an item or service with a credit card at (1). The user may pay with a physical credit card at the merchant storefront 1302. Alternatively, the user may pay with a credit card number instead of with the physical credit card via the credit card processing network gateway 1308 (not shown).

The merchant storefront 1302 can then transmit a transaction request to the request generator 442 (for example, via the merchant bank 1304 and/or the financial network system 1306) at (2). The transaction request may include transaction metadata, such as at least one of a date, an identification of one or more entities (for example, the merchant storefront 1302, a name of the entity that operates the contract authentication server 440, a name of the user associated with the user device 402, etc.), an amount (for example, zero or non-zero), a location at which the transaction was initiated, an item corresponding to the transaction, terms and conditions, and/or the like.

Because the symmetric key is a single-use key, a new symmetric key may need to be generated in response to a new payment being attempted by the user. Thus, the request generator 442 may transmit an instruction to the key seeder 443 to generate a new symmetric key at (3). The instruction may include some or all of the data included in the transaction request. The key seeder 443 may be instructed to generate the new symmetric key regardless of whether the transaction amount is zero or non-zero. The request generator 442 can further transmit an authorization request to the user device 402 at (4). The authorization request may include some or all of the data included in the transaction request. The authorization request may specifically be sent to the application retrieved from the application distribution server 440 that is running on the user device 402.

In response to receiving the instruction to generate a new symmetric key, the key seeder 443 may generate a new symmetric key at (5). The new symmetric key may be based on some or all of the data included in the transaction request, a master key, a previous symmetric key, and/or any combination thereof. For example, the key seeder 443 may retrieve a master key stored in the key data store 447 in association with the user operating the user device 402 in order to generate the new symmetric key. The key seeder 443 may then store the new symmetric key in the key data store 443 at (6) in association with the user operating the user device 402. In an embodiment, the new symmetric key is stored in a manner such that the new symmetric key replaces a previously stored symmetric key stored in association with the user operating the user device 402.

Likewise, the user device 402 (for example, the application) may generate a new symmetric key at (7). The new symmetric key generated by the user device 402 may also be based on some or all of the data included in the transaction request, a master key, a previous symmetric key, and/or any combination thereof. For example, the user device 402 may retrieve a master key stored in a secure location in order to generate the new symmetric key. The user device 402 and the key seeder 443 may use the same information when generating the new symmetric keys. In an embodiment, the new symmetric key is stored in a manner such that the new symmetric key replaces a previously generated symmetric key.

As illustrated in FIG. 17B, the request generator 442 can forward the transaction request to the hash generator 444 at (8). The transaction request can be forwarded to the hash generator 444 at any time after the request generator 442 receives the transaction request.

Reception of the authorization request may cause the user device 402 (for example, the application) to prompt the user to accept or decline the transaction corresponding to the credit card payment at step (1). The prompt may include information associated with the transaction, such as the data provided in the authorization request. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

Here, the user accepts the transaction and therefore the user device 402 receives an indication of an acceptance of the transaction at (9). Accordingly, the user device 402 generates a first hash contract at (10) using the contract elements (for example, as provided in the authorization request), an identity value (for example, the identity hash code generated based on the input(s) that uniquely identify the user), a symmetric key (for example, a previously used symmetric key given that the transaction amount is non-zero), a value representing an acceptance of the transaction, and/or a previous hash code (for example, a hash contract if the user device 402 generated a hash contract for a previous transaction authorization request or a decline hash code if the user device 402 generated a decline hash code for a previous transaction authorization request). The user device 402 can then transmit the first hash contract to the hash comparator 445 at (11).

Before, during, or after the user device 402 executes the operations to generate the first hash contract, the hash generator 444 retrieves the new symmetric key from the key data store 447 at (12). The hash generator 444 may also retrieve a previous hash code from the hash data store 448 at (13). For example, the previous hash code is a hash contract if the user device 402 generated a hash contract for a previous transaction authorization request transmitted by the request generator 442 and is a decline hash code if the user device 402 generated a decline hash code for a previous transaction authorization request transmitted by the request generator 442.

The hash generator 444 can then generate a second hash contract and a decline hash code at (14) using the retrieved data (for example, the new symmetric key and/or the previous hash code), the contract elements (for example, provided in the transaction request received from the request generator 442, retrieved from the contract elements data store 449 (not shown) after the request generator 442 stores contract elements provided in the transaction request in the contract elements data store 449 in association with the user operating the user device 402, etc.), and/or an identity hash code retrieved from the user identity data store 446 (not shown). For example, the identity hash code may be an identity hash code initially provided by the user device 402 when the application running on the user device 402 is first installed or when a user is otherwise setting up the application. As described herein, the hash generator 444 may generate the second hash contract using a value representing an acceptance of the transaction and may generate the decline hash code using a value representing a rejection of the transaction. The hash generator 444 can then transmit the second hash contract and the decline hash code to the hash comparator 445 at (15).

The hash comparator 445 can determine whether the transaction is approved at (16) based on a comparison of the first hash contract with the second hash contract and a comparison of the first hash contract with the decline hash code. For example, here, the user device 402 generated a hash contract instead of a decline hash code. Thus, if the user provided the correct information when approving the transaction (for example, accurate values for the input(s) that uniquely represent the user such that the identity hash code generated by the user device 402 matches the identity hash code stored in the user identity data store 446 that was previously provided by the user device 402), then the hash comparator 445 determines that the transaction is approved. Otherwise, if the user did not provide the correct information when approving the transaction, the hash comparator 445 determines that an error occurred and may suspend the user's account and/or notify the user device 402 of the issue. The hash comparator 445 can transmit the transaction result (for example, an approval) to the merchant storefront 1302 at (17), which results in the merchant storefront 1302 allowing the transaction to be completed.

The merchant storefront 1302 may further forward the transaction result to the user device 402 at (18). Reception of the transaction result may cause the user device 402 (for example, the application) to generate and display a notification indicating that the transaction has been successfully approved.

Before, during, or after transmitting the transaction result to the merchant storefront 1302, the hash comparator 445 may store the second hash contract in the hash data store 448 at (19). The hash comparator 445 may store the second hash contract in the hash data store 448 instead of the decline hash code because the hash comparator 445 has determined that the user device 402 transmitted a hash contract that matches the second hash contract. The second hash contract may replace any hash code (for example, hash contract or decline hash code) that was previously stored in the hash data store 448 in association with the user operating the user device 402. Thus, the next time the user device 402 is provided with a transaction authorization request, the hash generator 444 can retrieve and use the second hash contract in generating a new hash contract and a new decline hash code for determining whether the next transaction authorization request is approved. As described herein, the previous hash code is not transmitted between the user device 402 and the contract authentication server 440 during a current transaction authorization request. Accordingly, even if a malicious device is able to intercept the other inputs to the hash function used to produce the hash contract and determines the proper order for concatenating the inputs, the malicious device may still be prevented from successfully approving the transaction because the previous hash code may be unknown to the malicious device.

Example Hash Contract Generation Routine Using an Authentication Hash

Figure 18A:
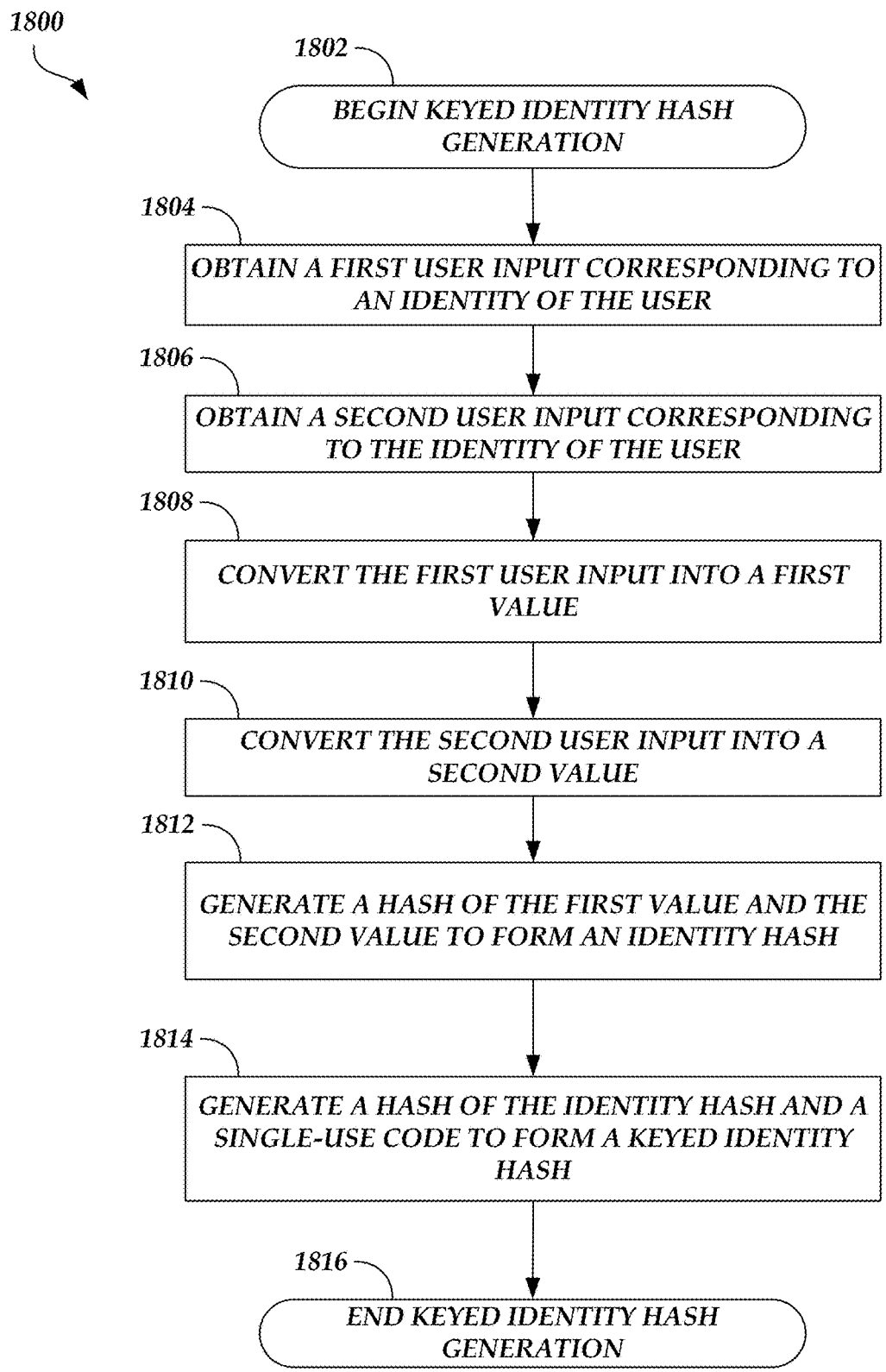
FIG. 18A is a flow diagram depicting a keyed identity hash generation routine illustratively implemented by a user device, according to one embodiment.

FIG. 18A is a flow diagram depicting a keyed identity hash generation routine 1800 illustratively implemented by a user device, according to one embodiment. As an example, the user device 402 of FIG. 4 (for example, the application retrieved from the application distribution server 420) can be configured to execute the keyed identity hash generation routine 1800. The keyed identity hash generation routine 1800 may be one routine of several routines used to generate an authentication hash. The keyed identity hash generation routine 1800 begins at block 1802.

At block 1804, a first user input corresponding to an identity of the user is obtained. For example, the first user input may be a fingerprint, a vein reading, an iris scan, face-recognition, a passcode, a single-use code, a key card, a digital certificate, a digital token, and/or any other item that represents a biological characteristic of the user, something that the user knows, or something that the user has.

At block 1806, a second user input corresponding to an identity of the user is obtained. For example, the second user input may be a fingerprint, a vein reading, an iris scan, face-recognition, a passcode, a single-use code, a key card, a digital certificate, a digital token, and/or any other item that represents a biological characteristic of the user, something that the user knows, or something that the user has. The first user input and the second user input may be different.

At block 1808, the first user input is converted into a first value. For example, the user device 402 can convert the first user input into a first value, which may be an alphanumeric value, a hexadecimal value, a string value, and/or the like. The user device 402 can retrieve mapping information that indicates how to convert the first user input into the first value.

At block 1810, the second user input is converted into a second value. For example, the user device 402 can convert the second user input into a second value, which may be an alphanumeric value, a hexadecimal value, a string value, and/or the like. The user device 402 can retrieve mapping information that indicates how to convert the second user input into the second value.

At block 1812, a hash of the first value and the second value is generated to form an identity hash (for example, an identity hash code). The identity hash can also be referred to as a hash identity. For example, the user device 402 can concatenate the first value and the second value in any order to form a string value and then apply a hash function to the string value to form the identity hash.

At block 1814, a hash of the identity hash and a key (for example, a single-use code) is generated to form a keyed identity hash. For example, the single-use code may be the symmetric key described herein. Thus, the keyed identity hash may be formed using the identity hash and a key. The user device 402 can concatenate the identity hash and the single-use code in any order to form a string value and then apply a hash function to the string value to form the keyed identity hash. Once the keyed identity hash is formed, the keyed identity hash generation routine 1800 is complete, as shown at block 1816.

While FIG. 18A depicts blocks 1804, 1806, 1808, and 1810 in a specific order, this is merely an illustrative example and is not meant to be limiting. For example, block 1804 occurs before block 1808 and block 1806 occurs before block 1810, but blocks 1804, 1806, 1808, and 1810 can otherwise be completed in any order.

In addition, blocks 1806, 1810, and/or 1814 may be optional. For example, the user device 402 can generate the identity hash by applying a hash function to the first value only. Similarly, additional user inputs that uniquely represent the user may be obtained and converted into values to be used as inputs to the hash function that forms the identity hash. As another example, the user device 402 can generate an identity hash rather than a keyed identity hash and use the identity hash instead of the keyed identity hash in block 1856 described below.

Finally, while FIG. 18A depicts a hash function being applied to the first value and the second value, this is merely an illustrative example and is not meant to be limiting. In particular, any of the first value and the second value can be hashed individually or in combination with other values derived from other user inputs (for example, other user inputs in addition to the first and second user inputs) before the hash function that generates the identity hash is applied. The resulting hash value(s) can then be hashed with any values that have not yet been included as an input to a hash function to form another hash value (for example, if at least one value has not been used as an input to a hash function) or the identity hash (for example, if all values have been used as an input to a hash function). If another hash value is formed, then this hash value can be hashed with any values that have not yet been included as an input to a hash function to form another hash value or the identity hash, and this process can continue until all values have been used as an input to a hash function. In an illustrative example, the user device 402 can apply a hash function to the first value to form a first hash value and then apply a hash function to the first hash value and the second value to form the identity hash.

Figure 18B:
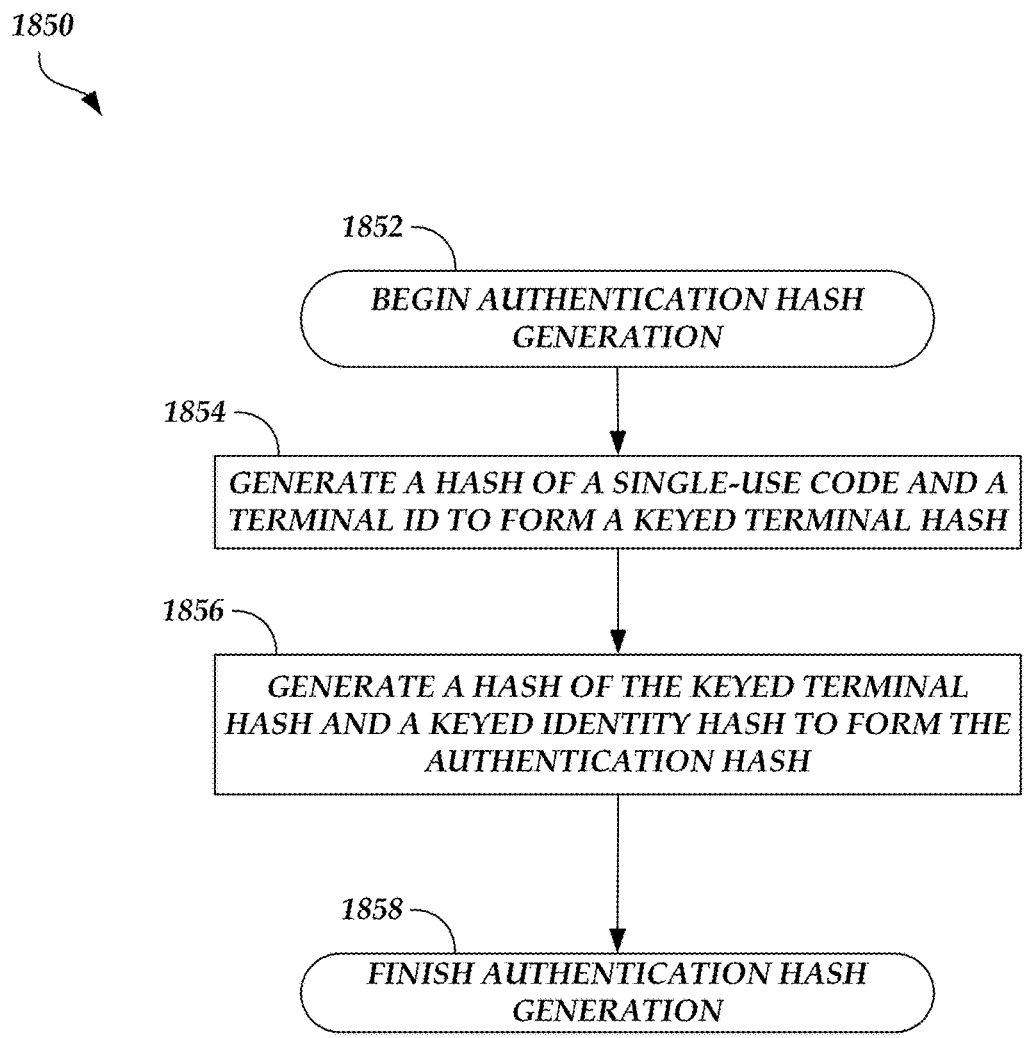
FIG. 18B is a flow diagram depicting an authentication hash generation routine illustratively implemented by a user device, according to one embodiment.

FIG. 18B is a flow diagram depicting an authentication hash generation routine 1850 illustratively implemented by a user device, according to one embodiment. As an example, the user device 402 of FIG. 4 (for example, the application retrieved from the application distribution server 420) can be configured to execute the authentication hash generation routine 1850. The authentication hash generation routine 1850 may follow the keyed identity hash generation routine 1800. The authentication hash generation routine 1850 begins at block 1852.

At block 1854, a hash of a key (for example, a single-use code) and a terminal identification is generated to form a keyed terminal hash. For example, the single-use code may be the symmetric key described herein. The terminal identification may be a value that uniquely represents the user device 402. For example, the terminal identification may be a MAC address of the user device 402, an IP address of the user device 402, a peripheral identification of the user device 402, or another value that can uniquely identify the user device 402. Use of the terminal identification in forming the keyed terminal hash may be important in situations in which a user is attempting to use a user device 402 other than a user device 402 owned by the user. For example, the user may be attempting to use a kiosk or ATM owned by an entity with whom the user is engaging in a transaction. Use of the terminal identification may ensure that the user is using an authorized machine and not machine attempting to spoof an authorized machine. The user device 402 can concatenate the single-use code and the terminal identification in any order to form a string value and then apply a hash function to the string value to form the keyed terminal hash.

Alternatively, a hash of the terminal identification is generated to form a terminal hash at block 1854. In other words, a hash of a single-use code in conjunction with the terminal identification is optional.

At block 1856, a hash of the keyed terminal hash and the keyed identity hash formed by the keyed identity hash generation routine 1800 is generated to form the authentication hash. For example, the user device 402 can concatenate the keyed terminal hash and the keyed identity hash in any order to form a string value and then apply a hash function to the string value to form the authentication hash. Once the authentication hash is formed, the authentication hash generation routine 1850 is complete, as shown at block 1858.

Alternatively, instead of generating a hash of the keyed terminal hash and the keyed identity hash to form the authentication hash at block 1856, a hash of a terminal hash and the keyed identity hash may be generated to form the authentication hash at block 1856. As another alternative, a hash of a terminal hash and an identity hash may be generated to form the authentication hash at block 1856. As another alternative, a hash of the keyed terminal hash and an identity hash may be generated to form the authentication hash at block 1856.

In an embodiment, the authentication hash can replace the identity hash code described herein. For example, instead of generating a hash contract or a decline hash code using the identity hash code, the user device 402 and/or contract authentication server 440 may instead use the authentication hash to generate a hash contract or a decline hash code. Thus, the contract authentication server 440 may store an authentication hash instead of an identity hash code in the user identity data store 446 for certain users and/or user devices 402.

Figure 18C:
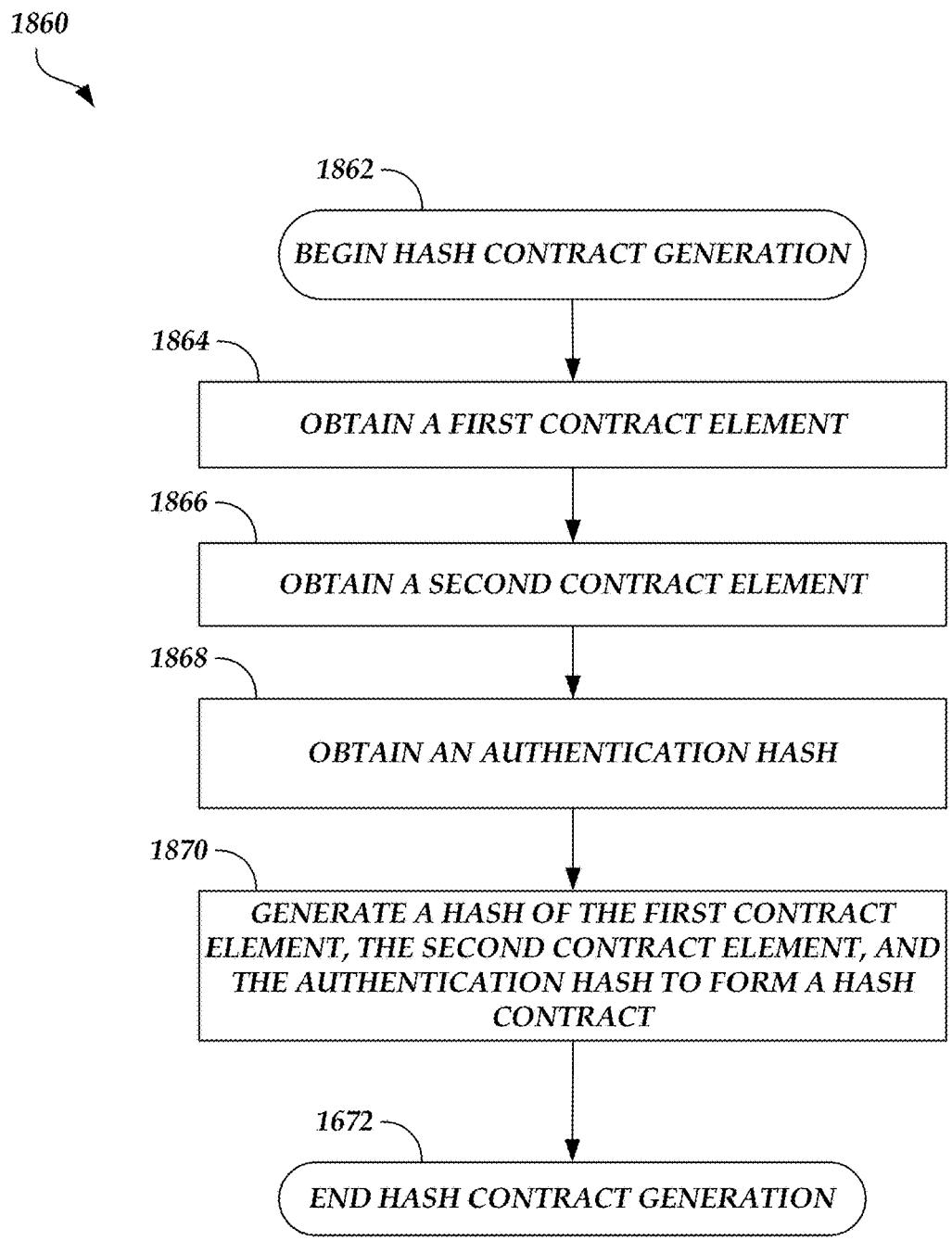
FIG. 18C is a flow diagram depicting another hash contract generation routine illustratively implemented by a user device or a contract authentication server, according to one embodiment.

FIG. 18C is a flow diagram depicting another hash contract generation routine 1860 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract generation routine 1860. The hash contract generation routine 1860 may use an authentication hash instead of an identity hash code to generate a hash contract. The hash contract generation routine 1860 begins at block 1862.

At block 1864, a first contract element is obtained. For example, the first contract element may be terms and conditions, consideration, data representing an acceptance (or a rejection), data representing an intent, a symmetric key, and/or a previous hash code.

At block 1866, a second contract element is obtained. For example, the second contract element may be terms and conditions, consideration, data representing an acceptance (or a rejection), data representing an intent, a symmetric key, and/or a previous hash code. The first contract element and the second contract element may be different.

At block 1868, an authentication hash is obtained. For example, the authentication hash may be generated according to the keyed identity hash generation routine 1800 and the authentication hash generation routine 1850. In part, the user device 402 may prompt a user, in a user interface generated by the application retrieved from the application distribution server 420, to provide one or more inputs that uniquely represent the user. The prompt may be presented to the user when the user device 402 receives a transaction authorization request. For example, such input can include a fingerprint, a vein reading, an iris scan, face-recognition, a passcode, a single-use code, a key card, a digital certificate, a digital token, and/or any other item that represents a biological characteristic of the user, something that the user knows, or something that the user has. The component(s) that receive the input(s) (for example, a fingerprint reader, a vein reader, an iris scanner, a camera, a key card reader, etc.) or the user device 402 can then convert the input(s) into a second value, which may be an alphanumeric value, a hexadecimal value, a string value, and/or the like. For example, the component(s) or the user device 402 can retrieve mapping information that indicates how to convert the input(s) into the second value. If more than one input is provided, the user device 402 can concatenate the resulting second values to form a single second value in a manner as described herein. The user device 402 may then apply a hash function to the second value to form an input that results in the authentication hash.

The contract authentication server 440 may obtain the authentication hash from the user device 402. For example, when the application running on the user device 402 is first installed or when a user is otherwise setting up the application, the user device 402 may generate the authentication hash and transmit the authentication hash to the contract authentication server 440. The contract authentication server 440 may then store the authentication hash in the user identity data store 446 and retrieve the authentication hash when generating the hash contract (or decline hash code). Note that the user device 402 may not store the authentication hash. Rather, each time a transaction authorization request is received, the user device 402 may prompt the user to provide one or more inputs that uniquely represent the user and the user device 402 may perform the process described herein to generate a new copy of the authentication hash. Thus, if an unauthorized or malicious user attempts to authorize a transaction and cannot provide the one or more inputs that uniquely represent the user, then the new copy of the authentication hash generated by the user device 402 would not match the authentication hash originally received by the contract authentication server 440 and the transaction authorization would ultimately fail (for example, because the hash contract generated by the user device 402 would not match the hash contract generated by the contract authentication server 440 given that different inputs would be used by each device in generating the hash contracts).

At block 1870, a hash of the first contract element, the second contract element, and the authentication hash is generated to form a hash contract. For example, the user device 402 or contract authentication server 440 may concatenate the first contract element, the second contract element, and the authentication hash in any order to form a single string in a manner as described herein and apply a hash function to the single string to form the hash contract. Once the hash contract is formed, the hash contract generation routine 1860 is complete, as shown at block 1872.

While FIG. 18C depicts blocks 1864, 1866, and 1868 in a specific order, this is merely an illustrative example and is not meant to be limiting. Blocks 1864, 1866, and 1868 can be completed in any order.

In addition, blocks 1866 may be optional. For example, the user device 402 can generate the hash contract by applying a hash function to the first contract element and the authentication hash only. Similarly, additional contract elements may be obtained and used as inputs to the hash function that forms the hash contract.

Finally, while FIG. 18C depicts a hash function being applied to the first contract element, the second contract element, and the authentication hash, this is merely an illustrative example and is not meant to be limiting. In particular, any of the first contract element, the second contract element, and the authentication hash can be hashed individually or in combination with other contract elements (for example, where the contract elements are the first contract element, the second contract element, the authentication hash, etc.) before the hash function that generates the hash contract is applied. The resulting hash value(s) can then be hashed with any contract elements that have not yet been included as an input to a hash function to form another hash value (for example, if at least one contract element has not been used as an input to a hash function) or the hash contract (for example, if all contract elements have been used as an input to a hash function). If another hash value is formed, then this hash value can be hashed with any contract elements that have not yet been included as an input to a hash function to form another hash value or the hash contract, and this process can continue until all contract elements have been used as an input to a hash function.

The routine 1860 depicted in FIG. 18C may also be executed by the user device 402 and/or the contract authentication server 440 when such devices generate a decline hash code. However, instead of obtaining a value corresponding to a user input that indicates that a user accepts the terms and conditions and consideration, the user device 402 and/or contract authentication server 440 may instead obtain a rejection value corresponding to a user input that indicates that a user rejects the terms and conditions and/or consideration.

Thus, the symmetric key may be used three times when generating a hash contract or a decline hash code—once as an input to a hash function used to generate the keyed identity hash, once as an input to a hash function used to generate the authentication hash, and once as an input to a hash function used to generate the hash contract or decline hash code. Use of the symmetric key at different stages in the formation of a hash contract or decline hash code may provide additional protection against malicious users attempting to spoof an authorized user. However, use of the symmetric key (for example, the single-use code) is optional such that the keyed identity hash, the authentication hash, and/or the hash contract/decline hash code can be generated without using the symmetric key.

In an embodiment, the identity hash and/or the authentication hash can, by themselves, be used to grant or deny a user and/or a user device 402 access to resources of a system. For example, a user device 402 can generate an identity hash in a manner as described herein and a system (for example, the contract authentication server 440 and/or any other system that provides users access to resources, such as secure or confidential content, data storage space, data processing capabilities, etc.) can compare the identity hash generated by the user device 402 to an identity hash previously received from the user device 402 (or another user device 402 operated by the user). If the comparison yields a match, the system can grant the user or the user device 402 access to the provided resource. If the comparison does not yield a match, the system can deny the user or the user device 402 access to the provided resource. Similarly, a user device 402 can generate an authentication hash in a manner as described herein and a system can compare the authentication hash generated by the user device 402 to an authentication hash previously received from the user device 402 (or another user device 402 operated by the user). If the comparison yields a match, the system can grant the user or the user device 402 access to the provided resource. If the comparison does not yield a match, the system can deny the user or the user device 402 access to the provided resource.

Similarly, the identity hash and/or authentication hash can be used to access a physical place, to identify a person or validate that the person's ID is real, in printed form, and/or as a barcode. For example, a user device 402 can transmit an identity hash and/or authentication hash to an electronic lock on a door. The electronic lock can compare the identity hash and/or authentication hash received from the user device 402 with an identity hash and/or authentication hash previously received from the user device 402 (or another user device 402 operated by the user). If the comparison yields a match, the electronic lock can unlock the door. Otherwise, the electronic lock can lock the door or maintain the door in the locked state. As another example, a user device 402 or another electronic component can transmit an identity hash and/or authentication hash to an authentication system. The transmission can occur via a wireless network, via swiping a card (for example, an ID) in a card reader, via scanning the electronic component, etc. The authentication system can compare the identity hash and/or authentication hash received from the user device 402 with an identity hash and/or authentication hash previously received from the user device 402 (or another user device 402 operated by the user). If the comparison yields a match, the authentication system can positively verify the identity of a user and/or positively verify that the user's ID is real. As another example, a user device 402 can generate and cause the printing of an identity hash and/or authentication hash, where the printed version of the identity hash and/or authentication hash includes the integers representing the identity hash and/or authentication hash value. As another example, a user device 402 or any other computing system (not shown) can generate a barcode using an identity hash and/or authentication hash, where the barcode can be presented in a user interface, printed on a document (for example, a passport) or label, etc. The user device 402 or other computing system can convert the identity hash and/or authentication hash into an optical, machine-readable representation of the identity hash and/or authentication hash to form the barcode. Alternatively or in addition, the user device 402 or other computing system can hash the identity hash and/or authentication hash and convert the hash into an optical, machine-readable representation of the hash to form the barcode (referred to herein as "a keyed barcode"). Alternatively or in addition, the user device 402 or other computing system can encrypt the identity hash and/or authentication hash (for example, using an encryption key) and convert the encrypted value into an optical, machine-readable representation of the encrypted value to form the barcode.

Example Acceptance and Rejection of a Credit Report Release Request

Figure 19A:
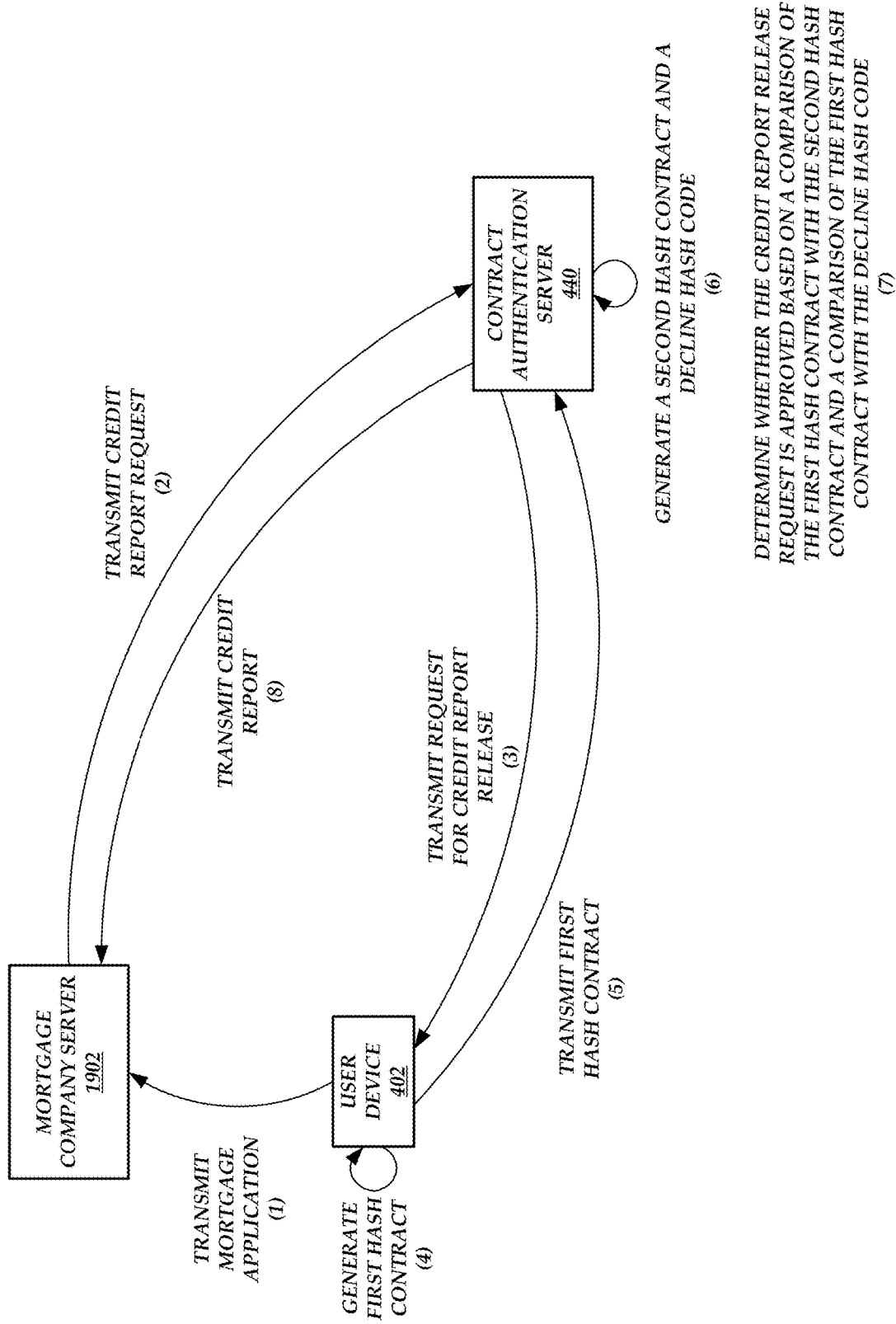
FIG. 19A is a block diagram of the hash contract generation and verification environment of FIG. 4 illustrating the operations performed by the components of the hash contract generation and verification environment to authorize the release of a credit report.

FIG. 19A is a block diagram of the hash contract generation and verification environment 400 of FIG. 4 illustrating the operations performed by the components of the hash contract generation and verification environment 400 to authorize the release of a credit report. As illustrated in FIG. 19A, a user transmits a mortgage application to a mortgage company server 1902 at (1). For example, the user may submit the mortgage application in person at a mortgage company (for example, a bank) and/or using the user device 402 (for example, by accessing a network-accessible loan service).

The mortgage company server 1902 can then transmit a request for a credit report associated with the user to a credit reporting agency system (for example, represented as the contract authentication server 440 here) at (2). The request may include credit report metadata, such as at least one of a date, an identification of one or more entities (for example, the mortgage company server 1902, a name of the entity that operates the contract authentication server 440, a name of the user associated with the user device 402, information that uniquely identifies the user, etc.), an amount (for example, zero or non-zero), a location at which the transaction was initiated, an item corresponding to the transaction (for example, a credit report, a mortgage application, etc.), terms and conditions, and/or the like. Alternatively, some or all of the credit report metadata may have previously been provided to the credit reporting agency system via a separate agreement between the mortgage company and the credit reporting agency.

In response to receiving the request, the contract authentication server 440 can transmit a credit report release request to the user device 402 at (3). The credit report release request may be received by the application retrieved from the application distribution server 420 that is running on the user device 402. Reception of the credit report release request may cause the user device 402 (for example, the application) to prompt the user to accept or decline the credit report release request corresponding to the mortgage application transmitted at step (1). The prompt may include information associated with the transaction, such as some or all of the credit report metadata included in the credit report request transmitted by the mortgage company server 1902. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user authorizes the release of the credit report, then the user device 402 generates a first hash contract at (4) in a manner as described herein. The user device 402 can then transmit the first hash contract to the contract authentication server 440 at (5).

Before, during, or after the user device 402 generates the first hash contract, the contract authentication server 440 generates a second hash contract and a decline hash code at (6). The contract authentication server 440 then determines whether the credit report release request is approved based on a comparison of the first hash contract with the second hash contract and a comparison of the first hash contract with the decline hash code at (7). Here, because the user approved the release of the credit report, the first hash contract and the second hash contract match and the first hash contract and the decline hash code do not match. Thus, the contract authentication server 440 determines that the credit report can be released. Accordingly, the contract authentication server 440 retrieves the credit report associated with the user and transmits the credit report to the mortgage company server 1902 at (8). The mortgage company server 1902 may further notify the user device 402 that the release of the credit report was approved, not shown.

Note that other systems not shown in FIG. 19A may be present in the workflow. For example, intermediary systems may be present between the mortgage company server 1902 and the contract authentication server 440.

In other embodiments, not shown, the authorization of the release of the credit report may occur in-band. For example, similar to FIGS. 14A-14B, the mortgage company server 1902 may request the user device 402 provide an acceptance or rejection of the release of the credit report, the user device 402 may generate the first hash contract as a result and transmit the first hash contract to the mortgage company server 1902, and the mortgage company server 1902 may transmit the first hash contract to the contract authentication server 440 for determining whether the credit report can be released.

Figure 19B:
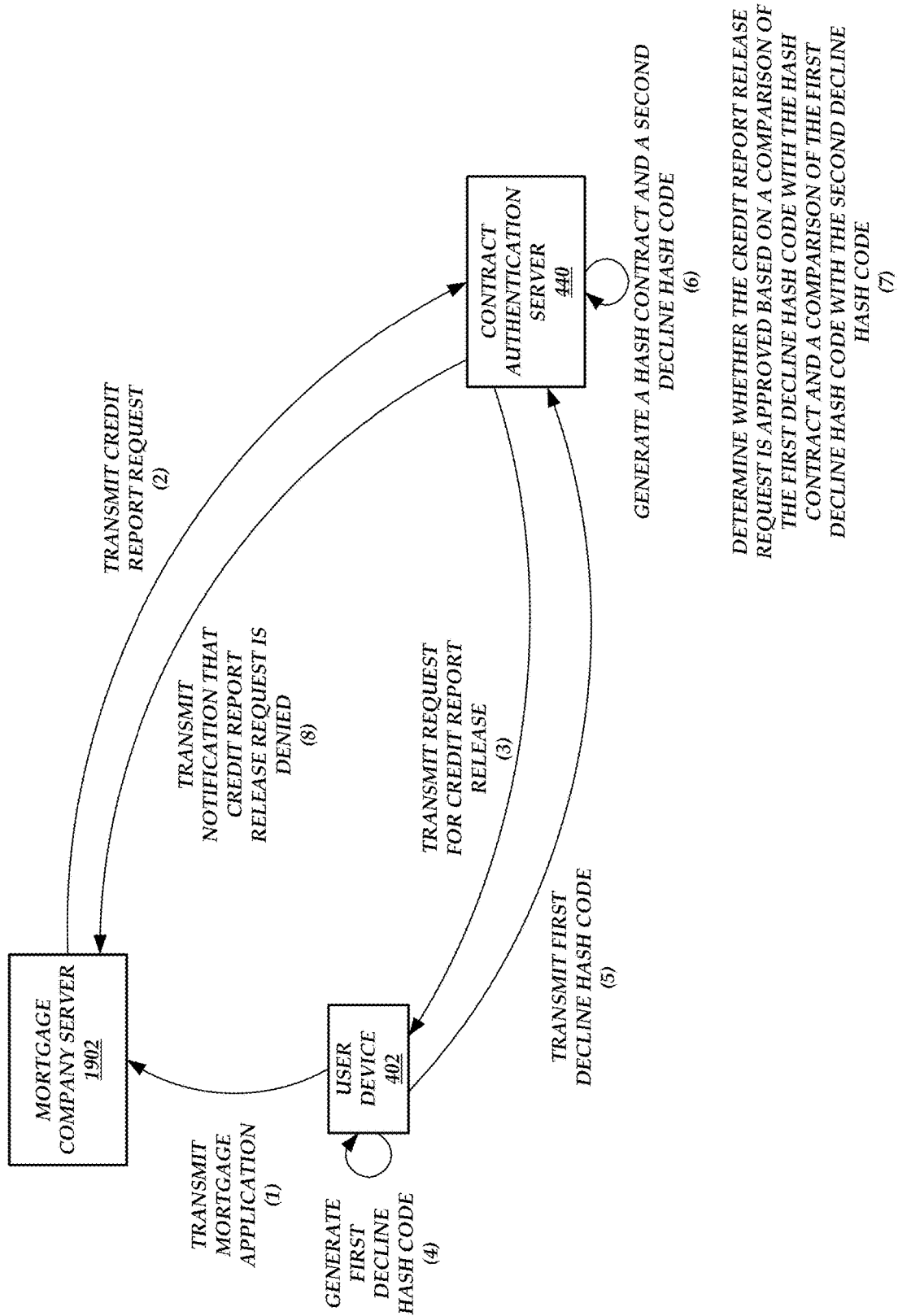
FIG. 19B is a block diagram of the hash contract generation and verification environment of FIG. 4 illustrating the operations performed by the components of the hash contract generation and verification environment to reject the release of a credit report.

FIG. 19B is a block diagram of the hash contract generation and verification environment 400 of FIG. 4 illustrating the operations performed by the components of the hash contract generation and verification environment 400 to reject the release of a credit report. As illustrated in FIG. 19B, a user transmits a mortgage application to a mortgage company server 1902 at (1). For example, the user may submit the mortgage application in person at a mortgage company (for example, a bank) and/or using the user device 402 (for example, by accessing a network-accessible loan service).

The mortgage company server 1902 can then transmit a request for a credit report associated with the user to a credit reporting agency system (for example, represented as the contract authentication server 440 here) at (2). The request may include credit report metadata, such as at least one of a date, an identification of one or more entities (for example, the mortgage company server 1902, a name of the entity that operates the contract authentication server 440, a name of the user associated with the user device 402, information that uniquely identifiers the user, etc.), an amount (for example, zero or non-zero), a location at which the transaction was initiated, an item corresponding to the transaction (for example, a credit report, a mortgage application, etc.), terms and conditions, and/or the like.

In response to receiving the request, the contract authentication server 440 can transmit a credit report release request to the user device 402 at (3). The credit report release request may be received by the application retrieved from the application distribution server 420 that is running on the user device 402. Reception of the credit report release request may cause the user device 402 (for example, the application) to prompt the user to accept or decline the credit report release request corresponding to the mortgage application transmitted at step (1). The prompt may include information associated with the transaction, such as some or all of the credit report metadata included in the credit report request transmitted by the mortgage company server 1902. The user device 402 may further prompt the user to provide one or more input(s) that uniquely identify the user (for example, a multi-factor authentication factor, such as a fingerprint, a vein reading, an iris scan, face-recognition, a passcode, a single-use code, a key card, a digital certificate, a digital token, and/or any other item that represents a biological characteristic of the user, something that the user knows, or something that the user has). The user device 402 can convert these input(s) into an identity hash code to be used when generating a hash contract or a decline hash code.

If the user rejects the release of the credit report, then the user device 402 generates a first decline hash code at (4) in a manner as described herein. The user device 402 can then transmit the first decline hash code to the contract authentication server 440 at (5).

Before, during, or after the user device 402 generates the first decline hash code, the contract authentication server 440 generates a hash contract and a second decline hash code at (6). The contract authentication server 440 then determines whether the credit report release request is approved based on a comparison of the first decline hash code with the hash contract and a comparison of the first decline hash code with the second decline hash code at (7). Here, because the user rejected the release of the credit report, the first decline hash code and the hash contract do not match and the first decline hash code and the second decline hash code match. Thus, the contract authentication server 440 determines that the credit report cannot be released. Accordingly, the contract authentication server 440 transmits a notification to the mortgage company server 1902 at (8) indicating that the credit report release request was denied. The mortgage company server 1902 may further notify the user device 402 that the release of the credit report was denied, not shown.

Note that other systems not shown in FIG. 19A may be present in the workflow. For example, intermediary systems may be present between the mortgage company server 1902 and the contract authentication server 440.

In other embodiments, not shown, the rejection of the release of the credit report may occur in-band. For example, similar to FIGS. 14A-14B, the mortgage company server 1902 may request the user device 402 provide an acceptance or rejection of the release of the credit report, the user device 402 may generate the first decline hash code as a result and transmit the first decline hash code to the mortgage company server 1902, and the mortgage company server 1902 may transmit the first decline hash code to the contract authentication server 440 for determining whether the credit report can be released.

Example Hash Contract Encryption and Decryption Routines

Figure 20A:
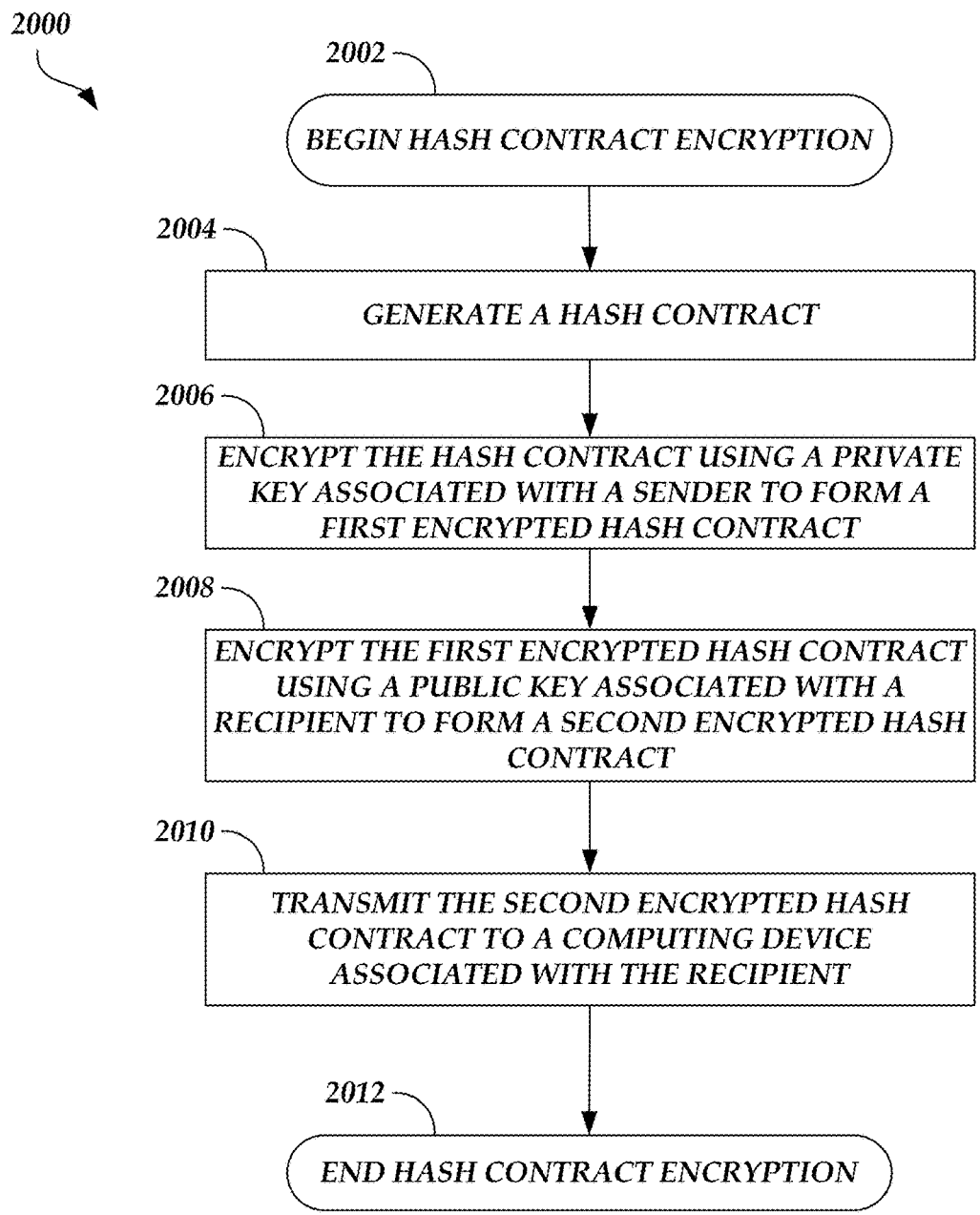
FIG. 20A is a flow diagram depicting a hash contract encryption routine illustratively implemented by a user device, according to one embodiment.

FIG. 20A is a flow diagram depicting a hash contract encryption routine 2000 illustratively implemented by a user device, according to one embodiment. As an example, the user device 402 of FIG. 4 (for example, the application retrieved from the application distribution server 420) can be configured to execute the hash contract encryption routine 2000. The hash contract encryption routine 2000 begins at block 2002.

At block 2004, a hash contract is generated. For example, the hash contract may be generated in a manner as described herein.

At block 2006, the hash contract (and optionally any associated metadata) is encrypted using a private key associated with a sender to form a first encrypted hash contract. For example, the user device 402 may encrypt the hash contract using a private key associated with the user of the user device 402. Thus, the first encrypted hash contract may be formed using two pieces of data that represent an intent of the user to accept an offer: (1) a data value representing an intent of the user to accept an offer that is used to form the hash contract (for example, based on an indication provided by the user that the user intends to accept the offer); and (2) the private key. The device that eventually receives an encrypted copy of the hash contract (for example, another user device 402 or the contract authentication server 440) may have a copy of the public key associated with the user of the user device 402 such that the encryption can be decrypted.

At block 2008, the first encrypted hash contract (and optionally any associated metadata) is encrypted using a public key associated with a recipient to form a second encrypted hash contract. For example, the user device 402 may encrypt the first encrypted hash contract using a public key associated with a device that will eventually receive an encrypted copy of the hash contract (for example, another user device 402 or the contract authentication server 440) such that the first encrypted hash contract is encrypted before transmission over the network 410 occurs. Thus, the public key provides an additional layer of protection against malicious devices that may attempt to intercept the hash contract and/or spoof the user device 402.

At block 2010, the second encrypted hash contract is transmitted to a computer device associated with the recipient. For example, the user device 402 can transmit the second encrypted hash contract to another user device 402 and/or the contract authentication server 440. Once the second encrypted hash contract is transmitted, the hash contract encryption routine 2000 is complete, as shown at block 2012.

Figure 20B:
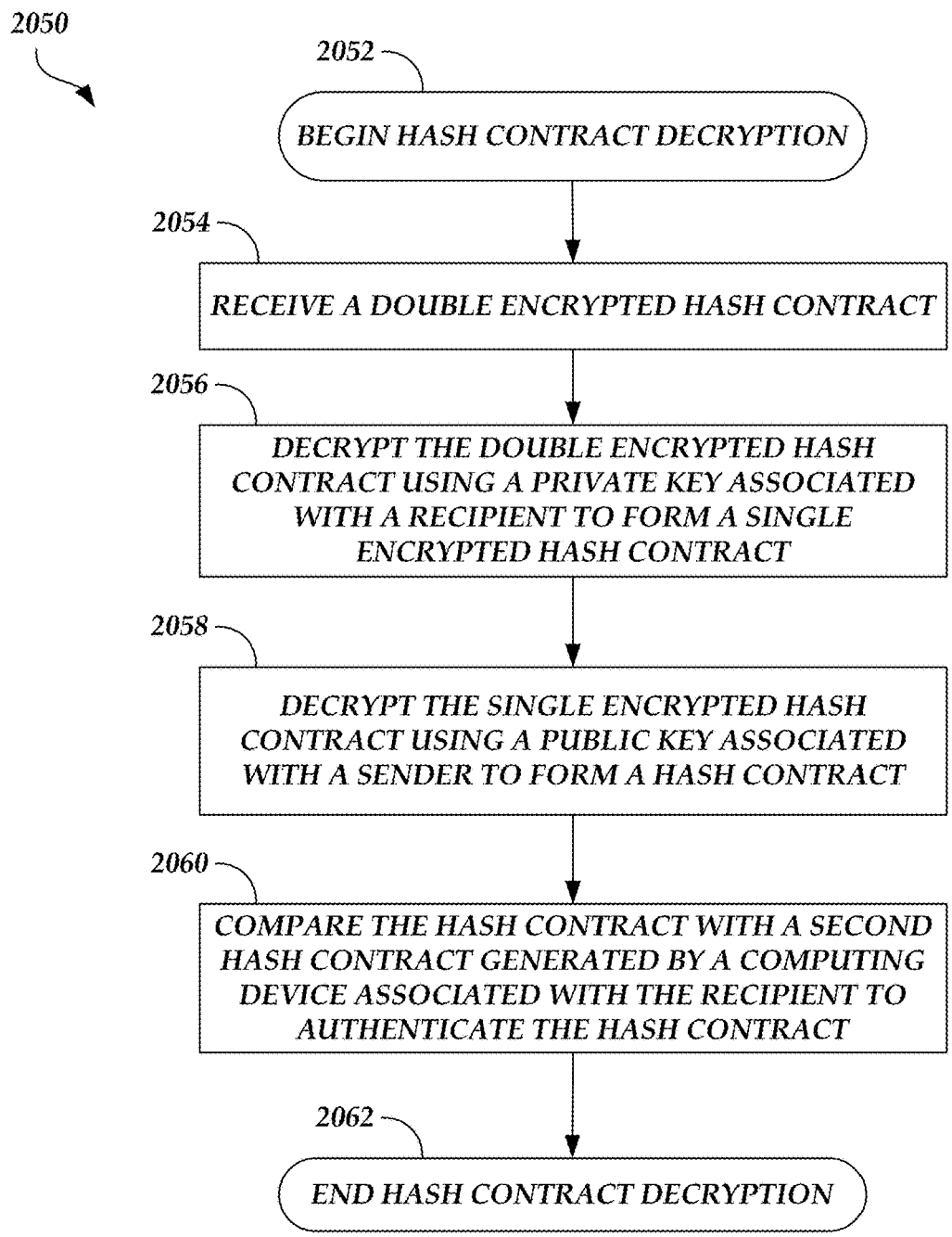
FIG. 20B is a flow diagram depicting a hash contract decryption routine illustratively implemented by a user device or a contract authentication server, according to one embodiment.

FIG. 20B is a flow diagram depicting a hash contract decryption routine 2050 illustratively implemented by a user device or a contract authentication server, according to one embodiment. As an example, the user device 402 (for example, the application retrieved from the application distribution server 420) or the contract authentication server 440 of FIG. 4 can be configured to execute the hash contract decryption routine 2050. The hash contract decryption routine 2050 begins at block 2052.

At block 2054, a double encrypted hash contract is received. For example, the double encrypted hash contract may be an encrypted copy of an encrypted copy of a hash contract.

At block 2056, the double encrypted hash contract (and optionally any associated metadata) is decrypted using a private key associated with the recipient to form a single encrypted hash contract. For example, the single encrypted hash contract may be an encrypted copy of a hash contract. The user device 402 may decrypt the double encrypted hash contract using a private key associated with the user device 402 or the contract authentication server 440 such that the encryption used to protect the single encrypted hash contract from being accessed by unauthorized users during transmission over the network 410 is removed.

At block 2058, the single encrypted hash contract (and optionally any associated metadata) is decrypted using a public key associated with a sender to form a hash contract. For example, the user device 402 or contract authentication server 440 may decrypt the single encrypted hash contract using a private key associated with the user of the user device 402 that provided the double encrypted hash contract such that a testable hash contract can be accessed.

At block 2060, the hash contract is compared with a second hash contract generated by a computing device associated with the recipient to authenticate the hash contract. For example, the user device 402 or contract authentication server 440 may generate the second hash contract. If the hash contract and the second hash contract match, then the user device 402 or contract authentication server 440 authenticates the hash contract by verifying that the terms and conditions and/or consideration of an offer are unaltered and by verifying that the user that accepted the hash contract is an authorized and/or expected user. Once the comparison is performed, the hash contract decryption routine 2050 is complete, as shown at block 2062.

While FIGS. 20A-20B describe encryption using both a private key and a public key and decryption using a corresponding public key and a corresponding private key, this is not meant to be limiting. For example, single encryption may be performed using the private key or the public key and corresponding single decryption may be performed using the corresponding public key or the corresponding private key, respectively. As another example, the hash contract may be single or double encrypted using symmetric keys.

Example Transaction Ledger in a User Interface

FIG. 21 illustrates an example user interface 2100 that may be display a transaction ledger 2120 in a window 2110. The user interface 2100 may be rendered and displayed on the user device 402. For example, the user interface 2100 may be rendered and/or displayed by the application retrieved from the application distribution server 420 that is running on the user device 402.

As illustrated in FIG. 21, the transaction ledger 2120 includes several rows and columns. For example, a first column may be an item number column, a second column may be a description column that identifies hash contracts and associated tags, and a third column may be an amount column. Each row may identify a particular transaction that has been approved or rejected. For example, a transaction may be identified by an item number, a hash contract, a tag that indicates which hash function was used to generate the hash contract, and/or an amount.

In particular, in each row, a hash contract and an associated tag may be displayed within the description column and an amount corresponding to the hash contract (for example, the consideration listed in an offer that is agreed upon to from the hash contract) may be displayed in the amount column. As an illustrative example, item number 3 is a hash contract 2122 that is represented by the hash code "9e4510df0d4b03eee4102568." The hash code itself may represent a legally enforceable contract, meaning that the actual contract represented by the hash contract 2122 may not be needed in order to prove that two or more parties have entered into an agreement. In addition, the hash contract 2122 is appended to a tag 2124 that indicates that the hash contract 2122 was formed using the MD5 hash function.

One of more of the hash contracts listed in the transaction ledger 2120 may be selectable. For example, one or both of the hash contract 2122 and the tag 2124 may be a link that, when selected, causes the user interface 2100 to display a copy of the contract corresponding to the hash contract 2122 and/or tag 2124. Thus, the transaction ledger 2120 may allow a user to view legally enforceable hash contracts and/or the actual documents that correspond to the legally enforceable hash contracts.

ADDITIONAL EMBODIMENTS

While the present disclosure describes the contract authentication server 440 as comparing a hash code generated by a user device 402 with the hash contract and decline hash code generated by the contract authentication server 440, this is not meant to be limiting. Another computing device may perform the comparison or a portion of the comparison instead. For example, the contract authentication server 440 may transmit a generated hash contract and/or decline hash code to a user device 402 and the user device 402 may perform the comparison with the hash code generated by the user device 402. The user device 402 can then transmit the results to the contract authentication server 440. As another example, the contract authentication server 440 may transmit a generated hash contract and/or decline hash code to an external system separate from the user device 402 and contract authentication server 440, not shown. The user device 402 or the contract authentication server 440 may also transmit the hash code generated by the user device 402 to the external system. The external system may then perform the comparison and provide the results to the contract authentication server 440. As another example, the contract authentication server 440 can perform a portion of the comparison and the external system or the user device 402 can perform another portion of the comparison. As an illustrative example, the contract authentication server 440 can compare the hash code generated by the user device 402 with the hash contract generated by the contract authentication server 440. The external system or user device 402 can then compare the hash code generated by the user device 402 with the decline hash code generated by the contract authentication server 440, with the results of this comparison being provided to the contract authentication server 440.

In addition, while the present disclosure describes that hash codes (for example, hash contracts and/or decline hash codes) that are compared to determine whether a contract is executed or a transaction is authorized are generated by different computing devices, this is not meant to be limiting. For example, the same user device 402 or contract authentication server 440 may generate both hash codes that are compared to determine whether a contract is executed, a transaction is authorized, etc.

Terminology

All of the methods and tasks described herein may be performed and fully automated by a computer system. The computer system may, in some cases, include multiple distinct computers or computing devices (for example, physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (for example, solid state storage devices, disk drives, etc.). The various functions disclosed herein may be embodied in such program instructions, or may be implemented in application-specific circuitry (for example, ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (for example, ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory, computer-readable medium comprising computer-executable instructions for generating a verifiable identity hash, wherein the computer-executable instructions, when executed by a processor, cause the processor to:

generate a hash code based on application of a hash function on at least (1) a first user input corresponding to an identity of a user associated with an agreement and (2) a second user input corresponding to the identity of the user, wherein the hash code is representative of the identity of the user, and wherein the user is authenticated by a comparison of the hash code with a second code generated using a third user input corresponding to the identity of the user received by a computing device prior to reception of the first user input.

2. The non-transitory, computer-readable medium of claim 1, wherein a hash of the hash code and a first single-use code forms a keyed identity hash.

3. The non-transitory, computer-readable medium of claim 2, wherein a hash of the keyed identity hash and a keyed terminal hash forms an authentication hash, wherein the authentication hash is authenticated by a comparison of the authentication hash with a second, matching authentication hash generated in response to installation of an application on the computing device.

4. The non-transitory, computer-readable medium of claim 1, wherein the hash code is used by a computing device to verify the identity of the user when a transaction request is received at a time after a current time.

5. The non-transitory, computer-readable medium of claim 1, wherein the hash code is used by a computing device as a representation of the identity of the user during generation of a Hash Contract.

6. The non-transitory, computer-readable medium of claim 1, wherein the first user input comprises at least one multi-factor authentication factor.

7. A non-transitory, computer-readable medium comprising computer-executable instructions for generating a verifiable identity hash, wherein the computer-executable instructions, when executed by a processor, cause the processor to:

execute a hash function on a representation of a first input message corresponding to an identity of a user and a representation of a second input message corresponding to the identity of the user different than the first input message, wherein the hash function, when executed based on the representation of the first input message and the representation of the second input message, creates the verifiable identity hash represented as a hash code, and wherein the user is authenticated by a comparison of the hash code with a second, matching hash code generated using a third user input corresponding to the identity of the user received by a second computing device prior to reception of the first user input.

8. The non-transitory, computer-readable medium of claim 7, wherein a hash of the identity hash and a first single-use code forms a keyed identity hash.

9. The non-transitory, computer-readable medium of claim 8, wherein a hash of the keyed identity hash and a keyed terminal hash forms an authentication hash, wherein the authentication hash is authenticated by a comparison of the authentication hash with a second, matching authentication hash generated in response to installation of an application on the computing device.

10. The non-transitory, computer-readable medium of claim 8, wherein the authentication hash is used by a computing device as a representation of the identity of the user to generate a Hash Contract.

11. The non-transitory, computer-readable medium of claim 7, wherein the identity hash is used by a computing device to verify the identity of the user when a transaction request is received at a time after a current time.

12. The non-transitory, computer-readable medium of claim 7, wherein the representation of the first user input comprises a hash of the first user input.

13. A computer-implemented method for generating a verifying a user identity, the computer-implemented method comprising:

as implemented by a computing device having one or more processors, receiving a first user input corresponding to an identity of a user associated with an agreement;

receiving a second user input corresponding to the identity of the user;

converting the first user input into a first value;

converting the second user input into a second value; and generating a hash of a representation of the first value and a representation of the second value to form an identity hash, wherein the user is authenticated by a comparison of the identity hash with a second, matching identity hash generated using a third user input corresponding to the identity of the user received by a second computing device prior to reception of the first user input.

14. The computer-implemented method of claim 13, further comprising:

identifying an identifier associated with the computing device;

generating a hash of the identifier to form a terminal hash; and generating a hash of the identity hash and the terminal hash to form an authentication hash, wherein the authentication hash is authenticated by a comparison of the authentication hash with a second, matching authentication hash generated in response to installation of an application on the computing device.

15. The computer-implemented method of claim 14, further comprising:

generating a hash of a first code and the identifier to form a keyed terminal hash; and generating a hash of the identity hash and the keyed terminal hash to form the authentication hash.

16. The computer-implemented method of claim 14, further comprising:

generating a hash of the identity hash and a first code to form a keyed identity hash;

generating a hash of a second code and the identifier to form a keyed terminal hash; and generating a hash of the keyed identity hash and the keyed terminal hash to form the authentication hash.

17. The computer-implemented method of claim 14, wherein the identifier associated with the computing device comprises at least one of a media access control (MAC) address of the computing device, an Internet protocol (IP) address of the computing device, or a peripheral identification of the computing device.

18. The computer-implemented method of claim 14, further comprising transmitting the authentication hash to the second computing device over a network such that the second computing device uses the authentication hash as a representation of the identity of the user during generation of a Hash Contract.

19. The computer-implemented method of claim 13, further comprising:

storing the identity hash in memory of the computing device;

deleting the first value and the second value; and transmitting the identity hash to a server system over a network such that the server system uses the identity hash to verify the identity of the user when a transaction request is received at a time after a current time.

20. The computer-implemented method of claim 13, wherein the computing device is one of a kiosk or an automated teller machine.

\* \* \* \* \*